(12) United States Patent
Kim et al.

(10) Patent No.: US 10,223,053 B2
(45) Date of Patent: Mar. 5, 2019

(54) ELECTRONIC APPARATUS, PRINT CONTROL METHOD AND COMPUTER READABLE RECORDING MEDIUM

(71) Applicant: S-Printing Solution Co., Ltd., Suwon-si, Gyeonggi-do (KR)

(72) Inventors: Yong-im Kim, Seoul (KR); Tae-jung Yun, Seoul (KR); Hong-seock Kim, Suwon-si (KR); Chang-seok Choi, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/313,878

(22) PCT Filed: Dec. 23, 2014

(86) PCT No.: PCT/KR2014/012710
§ 371 (c)(1),
(2) Date: Nov. 23, 2016

(87) PCT Pub. No.: WO2015/182845
PCT Pub. Date: Dec. 3, 2015

(65) Prior Publication Data
US 2017/0206044 A1 Jul. 20, 2017

(30) Foreign Application Priority Data

May 29, 2014 (KR) .................. 10-2014-0065120
May 29, 2014 (KR) .................. 10-2014-0065122
Oct. 1, 2014 (KR) .................. 10-2014-0132535

(51) Int. Cl.
*G06F 3/12* (2006.01)
*H04N 1/00* (2006.01)

(52) U.S. Cl.
CPC .......... *G06F 3/1275* (2013.01); *G06F 3/1205* (2013.01); *G06F 3/1242* (2013.01);
(Continued)

(58) Field of Classification Search
CPC .... G06F 3/1241; G06F 3/1275; G06F 3/1258; G06F 3/1208; H04N 1/00474; H04N 1/00938; H04N 2201/0094
(Continued)

(56) References Cited

U.S. PATENT DOCUMENTS 7,978,359 B2   7/2011   Koarai
8,514,438 B2   8/2013   Nishio
(Continued)

FOREIGN PATENT DOCUMENTS

JP   2006-180289 A   7/2006
JP   4107317 B2   6/2008
(Continued)

*Primary Examiner* — Neil R McLean
*Assistant Examiner* — Darryl V Dottin
(74) *Attorney, Agent, or Firm* — Jefferson IP Law, LLP

(57) ABSTRACT

An electronic device is disclosed. The present electronic device comprises: a user interface unit displaying a UI for controlling a function of an image forming device; a communication interface unit for transmitting, to the image forming device, a control command received through the UI; a workform generation unit for automatically generating a workform on the basis of a series of user operation contents and orders inputted on the UI; and a storage unit for storing the generated workform.

14 Claims, 49 Drawing Sheets

(52) U.S. Cl.
CPC ....... *G06F 3/1257* (2013.01); *H04N 1/00474* (2013.01); *H04N 1/00938* (2013.01); *G06F 3/1208* (2013.01); *G06F 3/1258* (2013.01); *H04N 2201/0094* (2013.01)

(58) Field of Classification Search
USPC ...................................................... 358/1.14
See application file for complete search history.

(56) References Cited

U.S. PATENT DOCUMENTS

| | | | |
|---|---|---|---|
| 2005/0091600 A1* | 4/2005 | Yamamoto | H04L 63/083 715/752 |
| 2006/0136488 A1 | 6/2006 | Mifune et al. | |
| 2007/0076237 A1 | 4/2007 | Kudo | |
| 2008/0162626 A1* | 7/2008 | Yoon | G06Q 10/06 709/202 |
| 2008/0180725 A1 | 7/2008 | Levin | |
| 2009/0249372 A1* | 10/2009 | Park | G06F 3/1204 719/330 |
| 2010/0014112 A1 | 1/2010 | Yoshida | |
| 2010/0073713 A1 | 3/2010 | Chae | |
| 2011/0197154 A1 | 8/2011 | Corona | |
| 2012/0069391 A1 | 3/2012 | Yonezawa et al. | |
| 2012/0081739 A1 | 4/2012 | Kwon et al. | |
| 2012/0147401 A1 | 6/2012 | Poh et al. | |
| 2013/0063772 A1 | 3/2013 | Bae | |
| 2013/0258408 A1 | 10/2013 | Mizutani | |

FOREIGN PATENT DOCUMENTS

| | | |
|---|---|---|
| JP | 2008-186445 A | 8/2008 |
| JP | 4301560 B2 | 7/2009 |
| JP | 2011-211303 A | 10/2011 |
| JP | 2011-253409 A | 12/2011 |
| JP | 4887843 B2 | 2/2012 |
| JP | 2013-140600 A | 7/2013 |
| JP | 2013-182467 A | 9/2013 |
| JP | 2013-190954 A | 9/2013 |
| KR | 10-0988419 B1 | 10/2010 |
| KR | 10-2013-0060718 A | 6/2013 |

* cited by examiner

< SMB

| SERVER | 198.210.11.1 |
| PORT | 8080 |

☑ ANONYMOUS

| USER ID | USERNAME |
| PASSWORD | **** |
| DOMAIN | CORP |
| PATH | \SHARE |
| FILE NAME | TEST FILE |
| FILING POLICY | CHANGE NAME > |

FIG. 38

VIRTUAL PRINTER PROPERTIES

| MFP A | - IP: 11.11.11.11 |
| --- | --- |
| | FAX |

PRINTER B - IP: 22.22.22.22

| MFP C | - IP: 33.33.33.33<br>SCAN TO SERVER/<br>SCAN TO E-MAIL |
| --- | --- |

FIG. 46
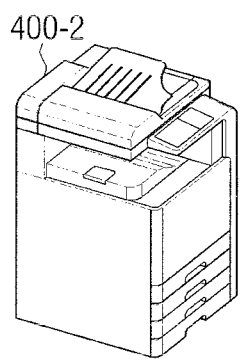
400-2
192.168.0.18
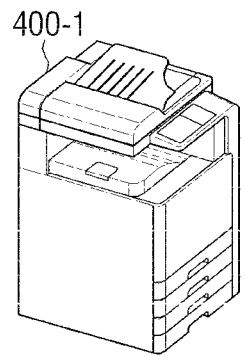
400-1
192.168.0.1
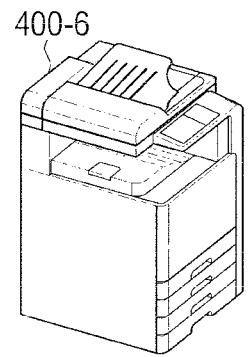
400-6
192.168.0.200
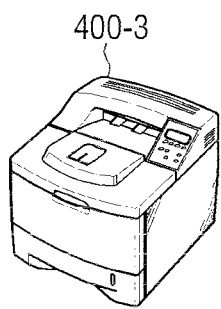
400-3
192.168.16.108
400-4
192.168.0.211
400-5
192.32.0.25

ELECTRONIC APPARATUS, PRINT CONTROL METHOD AND COMPUTER READABLE RECORDING MEDIUM

TECHNICAL FIELD

Apparatuses and methods consistent with the present disclosure relate to an electronic apparatus, a print control method and a computer readable record medium, and more particularly, to an electronic apparatus capable of easily generating a work form without complicated settings, and a print control method and a computer readable record medium thereof.

DESCRIPTION OF THE RELATED ART

Generally, an image forming apparatus means an apparatus for printing, in paper for recording, print data generated in a terminal apparatus such as a computer. Examples of the image forming apparatus include a copy machine, a printer, a facsimile, and a multi-function peripheral (MFP) configured to provide multiple functions of a copy machine, a printer and a facsimile through one apparatus.

Due to the recent development of image forming apparatuses, an image forming apparatus have become capable of providing a plurality of functions, and thus users may combine the plurality of functions of the image forming apparatus to perform a series of operations.

Further, recent image forming apparatuses support a work form function to help perform the series of operations easily. Here, the work form includes information on the operation to be managed by the user, an apparatus to perform the operation, and the order of processing the operations and the like, enabling the user to perform the series of operations by simply selecting a certain work form without having to make multiple settings for a plurality of functions.

Although it has become possible for a plurality of users to share and use a plurality of image forming apparatuses thanks to the development of networks, since a conventional work form reflects the functions of a certain image forming apparatus, the work form can only be used for the corresponding image forming apparatus. Therefore, since a work form of a certain image forming apparatus cannot be used for other image forming apparatuses, the user has to go through the inconvenience of having to write a new work form.

Further, since different image forming apparatuses have different methods and UIs for a work form, there is difficulty in attaining proficiency in the method for generating a work form.

Some companies or public organizations run several to dozens of image forming apparatuses. In such a company or public organization environment, a user may select an image forming apparatus that he/she wants and perform an operation Here, the user selects an image forming apparatus that either supports the function that he/she wants to use, or an image forming apparatus that can process that function more quickly, and performs the operation.

However, the type of apparatus that satisfies user's demands are typically new type of image forming apparatuses. Therefore, there are cases where, in a printing environment where a plurality of image forming apparatuses exist, operations are concentrated on a certain image forming apparatus instead of being distributed evenly over the plurality of image forming apparatuses.

For example, in a case where there is one multi-function peripheral (MFP) and four printers in a network environment, if the operation wanted by a plurality of users is copying, the copying operations of the plurality of users will be concentrated on the one multi-function peripheral (MFP), the rest of the four printers not being utilized.

Furthermore, in a case where there is one scanner and four printers in a network environment and the operation wanted by a user is copying, the copying operation cannot be performed, and thus a new copy machine or a multi-function peripheral (MFP) must be installed. Otherwise, the user has to do a scanning operation using the scanner, and then print the scanned results using the printer, which is inconvenient.

SUMMARY OF INVENTION

Technical Problem

Therefore, a purpose of the present disclosure is to provide an electronic apparatus capable of easily generating a work form with no complicated settings, and a print control method and a computer readable record medium thereof.

Further, another purpose of the present disclosure is to provide an image forming apparatus that may be grouped with other image forming apparatuses so that functions of each image forming apparatus may be used in an extended manner, and a print control method and a computer readable record medium thereof.

Solution to Problem

According to an embodiment of the present disclosure, there is provided an electronic apparatus connectable with an image forming apparatus, the apparatus including a user interface that displays a UI for controlling functions of the image forming apparatus; a communication interface that transmits a control command input on the UI to the image forming apparatus; a work form generator that automatically generates a work form based on a series of user manipulations and an order thereof input on the UI; and a storage that stores the generated work form.

The user interface may receive input of a plurality of functions to be performed in the image forming apparatus and an option for each of the plurality of functions, and the work form generator may generate the work form based on the plurality of functions and the option input.

If each of the plurality of functions includes a scanning operation, the user interface may receive input of whether or not a script to be used in the scanning operation of the each of the plurality of functions is a same script, and the work form generator may combine the scanning operation of the each of the plurality of functions into one scanning operation and generates the work form.

The work form generator may generate the work form in at least one language of Jason and XML.

The UI may include a menu for initiating recording and a menu for stopping recording, and the work form generator may generate the work form based on the user manipulations and order input between a time point the menu for initiating recording was selected and a time point when the menu for stopping recording is selected.

The user interface may display a message requesting to select the menu for stopping recording when a pre-determined period of time has passed since the menu for initiating recording was selected.

The functions of the image forming apparatus may be at least one of copy, fax, scan to email, scan to server and change apparatus setting.

The user interface may display functions and options of the functions included in the work form stored.

The user interface may receive input of a delete command or a change command regarding at least one of the functions and options thereof included in the work form stored, and the work form generator may update the work form stored in response to the input delete command or the change command.

The user interface may receive input of a command to execute the work form stored, and the communication interface may transmit a control command corresponding to the work form to the image forming apparatus.

The electronic apparatus may be connectable with a plurality of image forming apparatuses, and the user interface may receive selecting of the image forming apparatus to execute the work form of the plurality of image forming apparatuses, and the communication interface may transmit the control command corresponding to the work form to the selected image forming apparatus.

The electronic apparatus may further include a determiner that determines whether or not the work form is executable in the selected image forming apparatus.

The determiner may obtain apparatus information on the selected image forming apparatus, and then determine whether or not the work form is executable in the selected image forming apparatus.

When a blank field exists in the work form, the user interface may display a message requesting inputting of a value required in the blank field.

When at least one function or at least one option of the functions in the work form cannot be performed in the selected image forming apparatus, the determiner may search for a function or an option that can substitute for the at least one function or the at least one option.

When at least one function or at least one option of the functions in the work form cannot be performed in the selected image forming apparatus, the user interface may receive selecting of a function or an option that can substitute for the at least one function or the at least one option, or receives selecting of cancelling execution of the function that cannot be performed.

The user interface may display a status of progress of the work form.

According to another embodiment of the present disclosure, there is provided a print control method of an electronic apparatus connectable with an image forming apparatus, the method including displaying a UI for controlling functions of the image forming apparatus; transmitting a control command input on the UI to the image forming apparatus; automatically generating a work form based on a series of user manipulations and an order thereof input on the UI; and storing the generated work form.

The electronic apparatus may be connectable with a plurality of image forming apparatuses, and the print control method may further include receiving input of selecting the image forming apparatus to execute the work form of the plurality of image forming apparatuses, and transmitting a control command corresponding to the work form to the selected image forming apparatus.

According to another embodiment of the present disclosure, there is provided a non-transitory computer readable record medium including a program for executing a print control method of an electronic apparatus, the print control method including displaying a UI for controlling functions of an image forming apparatus; transmitting a control command input through the UI to the image forming apparatus; automatically generating a work form based on a series of user manipulations and order thereof being input on the UI; and storing the generated work form.

According to another embodiment of the present disclosure, there is provided an image forming apparatus including a controller for generating an operation group including the image forming apparatus and another image forming apparatus connectable with the image forming apparatus; a user interface for receiving input of a command to execute a job consisting of a plurality of tasks; a task processor for processing at least one task of the plurality of tasks to perform a portion of the job; and a communication interface for transmitting the rest of the job not processed in the task processor to the other image forming apparatus in the operation group.

The controller may receive information on the plurality of image forming apparatuses selected in the mobile apparatus, and generate the operation group based on the received information.

The information on the plurality of image forming apparatuses may be information on the image forming apparatus near field communication (NFC)-tagged with the mobile apparatus.

The user interface may display a list of a plurality of other image forming apparatuses that may be connected to the image forming apparatus, and the controller may, when at least one of the other image forming apparatuses is selected from the displayed list, generate the operation group including the image forming apparatus and the selected other image forming apparatus.

The controller may search for another image forming apparatus connectable with the image forming apparatus through a short distance network, and generate the operation group including the searched other image forming apparatus.

The short distance network may be Bluetooth.

The controller may search for another image forming apparatus having the same identifier as the apparatus name of the image forming apparatus, and generate the operation group including the other image forming apparatus searched.

The controller may generate a plurality of operation groups, and the user interface may receive selecting of the operation group to perform the job.

The controller may search for another image forming apparatus having the same address area as the IP address of the image forming apparatus, and generate the operation group including the other image forming apparatus searched.

The communication interface may receive hop count information on the other image forming apparatus searched and SSID information on an access point connectable by the other image forming apparatus, and the controller may exclude another image forming apparatus having a predetermined value and another image forming apparatus having different SSID information from the image forming apparatus.

The image forming apparatus may further include a task distributer that distributes tasks corresponding to the job into those to be performed by the image forming apparatus and those to be performed by another image forming apparatus in the operation group.

The image forming apparatus may be an apparatus that supports scanning task but not printing task, the user interface may receive input of a command to copy a script, the task processor may scan the script and generate a scan image, and the communication interface may transmit the generated scan image to another image forming apparatus in the operation group that supports a printing task.

The image forming apparatus may be an apparatus that supports scanning task but not printing task, the user interface may receive input of a command to copy a script, the task processor may scan the script and generate a scan image, and the communication interface may transmit the generated scan image to another image forming apparatus in the operation group that supports a fax transmission task.

The image forming apparatus may be an apparatus that supports color scanning task, black and white printing task, and black and white copying task, but not color copying task, and the user interface may receive input of a command to color copy the script, and the task processor may scan the script and generate a color scan image, and the communication interface may transmit the generated color scan image to another image forming apparatus in the operation group that supports the color printing task.

The image forming apparatus may be an apparatus that supports scanning task, printing task, and copying task, the user interface may receive input of a command to color copy the script, and the task processor may scan the script and generate a scan image, and the communication interface may transmit the rest of the generated scan image to another image forming apparatus in the operation group that supports the printing task.

The communication interface may receive a portion of a job related to a command to perform a job input into another image forming apparatus from the another image forming apparatus in the operation group, and the task processor may perform the portion of the job received.

According to another embodiment of the present disclosure, there is provided a mobile apparatus connectable with a plurality of image forming apparatuses, the mobile apparatus including a user interface for displaying a UI for controlling each task of the plurality of image forming apparatuses; a communication interface for transmitting a control command received through the UI to each of the plurality of image forming apparatuses; a work form generator that automatically generates a work form based on a series of user manipulations and order thereof being input on the UI; and a storage for storing the generated work form, wherein the control command input is a control command for a plurality of tasks to be performed in the plurality of image forming apparatuses.

The user interface may receive a first task to be performed in a first image forming apparatus and a second task to be performed in a second image forming apparatus, the second task being different from the first task.

According to another embodiment of the present disclosure, there is provided a print control method of an image forming apparatus, the print control method including generating an operation group including the image forming apparatus and another image forming apparatus connectable with the image forming apparatus; receiving input of a command to perform a job consisting of a plurality of tasks; performing at least one of the plurality of tasks corresponding to the job to perform a portion of the job; and transmitting the rest of the job not performed in the image forming apparatus to the other image forming apparatus in the operation group.

According to another embodiment of the present disclosure, there is provided a print control method including displaying a UI for controlling a task of a plurality of image forming apparatuses; transmitting a control command input through the UI to each of the plurality of image forming apparatuses; automatically generating a work form based on a series of user manipulations and orders thereof being input on the UI; and storing the generated work form, wherein the control command input is a control command for a plurality of tasks to be performed in the plurality of image forming apparatuses.

BRIEF DESCRIPTION OF DRAWINGS

The above and/or other aspects of the present invention will be more apparent by describing certain embodiments of the present disclosure with reference to the accompanying drawings, in which:

FIGS. 9 to 26 are views illustrating examples of a user interface window that may be displayed in an electronic apparatus;

FIG. 38 is a view illustrating an example of information being stored by the mobile apparatus of FIG. 35;

FIG. 46 is a view provided to explain the grouping method according to the fourth embodiment.

DESCRIPTION OF EMBODIMENTS

Hereinafter, embodiments of the present disclosure will be explained in further detail with reference to the drawings attached. However, in explaining the present disclosure, in explaining the present disclosure, if it is determined that detailed explanation on a well-known function or configuration could unnecessarily obscure the gist of the present disclosure, such detailed explanation will be omitted.

Figure 1:
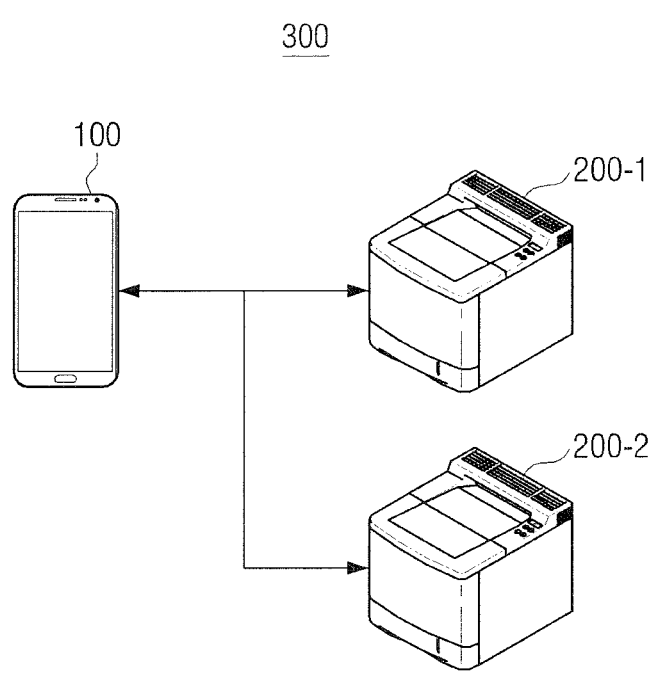
FIG. 1 is a block diagram illustrating an image forming system according to an embodiment of the present disclosure.

FIG. 1 is a block diagram illustrating an image forming system according to an embodiment of the present disclosure.

Referring to FIG. 1, the image forming system 300 includes an electronic apparatus 100 and an image forming apparatus 200.

The electronic apparatus 100 displays a UI for controlling functions of the image forming apparatus 200, and receives input of a control command regarding the image forming apparatus 200 through the displayed UI. Further, the electronic apparatus 100 transmits the input control command to the image forming apparatus 200, and generates a work form based on a series of user manipulations and an order thereof input, and stores the same. Configurations and operations of the electronic apparatus 100 will be explained in detail hereinafter with reference to FIGS. 2 and 3. Here, the electronic apparatus 100 may be a portable device such as a notebook, a mobile phone, a smart phone, a PMP, an MP3 player and the like, or a device such as a PC.

Here, the work form includes information necessary for performing operations to be provided in the image forming apparatus 200. For example, information such as a processing order, an operating condition, a position to store result data of an operation and the like may be included in the work form by the user. The stored work form enables the user to easily perform an identical operation without repeating the settings. The work form may be generated in an eXtensible Markup Language (XML) format.

A general work form includes an input source that provides data and a destination to which the data is to be transmitted. For example, data to be processed may be a document to be scanned, the input source may be the image forming apparatus capable of scanning the document and the destination may be a file server, a File Transfer Protocol (FTP) server, an SMTP server or the like to which the scanned document is to be transmitted.

In a conventional electronic apparatus, the input source, the destination and the operating condition must be input through the UI necessary for generating a work form when generating the work form, but in the present embodiment, the electronic apparatus 100 automatically fills the aforementioned input source, the destination and the operating condition through a series of user manipulations in the process of performing the operation currently proceeding and generates the work form. In this regard, in order to distinguish the work form according to the present embodiment from a conventional work form, the work form according to the present embodiment may be called an M-plow.

Further, if necessary, the user may delete the destination field from a pre-generated work form, and generate a work form where a destination may be input whenever the work form is performed. The work form generated in this way may have a blank field.

Further, the image forming apparatus 200 receives input of a control command from the electronic apparatus 100, and performs a function according to the input control command. Configurations and operations of the image forming apparatus 200 will be explained in detail hereinafter with reference to FIGS. 4 and 5. Here, the image forming apparatus 200 may be a printer that performs only printing operations, or a multi-function peripheral that can also perform scanning, copying and the like as well as printing.

As aforementioned, an image forming system 300 according to the present embodiment can generate a work form with only manipulations for controlling functions of an image forming apparatus, and thus the user need not learn or endeavor to generate a work form, thereby providing improved user convenience.

Although it was explained hereinabove in explaining FIG. 1 that a user control command may be input in the electronic apparatus 100 and a work form may be generated therein based on the input user control command, in another embodiment, a user control command may be input in the electronic apparatus 100 and a work form may be generated in the image forming apparatus 200, or a user control command may be input directly in the image forming apparatus 200 and a work form may be generated in the image forming apparatus 200 as well.

Although it was explained hereinabove in explaining FIG. 1 that one electronic apparatus 100 may be connected to two image forming apparatuses, in another embodiment, one electronic apparatus 100 may be connected to three or more image forming apparatuses, or each image forming apparatus may be connected to a plurality of electronic apparatuses.

Further, in another embodiment, each apparatus may not be connected directly, but connected indirectly through a router and/or another apparatus (for example, server) or the like. Further, although it was illustrated in the illustrated example that apparatuses are connected via wires, in another embodiment, the apparatuses may be connected wirelessly, instead.

Figure 2:
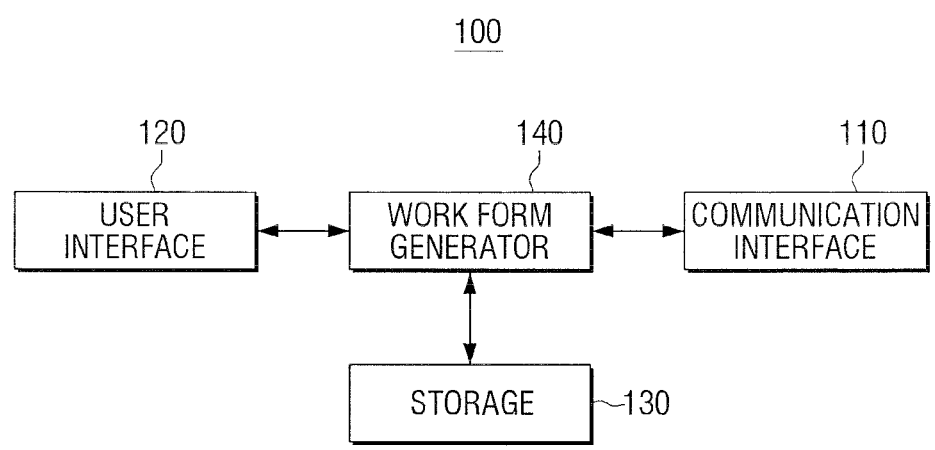
FIG. 2 is a schematic block diagram of an electronic apparatus according to an embodiment of the present disclosure.

FIG. 2 is a schematic block diagram of an electronic apparatus according to an embodiment of the present disclosure.

Referring to FIG. 2, the electronic apparatus 100 according to the present embodiment may consist of a communication interface 110, a user interface 120, a storage 130 and a work form generator 140.

The communication interface 110 is formed to connect the electronic apparatus 100 to an external apparatus, and may be configured to be accessible via a Local Area Network (LAN), Internet, a Universal Serial Bus (USB) port or a wireless module. Here, the wireless module may be WiFi, WiFi Direct, NFC, Bluetooth, IR or the like.

The communication interface 110 searches for a connectable image forming apparatus 200. Specifically, the communication interface 110 may search for the connectable image forming apparatus 200 using a communication method that the electronic apparatus 100 supports. For example, if the communication interface 110 uses WiFi, the communication interface 110 may search for the connectable image forming apparatus using WiFi, and when the communication interface 110 supports WiFi and NFC, the communication interface 110 may search for an image forming apparatus connectable for each connecting method.

The communication interface 110 receives apparatus information on a searched image forming apparatus or a selected image forming apparatus. Specifically, the communication interface 110 may receive information on an image forming apparatus that is connectable or information on an image forming apparatus selected by the user. Here, the apparatus information may include address information (IP address, MAC information and the like necessary for being connected), function information (information on functions that the image forming apparatus supports such as whether or not color printing is possible, whether or not scanning is possible and the like) and status information (whether or not the image forming apparatus can perform an operation right now, whether or not an error occurred, status of operation progress, etc.) of the image forming apparatus. Such receiving of apparatus information may be performed in the process of generating a work form, or in the process of executing the work form.

Further, the communication interface 110 receives a UI for controlling functions of the image forming apparatus. Specifically, the electronic apparatus 100 according to the present embodiment may display the UI for controlling functions of the image forming apparatus in two forms. The first embodiment is to receive the UI from the image forming apparatus and display the same, and the second embodiment is to receive the information necessary for generating a UI from the image forming apparatus (for example, the aforementioned apparatus information), and then to use that information to generate and display a UI for itself (for example, virtual GUI function). Therefore, in the case of the electronic apparatus 100 according to the first embodiment, the communication interface 110 may receive the UI for controlling functions of the image forming apparatus from the image forming apparatus.

Further, the communication interface 110 transmits a control command to the image forming apparatus 110. Specifically, the communication interface 110 may transmit to the image forming apparatus 200 the control command input through the UI.

Further, the communication interface 110 may transmit a control command corresponding to the work form to the image forming apparatus that may perform the work form. Here, the control command is a command that can be recognized in the image forming apparatus that can perform the work form. However, although it was explained that in the present embodiment a command corresponding to the work form may be transmitted to the image forming apparatus, in an embodiment, the work form itself may be transmitted to the image forming apparatus.

Further, the communication interface 110 transmits print data. Specifically, in the case where the user's control command is a print command, fax transmission command or the like regarding a document stored in the electronic apparatus 100, the communication interface 110 may transmit the print data. Here, the print data may be data of a printer language such as postscript (PS), printer control language (PCL) and the like, and if the image forming apparatus 200 supports direct printing, the print data may be a file of PDF, XPS, BMP, JPG, itself.

Further, the communication interface 110 transmits the work form. Specifically, in order to share with another apparatus the work form generated in the work form generator 140 that will be explained hereinafter, the communication interface 110 may transmit the generated work form to another apparatus, image forming apparatus, management server and the like. Further, the communication interface 110 may receive a work form generated in another apparatus as well.

The user interface 120 is provided with numerous function keys by which the user may set or select a variety of functions that the electronic apparatus 100 supports, and the user interface 120 may display various kinds of information that the electronic apparatus 100 provides. The user interface 120 may be configured as an apparatus that realizes both inputting and outputting such as a touch screen, or as an apparatus of a mouse and a monitor combined. That is, the user interface 120 may consist of a display that provides information to the user and a manipulation inputter for receiving inputs of user's control commands.

The user interface 120 selects an image forming apparatus. If there is a plurality of image forming apparatuses that the electronic apparatus 100 can connect to, the user interface 120 may display the plurality of connectable image forming apparatuses so that one of them may be selected.

The user interface 120 displays a UI for controlling the functions of the image forming apparatus 200. Specifically, the user may display the UI transmitted through the communication interface 110, or generate a UI for itself based on the apparatus information transmitted through the communication interface 110 and display the generated UI. The user may input a control command for controlling the functions of the image forming apparatus 200 through the UI displayed.

Here, through the displayed UI, the user interface 120 may receive input of selecting a function to copy, fax, scan to email, scan to server or change apparatus setting, and input of selecting an option for the corresponding function that can be performed in the image forming apparatus 200. Here, the user may either input only one function or a plurality of functions. Although it was explained hereinabove that the functions that can be performed in the image forming apparatus are: to copy, fax, scan to email, scan to server and change apparatus setting and the like, in an embodiment, the same may apply to any other function, if there is any besides the aforementioned functions, that the image forming apparatus supports.

Here, the UI displayed to receive input of the aforementioned functions may include a menu for initiating recording (or a command to generate a work form) and a menu for stopping recording, and any selection of function and the like input after the user presses the menu for initiating recording may be transmitted to the work form generator 140. After the user selects the menu for initiating recording, the user interface 120 may receive input of a name of the work form to be generated.

Further, the UI displayed for the aforementioned inputting of functions may display information on whether or not a recording for generating a work form is being performed, and the UI may also include a menu for displaying a pre-stored work form.

Further, the aforementioned UI may include a record pause menu and a record resume menu, in which case, if the record pause menu is selected, the user's selection of function and the like will not be transmitted to the work form generator 140 that will be explained hereinafter, until the record resume menu is selected.

Further, the user interface 120 receives input of selecting an option related to generating the work form. Specifically, the user interface 120 may receive input of a setting to cancel the work of generating a work form if a predetermined period of time has passed since the menu for initiating recording was input. The user interface 120 may also receive input of a setting for the predetermined period of time.

Therefore, in the case where such a setting is made, if the user had selected the menu for initiating recording but the predetermined period of time has passed without any UI manipulation (or even if there is a UI manipulation), a message requesting the user to select the menu for stopping recording may be displayed.

In an embodiment, in the case where additional time has passed since such a message requesting the user to select the menu for stopping recording was displayed, the operation of generating a work form may be cancelled, or in the case where the pre-determined period of time has passed, the operation of generating a work form may be cancelled without displaying the aforementioned message requesting the user to select the menu for stopping recording.

Further, in the case where a plurality of functions each includes a scanning operation, the user interface 120 may receive input of information on whether or not the script to be used in the scanning operation of each of the plurality of functions is an identical script.

Further, the user interface 120 displays the work form stored, and receives input of selecting one of the displayed work forms. Specifically, the user interface 120 may display a list of work foul's stored in the storage 130 that will be explained hereinafter, and receive input of selecting one of the work forms displayed in the list.

Here, the user interface 120 may display information on each work form's compatibility with the currently pre-selected image forming apparatus. For example, if the currently selected image forming apparatus can only output image in black and white, the user interface 120 may display the work form that requires using color outputs, with an icon such as "!" to indicate that, of the pre-stored work forms, that work form is not compatible with the currently selected image forming apparatus.

In response to a user's selection, the user interface 120 may display the details of the selected work form, and receive input of an editing command regarding the work form. Specifically, the user interface 120 may display the functions and options included in the work form based on a command to display details of the work form.

Here, the user interface 120 may display information on the compatibility of the functions included in the work form and the pre-selected image forming apparatus (that is, whether or not the included functions and options can be performed in the pre-selected image forming apparatus). For example, if the pre-selected image forming apparatus is an apparatus that does not have a scanning function but the selected work form includes a scanning function, the user interface 120 may display that the corresponding function cannot be performed using the icon "!" and the like. Here, the user may edit or delete the displayed function or option.

The user interface 120 receives input of a command to proceed with the selected work form. Specifically, the user interface 120 may receive input of a command for the pre-selected image forming apparatus to perform the selected work form. Although it was explained that in the present embodiment the image forming apparatus is selected first and then the work form is selected, in an embodiment, the work form may be selected first and then the image forming apparatus may be selected later.

When there is a blank field in the selected work form, the user interface 120 may display a message requesting input of a value required in the blank field. It may be, for example, an address of the server in the email to server function, a receiver side telephone area in fax transmission, and a name of the scanned file to be generated in the scan to server function, etc.

In the case where a function or option that cannot be supported by the image forming apparatus 200 is included in the selected work form, the user interface 120 may display to the user that the corresponding function or option of the selected work form cannot be performed. Here, the user interface 120 may display that the corresponding option may be replaced by an option searched in the determiner 150 that will be explained hereinafter, or request the user to modify the option that cannot be proceeded.

When the function that cannot be supported in the selected work form is a main function in that work form, the user interface 120 may display that the work form will be cancelled from proceeding.

Further, the user interface 120 may display a status of progress of a selected work form. For example, in the case where the work form includes a plurality of functions, the user interface 120 may display the status of progress of each function by %.

The work form generator 140 automatically generates a work form based on a series of user manipulations and an order thereof being input on the UI. Specifically, the work form generator 140 may generate a work form based on the manipulating commands and the order thereof input by the user through the UI from between the point when the menu for initiating recording was selected until the point when the menu for stopping recording was selected in a language such as Jason or XML that can be recognized in the terminal apparatus and the image forming apparatus.

Further, the work form generator 140 may generate a work form in consideration of an option related to generating the work form. Specifically, if there is no additional user manipulation for a predetermined period of time after the work form started being generated by selecting of the menu for initiating the work form, the work form generator 140 may cancel the operation of generating the work form that is currently being generated.

Further, the work form generator 140 may combine the scanning operations of each of the plurality of functions and generate a work form based on option information on whether or not the scripts to be used in the scanning operations of the functions are the same script.

For example, in the case where the operations that the user performed after selecting the menu for initiating a work form are scan to email function and scan to server function, these two operations may be performed in two different ways as follows. The first method is to scan script A and send the scanned result of script A to an email and to scan script B and send the scanned result of script B to a server; and the second method is to scan script A and send the scanned result of script A to the email and send the same scanned result of script A to the server.

Therefore, although it was assumed hereinabove that the scripts to be used in the scanning operations are a same script, in an embodiment, the work form generator 140 may generate a work form such that there is no additional modification for the first scan to email function, but that for the second scan to server function, the scan image generated in the former process may be transmitted to the server.

Further, when the pre-stored work form is edited, the work form generator 140 may update the work form according to the user's modification.

The storage 130 stores the generated work form. Further, the storage 130 may store document or print data, and store apparatus information received from the image forming apparatus 200.

The storage 130 may be realized as a storage medium provided inside the electronic apparatus 100 or as an external storage medium, for example, a removable disk such as a USB memory and a web server via a network, etc.

Such an electronic apparatus 100 according to the present embodiment is capable of generating a work form using manipulating operations for controlling functions in the image forming apparatus, thereby improving user convenience.

Hereinabove, a simple configuration of the electronic apparatus 100 was illustrated and explained, but in an embodiment, the electronic apparatus 100 may further include components other than those mentioned above. A detailed configuration of the electronic apparatus 100 will be explained in detail hereinafter with reference to FIG. 3.

Figure 3:
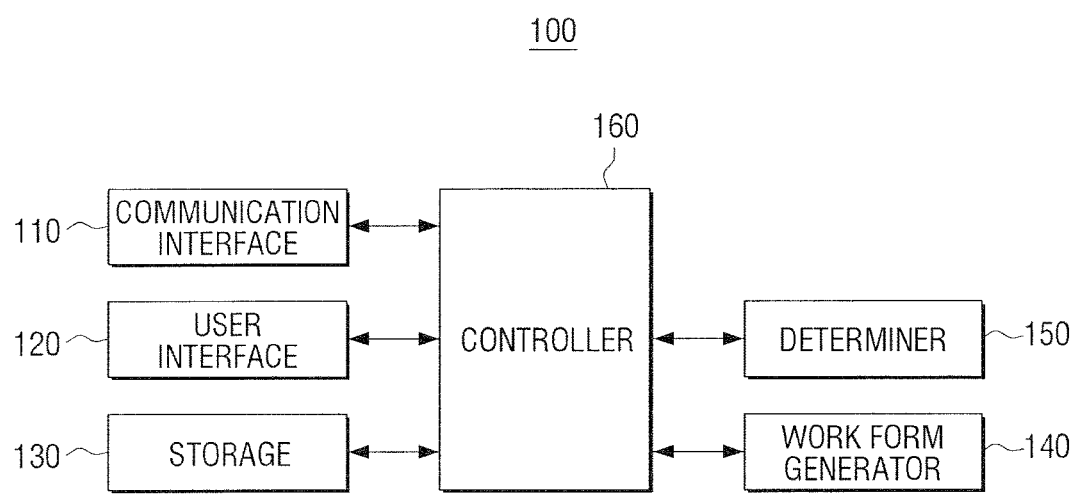
FIG. 3 is a detailed block diagram of an electronic apparatus according to an embodiment of the present disclosure.

FIG. 3 is a block diagram illustrating in detail an electronic apparatus according to an embodiment of the present disclosure.

Referring to FIG. 3, the electronic apparatus 100 may consist of a communication interface 110, a user interface 120, a storage 130, a work form generator 140, a determiner 150 and a controller 160.

Operations of the communication interface 110, the user interface 120, the storage 130 and the work form generator 140 are the same as their corresponding components explained with reference to FIG. 2, and thus repeated explanation will be omitted.

The determiner 150 determines whether or not the work form is executable in the selected image forming apparatus. Specifically, the determiner 150 may obtain apparatus information of the selected image forming apparatus, and determine whether or not the function or the option of the function included in the selected work form is valid in the selected image forming apparatus based on the obtained apparatus information. For example, if the pre-selected image forming apparatus is an apparatus that does not have a scanning function but the selected work form includes a scanning function, it may be determined that an invalid function or option is included.

Further, if the selected work form includes a function or option that cannot be performed in the selected image forming apparatus, the determiner 150 may search for a function or option that can substitute for that function or option.

For example, if the selected work form includes a function of printing with a color print option but the selected image forming apparatus is not capable of such color printing option, the determiner 150 may search for a black and white printing option as an option to substitute for the color printing option. Further, if the selected work form includes a scan to server function but it is impossible to access the server, the determiner 150 may search for a scan to email function as an option to substitute for the scan to server function.

Further, the determiner 150 may control the user interface 120 only to display the fact that the function or option included in the work form cannot be performed instead of directly displaying a function or option that can substitute for the function or option in the work form, and receive input of selecting a function or option that can substitute for the function or option by the user. Meanwhile, the substitutable function or option searched in the aforementioned process may be provided to the user as a function or option that can substitute for the previous function or option.

The controller 160 controls each configuration provided in the electronic apparatus 100. Specifically, upon receiving from the user a command to run an application to control the image forming apparatus, the controller 160 may control the user interface 120 to display a UI for controlling driving of the image forming apparatus.

Further, when the menu for initiating recording is selected on the UI displayed, the controller 160 may control the work form generator 140 to generate a work form based on the manipulating commands and order thereof being input by the user from the time point when the menu for initiating recording is selected until the time point the menu for stopping recording is selected.

Further, upon receiving input of a command to execute the pre-stored work form, the controller 160 may control the determiner 150 to determine whether or not the selected work form can be executed in the pre-selected image forming apparatus, and if determined executable, the controller 160 may control the communication interface 110 to transmit the control command corresponding to the work form to the image forming apparatus 200. Here, the control command being transmitted is a control command that can be recognized by the corresponding image forming apparatus 200. That is, a command for a work form generated by manipulating an apparatus called A may not be a command that can be recognized in an apparatus called B. Therefore, in the present embodiment, the command may be converted into a command that can be recognized in the corresponding apparatus when executing the work form.

Although it was explained hereinabove that in the present embodiment the electronic apparatus 100 generates a work form with commands that can be interpreted in the subject image forming apparatus and transmits the same, such an operation may be performed in the image forming apparatus 200 instead.

That is, the controller 160 may be configured to transmit a work form to the image forming apparatus 200 when a command to execute the work form is input, and parse the work form transmitted to the image forming apparatus 200 to perform the function included in the work form.

Such an electronic apparatus 100 according to the present embodiment is able to generate a work form using only the manipulating operations for controlling functions of an image forming apparatus, and may thus generate the work form easily. Further, since the electronic apparatus 100 generates the work form based on the user's manipulating commands, the generated work form can easily be used in multiple devices.

Although it was explained, with reference to FIG. 3, that the electronic apparatus 100 generates work forms only, and therefore only controls corresponding image forming apparatuses, in an embodiment, the electronic apparatus 100 may perform operations of generating an operating group of a plurality of image forming apparatuses capable of performing a virtualized group operation. Such an example will be explained hereinafter with reference to FIG. 32. Hereinafter, for convenience of explanation, an electronic apparatus for generating an operation group will be referred to as a mobile apparatus, but the mobile apparatus may be referred to as an electronic apparatus.

Figure 4:
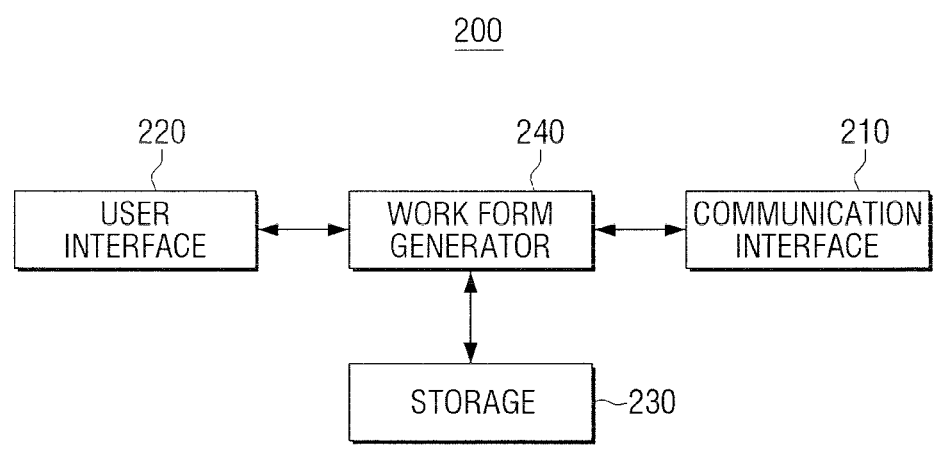
FIG. 4 is a schematic block diagram of an image forming apparatus according to an embodiment of the present disclosure.

FIG. 4 is a block diagram schematically illustrating an image forming apparatus according to an embodiment of the present disclosure.

Referring to FIG. 4, the image forming apparatus 200 according to an embodiment may consist of a communication interface 210, a user interface 220, a storage 230 and a work form generator 240.

Here, the image forming apparatus 200 may be a copy machine, a printer, a facsimile, or a multi-function peripheral (MFP) configured to provide functions of a copy, a printer and a facsimile through one apparatus.

The communication interface 210 is formed to connect the image forming apparatus 200 with an external apparatus, and may be configured in a form accessible via a Local Area Network (LAN), Internet, a Universal Serial Bus (USB) port or a wireless module. Here, the wireless module may be WiFi, WiFi Direct, NFC, Bluetooth, IR or the like.

The communication interface 210 searches for a connectable electronic apparatus 100 or another image forming apparatus 200-2 nearby that it can connect to. Further, the communication interface 210 receives apparatus information on the other image forming apparatus searched. Specifically, the communication interface 210 may receive information on the other connectable image forming apparatus nearby that has been searched, or information on the other image forming apparatus selected by the user.

Here, the apparatus information may include address information (IP address, MAC information and the like necessary for connecting with the image forming apparatus), function information (information on functions that the image forming apparatus supports such as whether or not color printing is possible, whether or not scanning is possible and the like) and status information (whether or not an operation can be done, whether or not an error occurred, how much operation is done, etc.) of the image forming apparatus.

Further, when a work form is selected, the communication interface 210 may transmit a control command corresponding to the work form to 'the other image forming apparatus to perform the work form'. Here, the control command is a command that can be recognized by the other image forming apparatus that can perform the work form. Although it was explained that in the present embodiment the command corresponding to the work form is transmitted to the image forming apparatus, in an embodiment, the work form itself may be transmitted to the image forming apparatus instead.

Further, the communication interface 210 receives print data. Here, the print data may be data of a printer language such as Postscript (PS), Printer Control Language (PCL) and the like, and if the image foliating apparatus 200 supports direct Language (PCL) and the like, and if the image forming apparatus 200 supports direct printing, the print data may be a file of PDF, XPS, BMP, JPG, itself.

Further, the communication interface 210 transmits the work form. Specifically, in order to share with other apparatuses the work form generated in the work form generator 240 that will be explained hereinafter, the communication interface 210 may transmit the generated work form to the electronic apparatus, another image forming apparatus, the management server, etc. Further, the communication interface 210 may receive a work form generated in another apparatus as well.

The user interface 220 is provided with numerous function keys by which the user can set or select various functions that the image forming apparatus 200 supports, and the user interface 220 may display a variety of information that the image forming apparatus 200 provides. The user interface 220 may be configured as an apparatus where both an input and an output can be performed, such as a touch screen, etc., or as an apparatus of a mouse and a monitor combined.

The user interface 220 displays a UI for controlling the functions of the image forming apparatus 200. The user may input a control command for controlling the functions of the image forming apparatus 200 through the UI displayed.

Here, the user interface 220 may receive input of selecting a function: copy, fax, scan to email, scan to server, and change apparatus setting, and of selecting an option for the corresponding functions.

Here, the user may input only one function or a plurality of functions. Although it was explained hereinabove that the functions that can be performed in the image forming apparatus are: to copy, fax, scan to email, scan to server and change apparatus setting and the like, in an embodiment, the same may apply to any other function, if there is any besides the aforementioned functions, that the image forming apparatus supports.

Further, the UI displayed to receive input of selecting the aforementioned functions may include a menu for initiating recording (or a command to generate a work form) and a menu for stopping recording. Any selection of function and the like input after the user presses the menu for initiating recording may be transmitted to the work form generator 240 that will be explained hereinafter. After the user selects the menu for initiating recording, the user interface 220 may receive input of a name of the work form to be generated.

Further, the UI displayed to receive inputs of selecting the aforementioned functions may display information on whether or not a recording for generating a work form is in progress, and may include a menu for displaying a pre-stored work form.

Further, the user interface 220 receives options related to generating a work form. Specifically, the user interface 220 may receive input of settings configured such that the work form generating operation may be cancelled if a pre-determined period of time has passed since the menu for initiating recording was input, and also inputs of settings for the aforementioned pre-determined period of time.

Therefore, in the case where such settings are made, if the pre-determined period of time has passed with no manipulation of the UI (or even if there is a manipulation of the UI) since the user selected the menu for initiating recording, a message requesting the user to select the menu for stopping recording may be displayed.

However, in an embodiment, the work form generating operation may be cancelled if additional period of time has passed since such a message was displayed, or the work form generating operation may be cancelled even without the message being displayed once the pre-determined period of time has passed.

Further, in the case where a plurality of functions each includes a scanning operation, the user interface 220 may receive input of information on whether or not the scripts to be used in the plurality of functions are identical to one another.

Further, the user interface 220 displays the work forms stored, and receives selecting of one of the work forms displayed. Specifically, the user interface 220 may display a list of the work forms stored in the storage 230 that will be explained hereinafter, and receive selecting of one of the work forms from the list.

Here, the user interface 220 may display information on compatibility of each work form with the current image forming apparatus. For example, in the case where the current image forming apparatus 200 is an apparatus that can only perform outputting operations in black and white, the user interface 220 may indicate that, of the pre-stored work forms, the work form requiring color printing is not compatible with the current image forming apparatus by displaying an icon such as "!".

Further, if the user inputs a command to display details on the work form, the user interface 220 may display the functions and options of the functions included in the corresponding work form. In this situation, the user interface 220 may receive input of a command to edit the subject work form, and receive modifications on the functions and options thereof included in the subject work form. When a user's command to end the modification is input thereafter, the subject work form may be updated to the modified functions and options thereof.

Further, the user interface 220 receives selecting of the image forming apparatus to perform the work form. In the case where the user wants a work form to be performed in another image forming apparatus and thus inputs a search command, the user interface 220 may display a list of other connectable image forming apparatuses, and receive selecting of one of those image forming apparatuses.

Here, user interface 220 may display information on compatibility of the functions included in a pre-selected work form with the other selected image forming apparatus (that is, whether or not the functions included in the pre-selected work form and options thereof can be performed in the other selected image forming apparatus). For example, if the selected image forming apparatus does not have a scanning function but the selected work form includes a scanning function, the user interface 220 may indicate that the scanning function cannot be performed using an icon such as "!". Here, the user may perform editing and deleting of the displayed functions and options thereof.

The user interface 220 receives a command to proceed with the selected work form. Specifically, the user interface 220 may receive selecting of a work form only and receive a command for the current image forming apparatus 200 to execute the work form; or receive selecting of a work form and another image forming apparatus and receive a command for the other image forming apparatus to execute the work form.

If there is a blank field in the selected work form, the user interface 220 may display a message requesting input of a value required in the blank field. The value required in the blank field may be an area of support that the user may input in the editing process after generating the work form, for example, an address of the server in the function of email to server, a telephone area at receiver's side in fax transmission, and a name of the scanned file to be generated in the scan to server function, etc.

In the case where a selected work form includes a function or option that the image forming apparatus 200 does not support, the user interface 220 may display to the user that the function or option of the subject work form cannot be performed. Here, the user interface 220 may display that the option may be substituted by an option searched by the determiner 250 that will be explained hereinafter, or request the user to modify the option that cannot proceed.

In the case where the function that the image forming apparatus 200 does not support is the main function of the selected work form, the user interface 220 may display that the subject work form may be cancelled from proceeding.

Further the user interface 220 may display a status of progress of a selected work form. For example, in the case where the work form includes a plurality of functions, the user interface 220 may display the stage of progress of each function in percentages (%).

The work form generator 240 automatically generates a work form based on a series of user manipulations and an order thereof being input into the UI. Specifically, the work form generator 240 may generate the work form with a language such as Jason and XML, that are recognizable by the image forming apparatus, based on the manipulation commands and orders thereof that the user input through the UI since the time point when the menu for initiating recording was selected until the time point the menu for stopping recording is selected.

Further, the work form generator 240 may generate a work form in consideration of options related to generating a work form. Specifically, when there is no additional manipulation by the user for a pre-determined period of time since a work form generating operation was started by selecting a menu for initiating a work form, the work form generator 240 may cancel the current operation of generating a work form.

Further, based on option information on whether or not scripts to be used in the scanning operations of the plurality of functions are identical to one another, the work form generator 240 may combine the scanning operations of the plurality of functions and generate a work form.

For example, in the case where the operations performed by the user after selecting the menu for initiating a work form were cyan to email and scan to server, these two operations may have been performed in the following two methods: first is to scan script A and transmit the scanned result of script A via email and scan script B and transmit the scanned result of script B to a server; and second, to scan script A and transmit the scanned result of script A via email and transmit the same scanned result of script A to the server.

Therefore, although it was explained hereinabove that the scripts to be used in the scanning operations are an identical script, it is possible to generate a work form such that no modification is made on the first scan to email function, but such that for the second scan to server function the scanned image of the previous process can be transmitted to the server without an additional scanning operation.

Further, when a pre-stored work form is edited, the work form generator 240 may update the work form in response to the user's modification.

The storage 230 stores the generated work form. Further, the storage 230 may store document and print data.

The storage 230 may be configured as a storage medium provided inside the image forming apparatus 200, or as an external storage medium, for example, a removable disk such as a USB memory, or a web server via a network, etc.

As aforementioned, the image forming apparatus according to the present embodiment can generate a work form using manipulating operations for controlling functions of the image forming apparatus, thereby improving user convenience.

Hereinabove, a simple configuration of the image forming apparatus 200 was illustrated and explained, but the image forming apparatus 200 may further include configurations besides those aforementioned. A more detailed configuration of the image foil ling apparatus 200 will be explained hereinafter with reference to FIG. 5.

Figure 5:
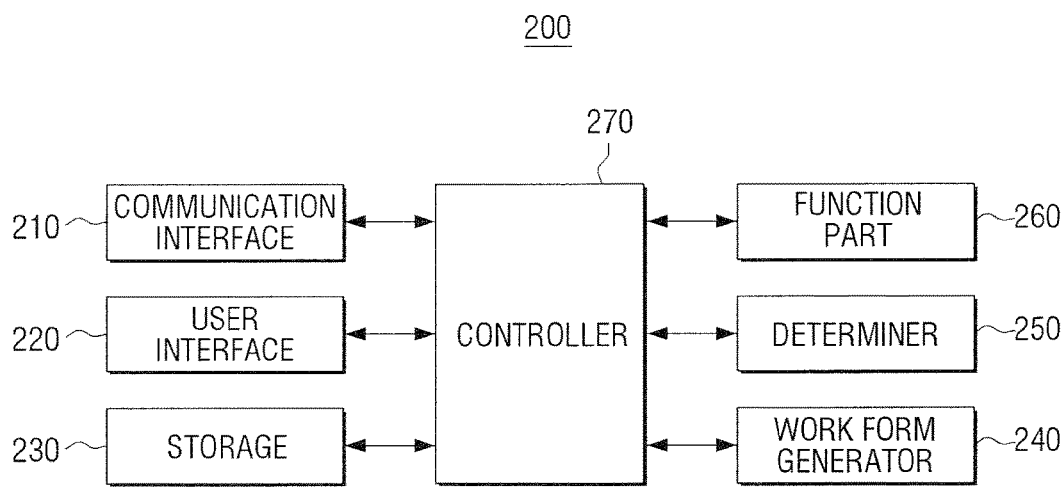
FIG. 5 is a detailed block diagram of an image forming apparatus according to an embodiment of the present disclosure.

FIG. 5 is a block diagram illustrating in detail an image forming apparatus according to an embodiment of the present disclosure.

Referring to FIG. 5, the image forming apparatus 200 may consist of a communication interface 210, a user interface 220, a storage 230, a work form generator 240, a determiner 250, a function portion 260 and a controller 270.

Operations of the communication interface 210, the user interface 220, the storage 230, and the work form generator 240 are the same as those explained hereinabove with reference to FIG. 4, and thus repeated explanation will be omitted.

The determiner 250 determines whether or not a work form is executable in an image forming apparatus. Specifically, the determiner 250 may determine whether or not a function or option thereof included in a selected work form is valid in the current image forming apparatus. For example, in the case where the image forming apparatus 200 does not have a scanning function but the selected work form includes a scanning function, the determiner 250 may determine that an invalid function is included. In the case where the user selected another image forming apparatus to perform a work form, the determiner 250 may determine whether or not the currently selected work form can be executed in the pre-selected other image forming apparatus.

Further, in the case where the selected work form includes a function or option that cannot be performed in the selected image forming apparatus, the determiner 250 may search for a function and option that can substitute for the subject function and option.

For example, in the case where the selected work form includes printing having a color print option but the selected image forming apparatus is an apparatus that cannot perform color printing, the determiner 250 may search for a black and white option as an option that can substitute for the color print option. Further, in the case where the selected work form includes a scan to server function but it is impossible to access the server, the determiner 250 may search for a scan to email function as a function that can substitute for the scan to email function.

Further, the determiner 250 may control the user interface 220 not to directly display a substitutable function or option, but to display only that it is impossible to perform the function or option included in the work form, and receive selecting of a substitutable function or option by the user. The function and option searched as substitutable function and option in the aforementioned process may be provided to the user as a function and option that can be changed to.

The function portion 260 performs a pre-set function. Specifically, the function portion 260 may be an image former configured to output print data, and in the case where the image forming apparatus 200 supports a fax function such as transmitting fax and receiving fax the function portion 760 may include a fax processor. Further, in the case where the image forming apparatus 200 supports a scanning function, the function portion 260 may include a scan processor capable of performing the scanning function. Further, in the case where the image forming apparatus 200 is a multi-function peripheral that can process the aforementioned multiple functions, the image forming apparatus may include an image former, a fax processor and a scan processor, etc.

The controller 270 controls each configuration inside the image forming apparatus 200. Specifically, the controller 270 may control the user interface 220 such that the UI for receiving input of a driving control command may be received from the user, and when a driving control command is input from the UI, the controller 270 may control the function portion 260 to perform a function based on the driving control command.

Further, when the menu for initiating recording is selected from the UI displayed, the controller 270 may control the work form generator 240 such that a work form is generated based on manipulating commands and orders input by the user since the menu for initiating recording until the menu for stopping recording.

Further, when a command to execute a pre-stored work form is input, the controller 270 may control the determiner 250 such that whether or not it is possible to execute a selected work form may be determined, and when it is determined that the subject work form can be executed, the controller 270 may control the function portion 260 such that a function corresponding to the respective work form may be executed.

Such an image forming apparatus 200 according to the present embodiment may generate work form using only the manipulating operations for controlling the functions, and thus may easily generate a work form.

Although it was explained with reference to FIGS. 1 to 5 that the electronic apparatus and image forming apparatus according to the present embodiment may generate a work form while performing certain functions, in an embodiment, a control command may not be transmitted to the image forming apparatus, or a function may not be actually performed in the image forming apparatus, so that the aforementioned operations are performed for only generating a work form.

Further, although it was explained hereinabove with reference to FIGS. 4 and 5 that the image forming apparatus 200 only performs information provision and performs operations using a work form being transmitted, but it can also be configured to belong to one operation group with another image forming apparatus to perform a virtualized group operation. This will be explained hereinafter with reference to FIGS. 30 and 31. Hereinafter, for convenience of explanation, the electronic apparatus for generating an operation group will be referred to as a mobile apparatus, but the mobile apparatus may be referred to as an electronic apparatus.

Figure 6:
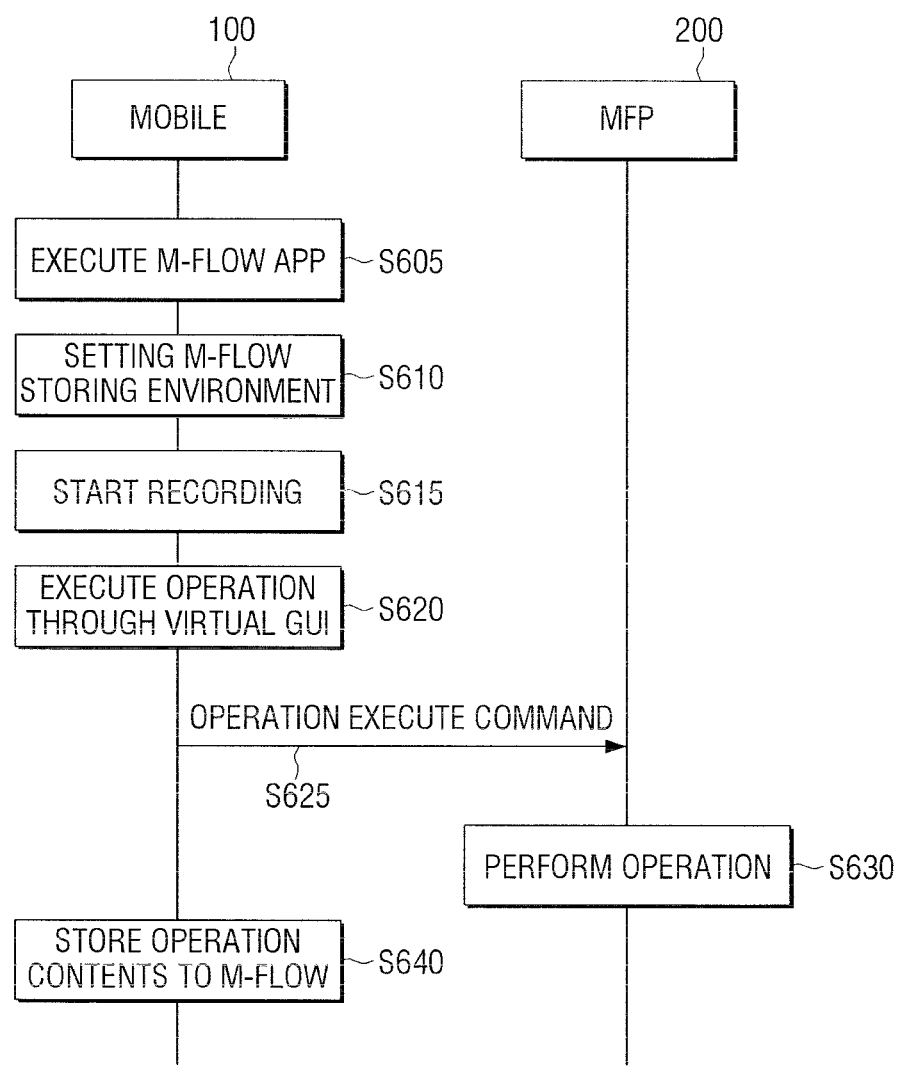
FIG. 6 is a sequence view provided to explain a method for generating a work form according to an embodiment of the present disclosure.

FIG. 6 is a sequence view provided to explain a method for generating a work form according to an embodiment of the present disclosure.

Referring to FIG. 6, first of all, an electronic apparatus 100 runs an application for controlling the operation of the image forming apparatus 200 (S605). As the application is run, the electronic apparatus 100 displays a UI for receiving selecting of the function to be performed in an image forming apparatus such as that illustrated in FIG. 9.

Then, the electronic apparatus 100 receives settings for an option related to generating a work form (S610). Specifically, the electronic apparatus 100 may display a UI for receiving the settings for the option related to generating a work form such as that illustrated in FIG. 21, and may receive the settings of the option related to generating a work form through the subject UI. Such setting operations may operate only when selected by the user.

Further, when a command to initiate recording is input into the UI displayed (S615), a user manipulating command input after the command for initiating recording may be recorded.

Further, a control command for controlling the operation of the image forming apparatus 200 is input through the UI (S620). Further, the control command input is transmitted to the image forming apparatus 200 (S625).

The image forming apparatus 200 that received the control command performs a function corresponding to the control command (S630).

After a series of control commands are input into the displayed UI, when the menu for stopping recording is selected, a work form is generated based on the series of control commands input since the time point the menu for initiating recording was selected until the menu for stopping recording is selected (S640).

Such a method for generating a work form according to the present embodiment of the present disclosure is capable of generating the work form using manipulating operations for controlling the functions of the image forming apparatus, and thus user convenience is improved. The method for generating a work form such as in FIG. 6 may be implemented in an electronic apparatus having a configuration of FIG. 2 or FIG. 3, or may be implemented in an electronic apparatus having other configurations. Further, operations excluding the aforementioned step 625 may be executed in an image forming apparatus having the configuration of FIG. 4 or FIG. 5, or in an image forming apparatus having other configurations.

Further, such a method for generating a work form mentioned above may be realized as a program that includes an algorithm that can be implemented in a computer, and the program may be stored in and provided through a non-transitory computer readable medium.

A non-transitory computer readable medium refers to a medium that can be read by an apparatus and that stores data semi-permanently, unlike a medium such as a register, a memory and the like that stores data for a short period of time. Specifically, various applications or programs mentioned above may be stores in and provided through a non-transitory readable medium such as a CD, a DVD, a hard disk, a blue-ray disk, a USB, a memory card and a ROM, etc.

Figure 7:
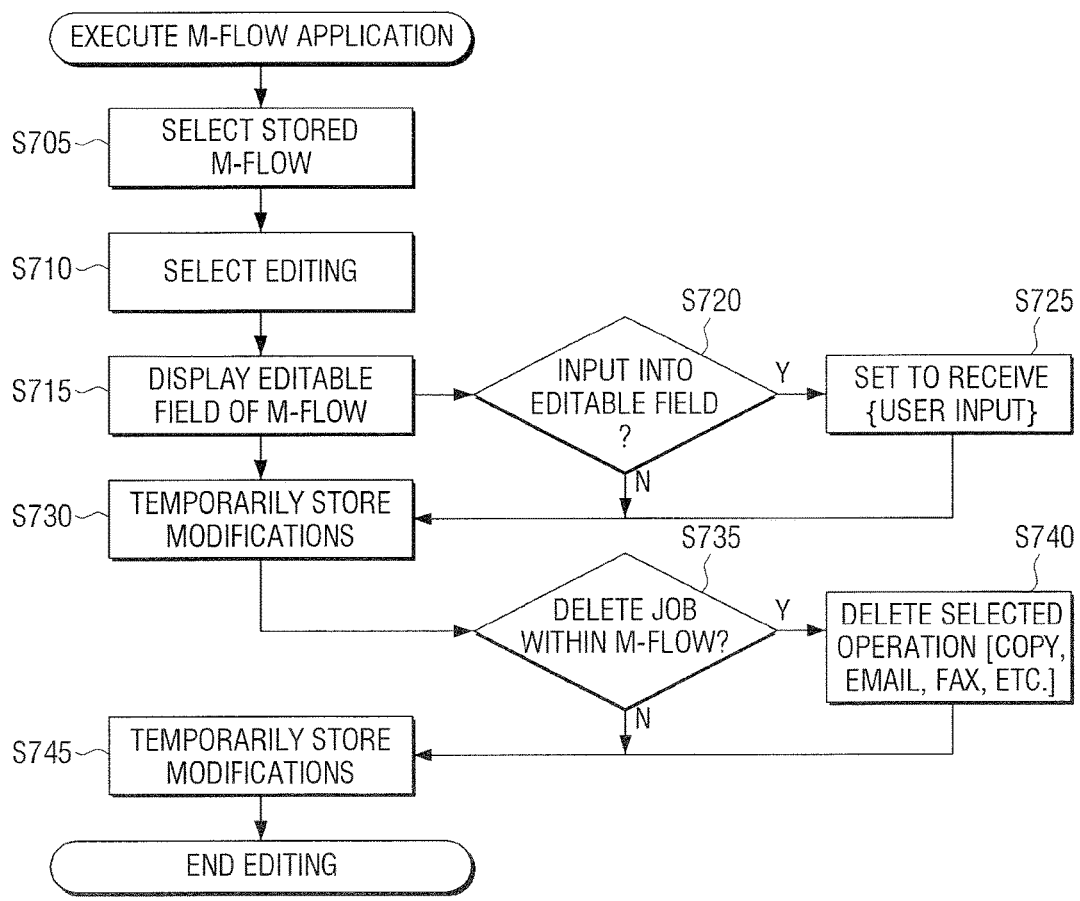
FIG. 7 is a view provided to explain a method for editing a work form according to an embodiment of the present disclosure.

FIG. 7 is a view provided to explain a method for editing a work form according to an embodiment of the present disclosure.

Figure 20:
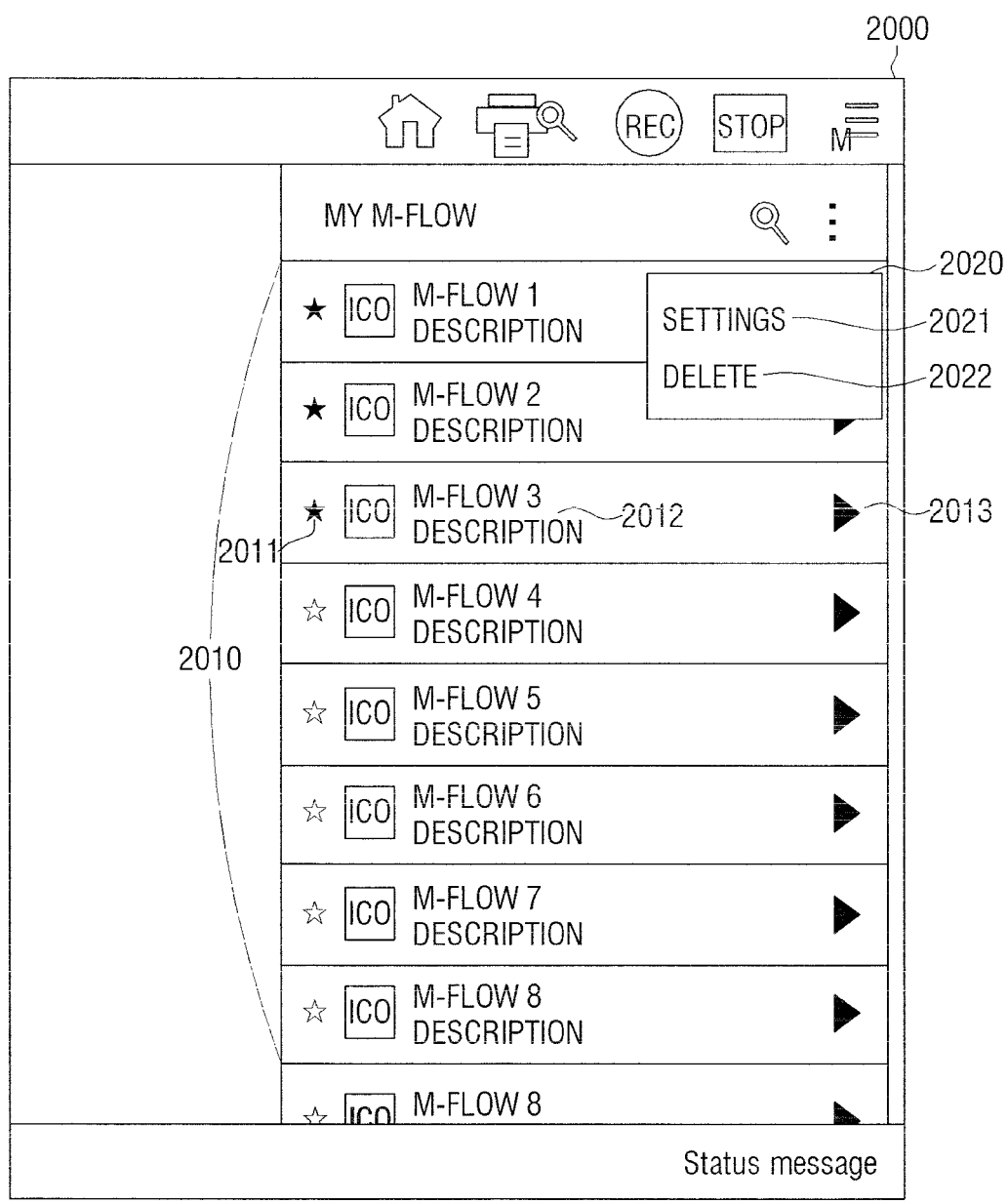

Referring to FIG. 7, when a command to display a work form is input into the UI, a list of pre-stored work forms is displayed as illustrated in FIG. 20. The user may select a work form from the list displayed and edit the selected work form (S705, S710).

When an editing command is input, an editable field of the subject work form is displayed (S715). Here, an option of a certain function may have been set in blank, in which case the option may be modified to the field being input by the user when executing the work form (S720, S725, S730).

Further, a command to delete a certain function itself may be input by the user, in which case the work form may be modified to a form where the subject function has been deleted (S735, S740, S750).

As aforementioned, a method for editing a work form according to the present embodiment may easily edit a pre-generated work form by deleting a function or an option and the like therefrom. The method for editing a work form as illustrated in FIG. 7 may be executed in an electronic apparatus having the configuration of FIG. 2 or FIG. 3, and in an electronic apparatus having other configurations. Further, the aforementioned operation may be executed in an image forming apparatus having the configuration of FIG. 4 or FIG. 5, and in an image forming apparatus having other configurations.

Further, the method for editing a work form as aforementioned may be realized as a program that includes an algorithm executable in a computer, and the program may be stored in and provided through a non-transitory computer readable medium.

Figure 8:
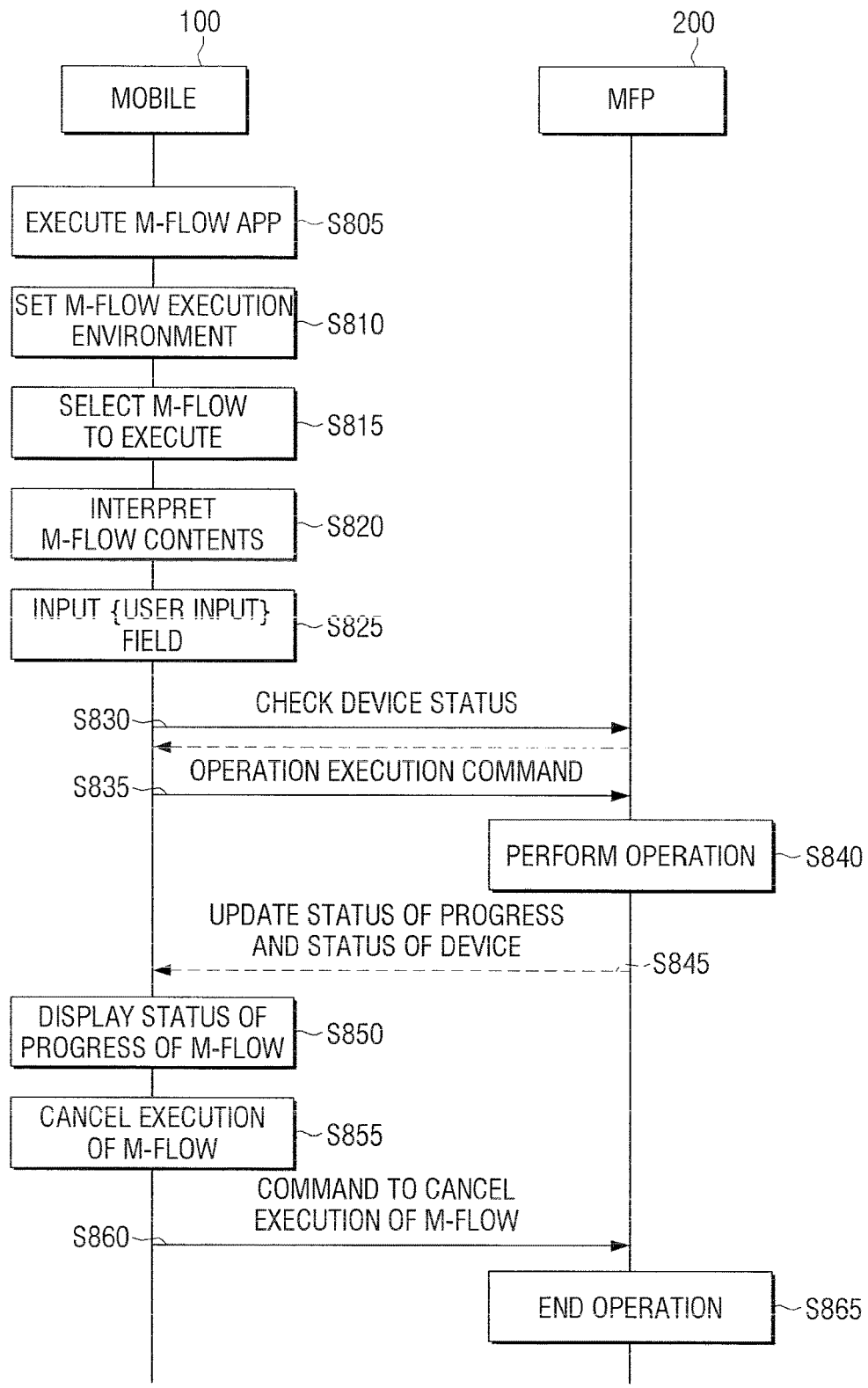
FIG. 8 is a view provided to explain a method for executing a work form according to an embodiment of the present disclosure.

FIG. 8 is a view provided to explain a method for executing a work form according to an embodiment of the present disclosure.

Referring to FIG. 8, first of all, the electronic apparatus 100 runs an application for controlling driving of the image forming apparatus 200 (S805). As the application is run, the electronic apparatus 100 displays a UI such as that illustrated in FIG. 9 for receiving selecting of a function to be performed in the image forming apparatus.

Thereafter, the electronic apparatus 100 receives settings for an option related to executing the work form (S810). Specifically, the electronic apparatus 100 may display a UI such as that illustrated in FIG. 21 for receiving settings for the option related to executing the work form, and receive settings for the option related to executing the work form through the UI. Such a setting operation may only operate when selected by the user.

Further, when a command to display the work form is input into the displayed UI, a list of pre-stored work forms may be displayed, and a work form may be selected from the displayed list (S815).

When the work form is selected, contents of the subject work form are interpreted (S820), and it is checked whether or not there is a blank field in the work form, and if there is a blank field, a request is made to the user to input a value into the field, whereby the value may be input (S825). Then, the operation is initiated depending on whether or not the subject work form can be performed in the selected image forming apparatus (S830, S835).

The image forming apparatus 200 that received a control command corresponding to the work form performs an operation (S840), and notifies the electronic apparatus 100 of the operation process (S845).

The electronic apparatus 100 displays a status of progress of the operation (S850). When a command to cancel execution of the work form is input by the user during the operation (S855), the electronic apparatus 100 notifies the image forming apparatus 200 of the cancellation of the function corresponding to the work form (S860), and the image forming apparatus that received that notification ends the subject function (S865).

As aforementioned, a method for executing a work form according to the present embodiment uses a work form generated through the user's manipulating operations for controlling the functions, and thus the user may easily use an identical work form in a plurality of apparatuses. The work form execution method as that illustrated in FIG. 8 may be executed in an electronic apparatus having the configuration of FIG. 2 or FIG. 3, and in an electronic apparatus having other configurations. Further, operations with steps 830, 835 and 845 excluded may be executed in the image forming apparatus having the configuration of FIG. 4 or FIG. 5, and in the image forming apparatus having other configurations.

Further, the aforementioned work form generating method may be realized as a program that includes an algorithm that may be executed in a computer, and the program may be stored in and provided through a non-transitory computer readable medium.

Hereinabove, although operations of an electronic apparatus were explained separately as the operation for generating a work form, the operation for editing a work form and the operation for executing a work form, each operation may be connected organically. For example, an operation of generating a work form and an operation of executing a work form may be performed together, and an editing operation and an executing operation may be performed together. Therefore, the aforementioned operation of generating a work form, the operation of editing a work form and the operation of executing a work form may be integrated and referred to as a print control method.

Hereinafter, the operations of generating/editing/executing a work form mentioned above will be explained based on a user interface window that may actually be displayed in an electronic apparatus.

FIGS. 9 to 26 are views illustrating examples of the user interface window that may be displayed in the electronic apparatus.

Figure 9:
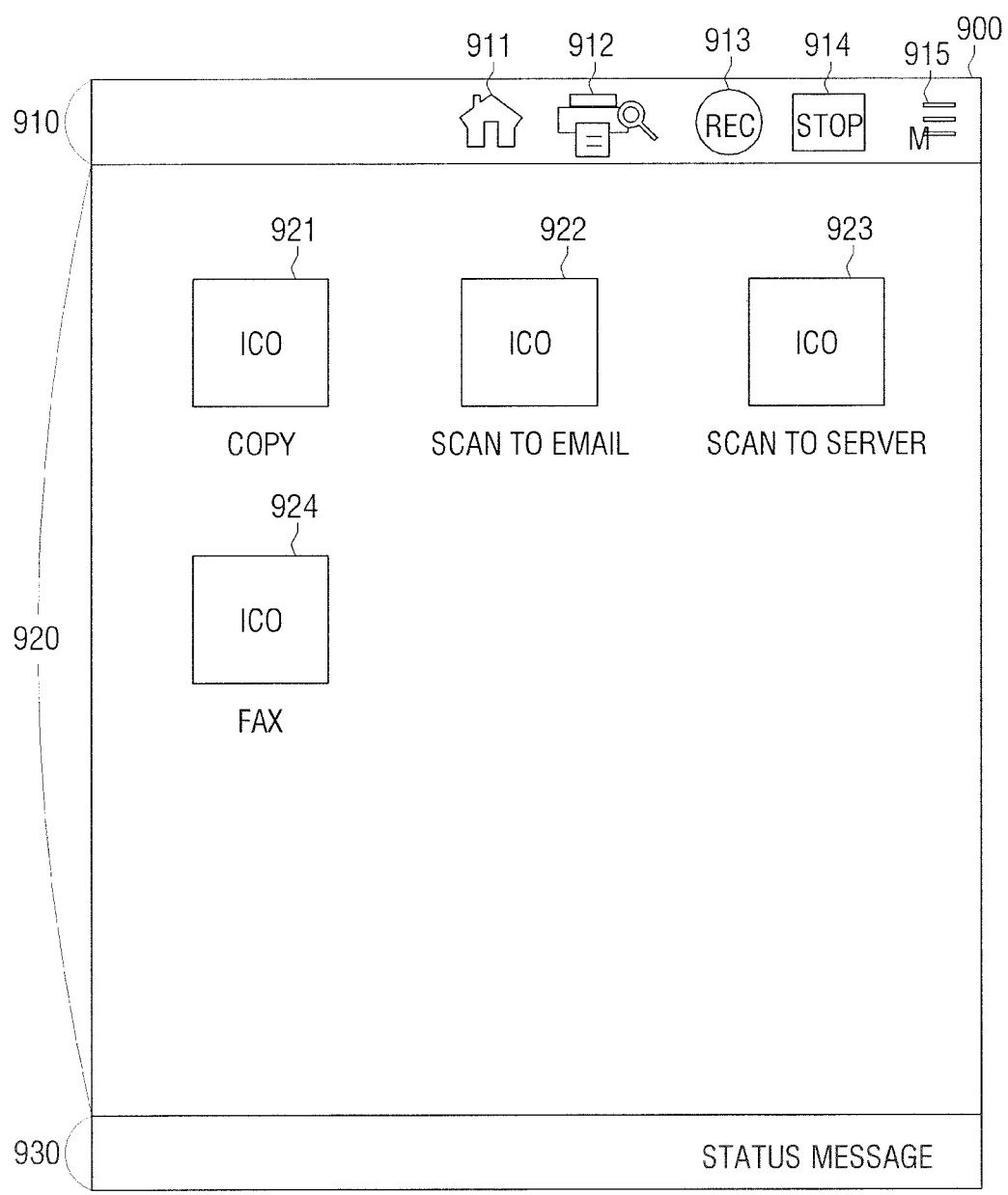

Specifically, FIG. 9 is a view illustrating an example of a user interface window that may be displayed initially in the case where an application for controlling driving of the image forming apparatus 200 is run.

Referring to FIG. 9, the user interface window 900 includes a menu area 910, a function area 920 and a status display area 930.

The menu area 910 is an area that displays a menu for generating a work form and a menu for executing a work form and the like. The menu area 910 includes a home menu 911, a menu for selecting an image forming apparatus 912, a menu for initiating recording 913, a menu for stopping recording 914 and a list menu 915.

The home menu 911 is an area for receiving input of a command to display a UI as that illustrated in FIG. 9. When the user selects the home menu 911, even when the contents as those illustrated in FIG. 9 in display on the function area 920, the screen changes to that illustrated in FIG. 9.

The menu for selecting an image forming apparatus 912 is an area for receiving input of a command to search for an image forming apparatus for controlling a function or for performing a work form. When the user selects the menu for selecting an image forming apparatus 912, a user interface window as that illustrated in FIG. 10 may be displayed.

The menu for initiating recording 913 is an area for receiving input of a command to initiate recording for generating a work form. When the user selects the menu for initiating recording 913, a user interface window for receiving input of a name of a new work form being created as that illustrated in FIG. 11 may be displayed.

The menu for stopping recording is an area for receiving a command to end recording of generating a work form. When the user selects the menu for stopping recording 914 after selecting the menu for initiating recording 913, the operation of generating a work form ends. This menu for stopping recording 914 is not activated until the menu for initiating recording 913 is selected.

The list menu 915 is an area for receiving input of a command to display a list of pre-stored work forms. When the user selects the list menu 915, a user interface window as that illustrated in FIG. 20 may be displayed.

The function area 920 is an area that displays the functions that can be displayed by an image forming apparatus. The function area 920 includes a copy area 921, a scan to email area 922, a scan to server area 923, and a fax area 924. Although it is illustrated in the present embodiment that only four functions are being supported, depending on the functions of the image forming apparatus that is connected, the number and types of icons being displayed on the function area 920 may vary.

The copy area 921 is an area for receiving input of a copying function as the function to be performed by the image forming apparatus. When the user selects the copy area 921, a user interface window for receiving selecting of an option related to the copying function as that illustrated in FIG. 13 may be displayed.

The scan to email area 922 is an area for receiving selecting of a scan to email function as the function to be performed by the image forming apparatus. When the user selects the scan to email area 922, a user interface window for receiving selecting of an option related to the scan to email function as that illustrated in FIG. 14 may be displayed.

The scan to server area 923 is an area for receiving selecting of a scan to server function as the function to be performed by the image forming apparatus. When the user selects the scan to server area 923, a user interface window for receiving selecting of an option related to the scan to server function as that illustrated in FIG. 15 may be displayed.

The fax area 924 is an area for receiving selecting of a fax function as the function to be performed by the image forming apparatus. When the user selects the fax area 924, a user interface window for receiving selecting of an option related to the fax function as that illustrated in FIG. 17 may be displayed.

The status display area 930 displays an operating status of the electronic apparatus 100. Specifically, when the status of the electronic apparatus 100 is a status where the menu for initiating recording for generating a work form has been selected, the status display area 930 may display a recording status, and when the recording ends, the status display area 930 may display that the recording ended.

Figure 10:
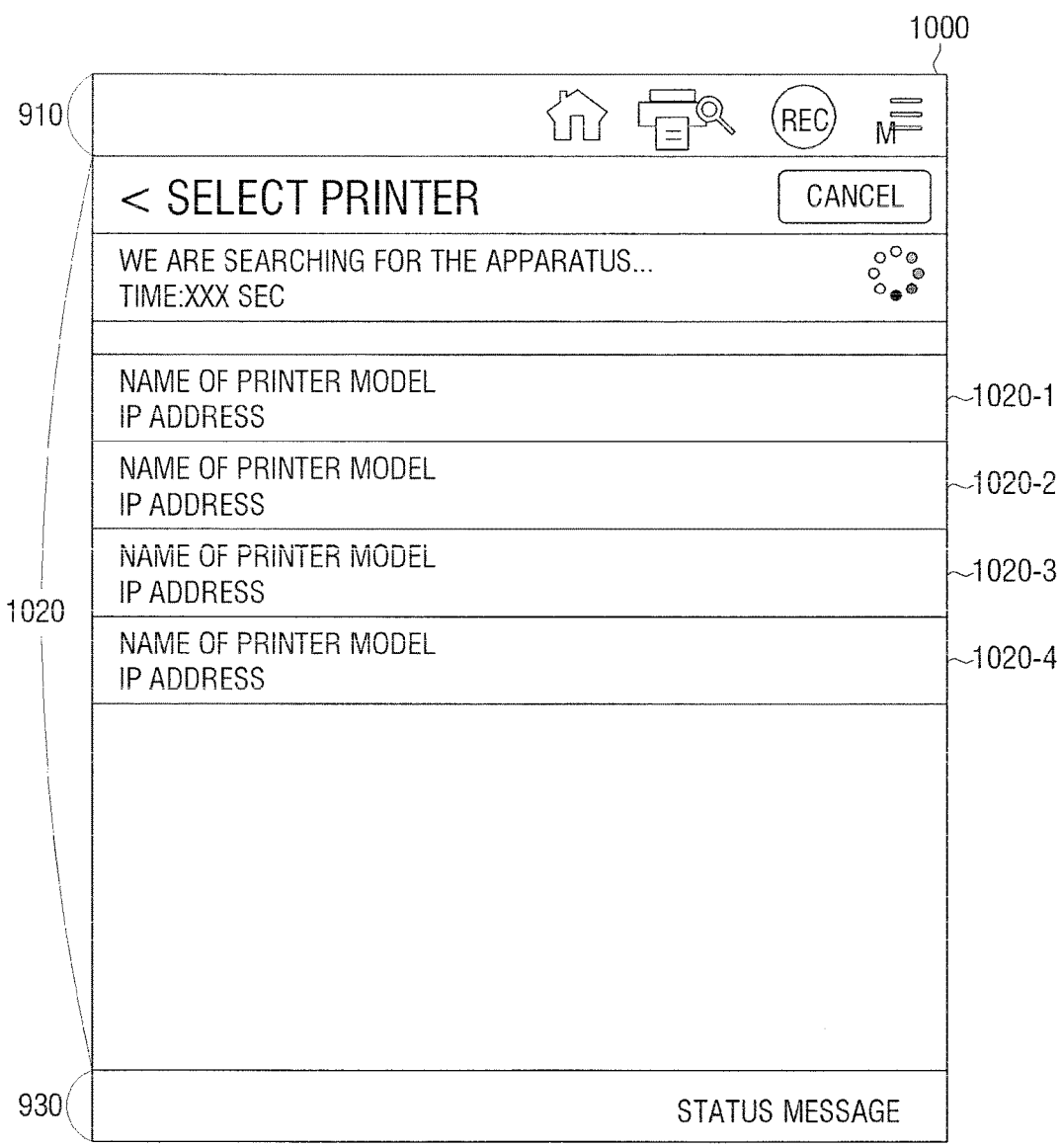

FIG. 10 is a view illustrating an example of a user interface window that may be displayed when the menu for selecting an image forming apparatus of FIG. 9 is selected.

Referring to FIG. 10, the user interface window 1000 includes a menu area 910, a result display area 1020 and a status display area 930.

The result display area 1020 is an area that displays a list of searched image forming apparatuses. Here, the result display area 1020 may display model names and IP addresses of the searched image forming apparatuses. For example, in the illustrated example, four image forming apparatuses 1020-1, 1020-2, 1020-3, 1020-4 were searched, and of these four image forming apparatuses, the user may select one.

When the user selects an image forming apparatus 1020-4 from the four image forming apparatuses displayed, the electronic apparatus 100 may request for apparatus information of the subject image forming apparatus 1020-4 to the subject image forming apparatus 1020-4 and receive the apparatus information. In an embodiment, the operation of receiving the apparatus information may be performed before the user selects an image forming apparatus.

Further, the function area 920 may be configured to change such that icons only corresponding to the functions that the subject image forming apparatus 1020-4 supports are displayed.

Figure 11:
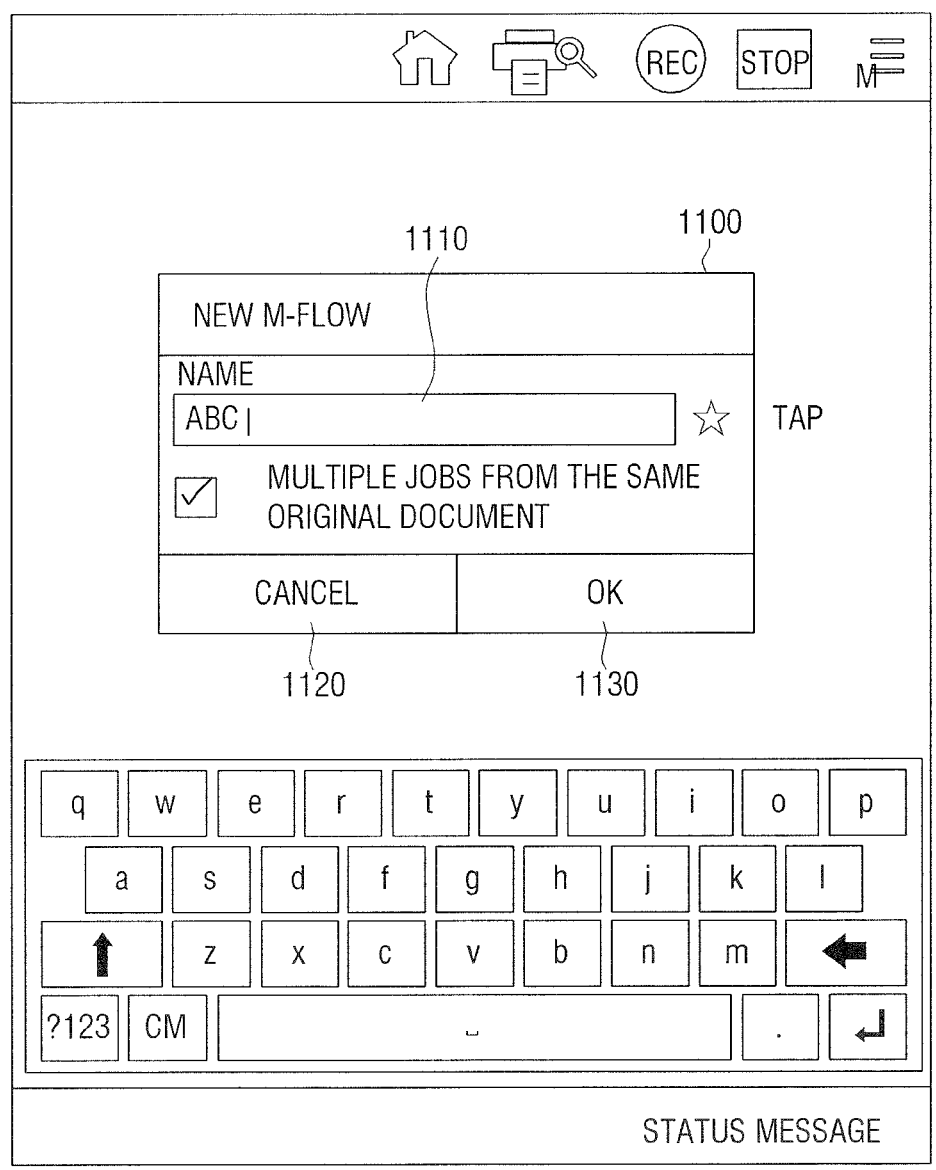

FIG. 11 is a view illustrating an example of a user interface window that may be displayed when the menu for initiating recording 913 of FIG. 9 is selected.

Referring to FIG. 11, the user interface window 1100 includes an input area 1110 for receiving input of a name of a new work form, a work form cancellation area 1120 and a confirmation area 1130.

The input area 1110 is an area for receiving input of a user's name of the new work form. The user may click a star-shaped icon that is next to the input area 1110 to select whether or not the subject work form is a frequently used work form.

The cancellation area 1120 is an area for receiving input of a command to cancel generating a work form.

The confirmation area 1130 is an area for receiving confirmation for generating a work form in the name that is input. If there is a pre-generated and pre-stored name that is identical to the name of the work form that the user just input, when the user selects the configuration area 1130, the electronic apparatus 100 may request that the user input another name for the work form. If the input name of the work form is appropriate, the electronic apparatus 100 may display a user interface window as that illustrated in FIG. 12.

Figure 12:
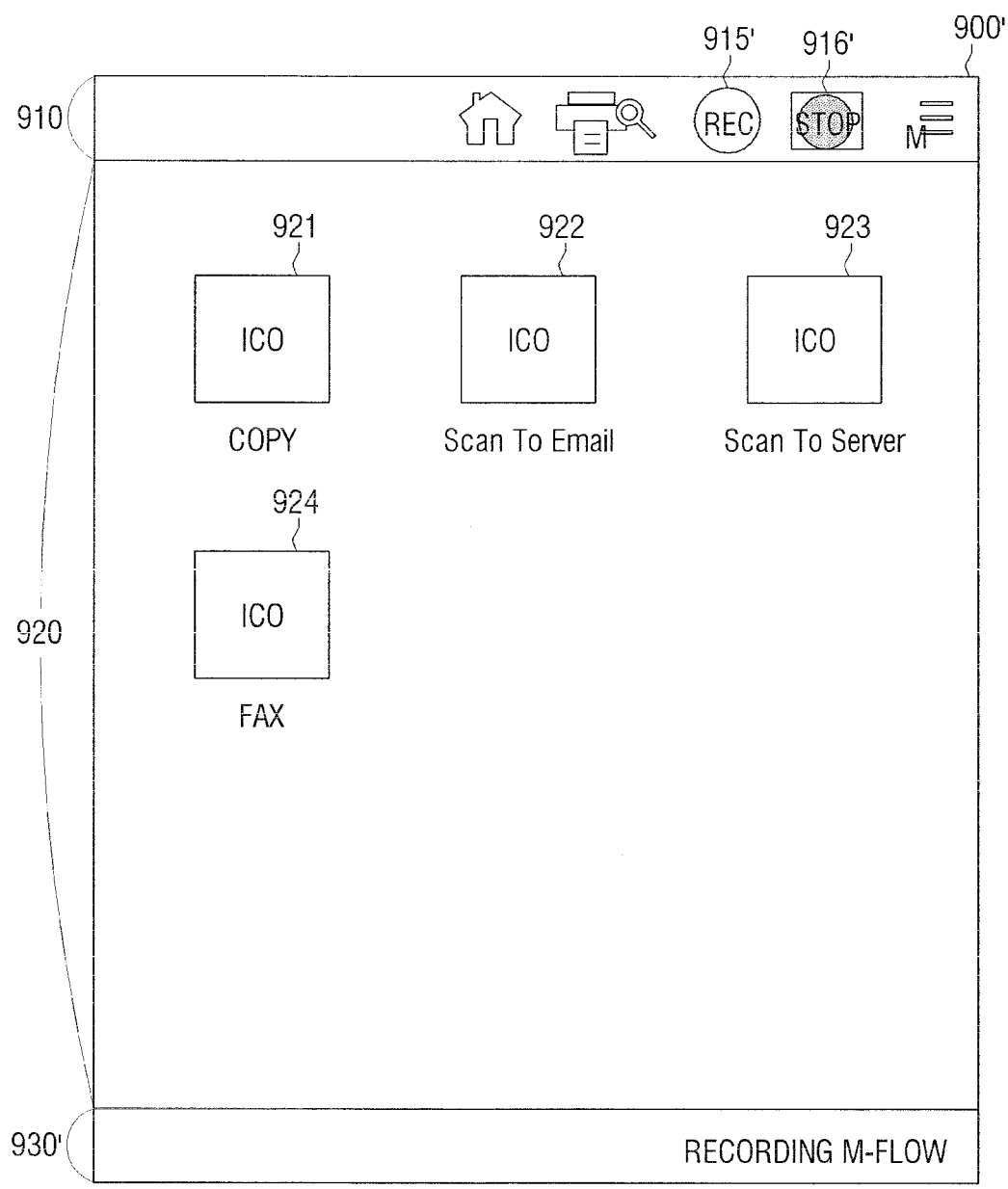

FIG. 12 is a view illustrating an example of a user interface window that may be displayed when the confirmation area 1130 of FIG. 11 is selected.

Comparing FIG. 9 and FIG. 12, the menu for initiating recording 913', the menu for stopping recording 914' and the status display area 930 of the user interface window 900' have changed.

Specifically, the menu for initiating recording 913' is inactivated, and the menu for stopping recording 914' is activated. Further, the status display area 930 displays that generating a work form is proceeding.

After such generating of work form is proceeded, the user may select an icon displayed in the function area 920 and proceed with controlling functions and generating the work form of the image forming apparatus. Examples of a user interface window for each function will be explained later on with reference to FIGS. 13 to 17.

Figure 18:
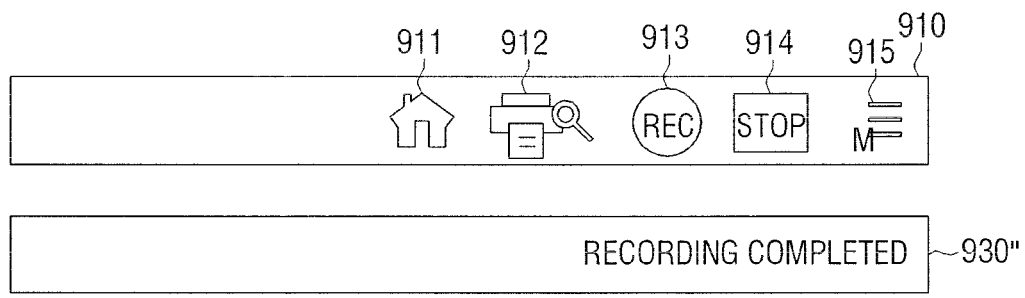

Then, when the user completes inputting all the control commands and selects the menu for stopping recording 914', the electronic apparatus 100 displays a user interface window as that illustrated in FIG. 18.

Figure 19:
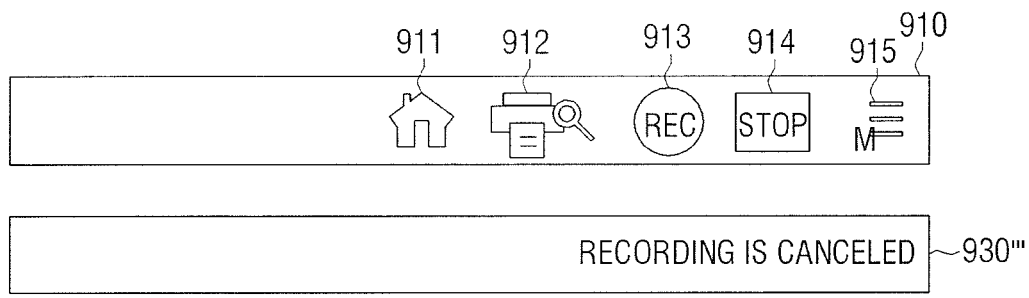

However, if a pre-determined period of time has passed without an input of a control command since the screen as that of FIG. 12 was displayed, the electronic apparatus 100 may display a user interface window as that in FIG. 19.

Figure 13:
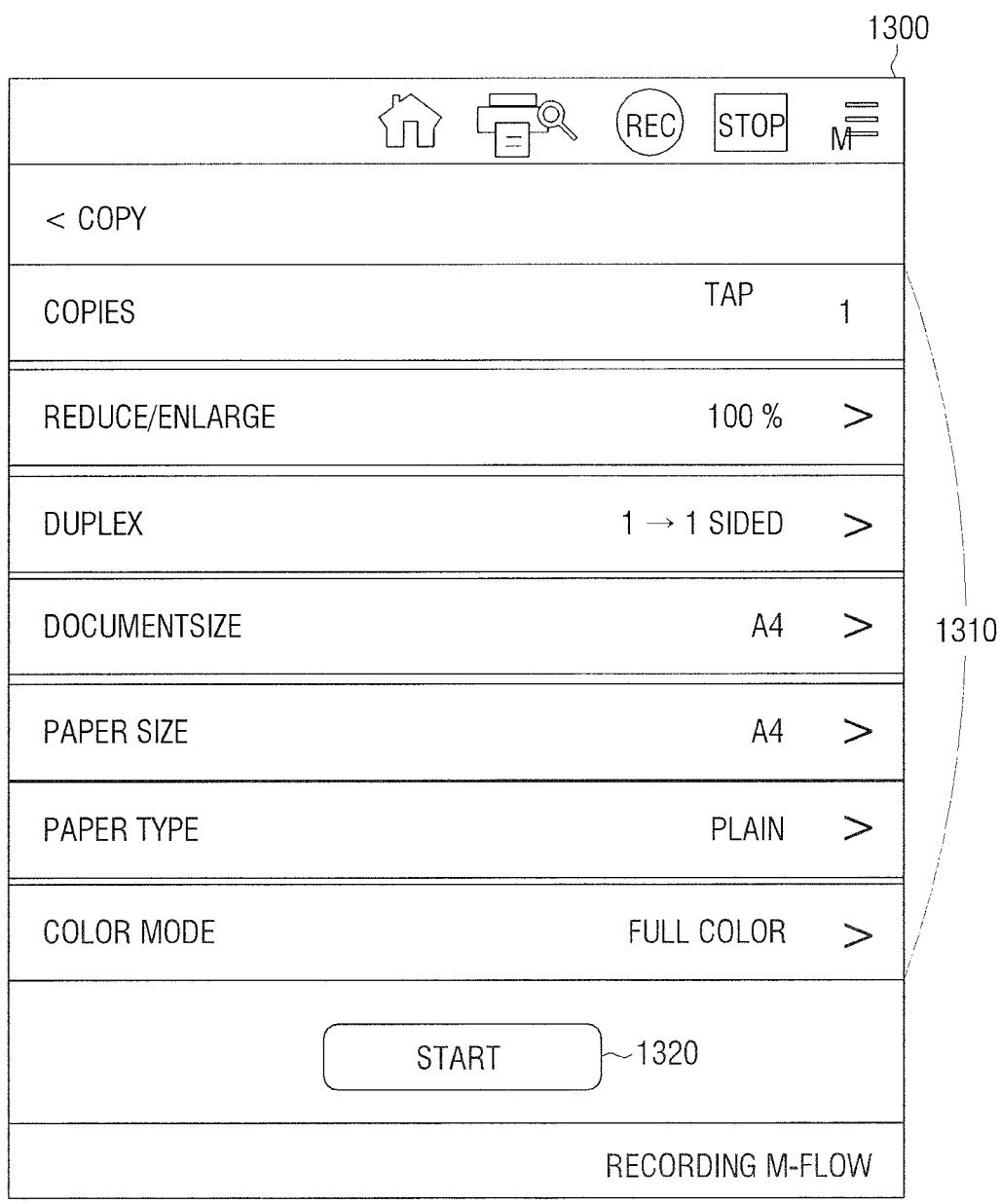

FIG. 13 is a view illustrating an example of a user interface window that may be displayed when the copy area 921 of FIG. 9 is selected.

Referring to FIG. 13, the user interface window 1300 includes a plurality of option areas 1310 for receiving input of options related to the copying function and a selection complete area 1320.

The option area 1310 is an area for receiving settings for printing options including: number of copies, reduce/enlarge option, whether or not to make two-sided copies, document size, paper size, paper type and whether or not to print in color, etc. At first, option values set as default are displayed. The user may select an area of an option that needs to be changed and change the option value.

For example, if the user wants to change the number of copies, the user may click the number of copies area, in which case a number key input UI for receiving selecting of a number of copies may be displayed to receive input of a wanted number of copies. Further, if the user wants to change the paper type, the electronic apparatus 100 may display a list of types of paper that can be selected in the currently selected image forming apparatus, and the user may select one them.

The selection complete area 1320 is an area for receiving confirmation to perform a copying function based on the options displayed in the option area 1310. When the user selects the selection complete area 1320, the electronic apparatus 100 transmits a command to copy to the image forming apparatus 200 such that a copying operation may be performed based on the selected options, and returns to the user interface window as that illustrated in FIG. 12.

Figure 14:
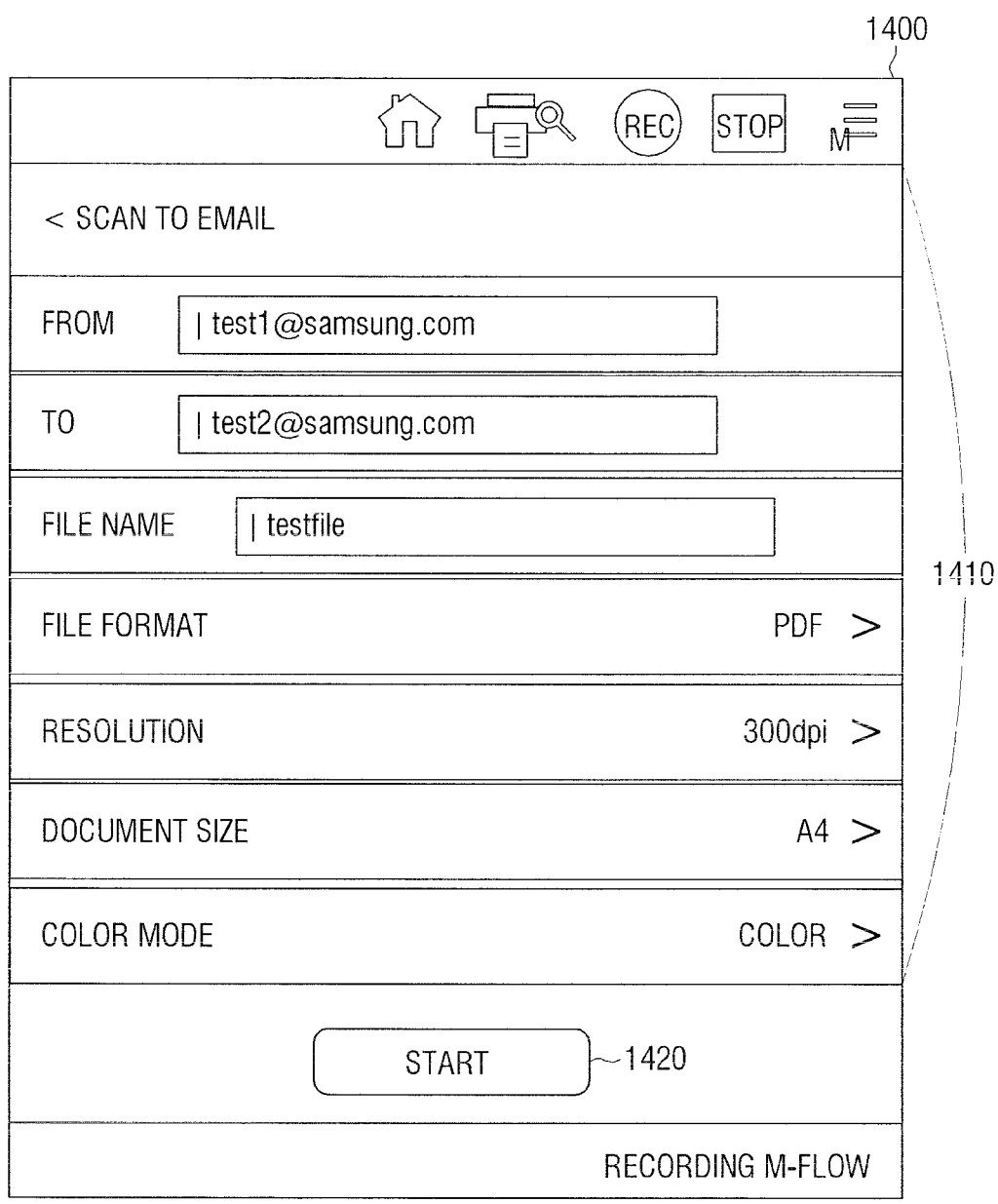

FIG. 14 is a view illustrating an example of a user interface window that may be displayed when the scan to email area 922 of FIG. 9 is selected.

Referring to FIG. 14, the user interface window 1400 includes a plurality of option areas 1410 for receiving input of options related to the scan to email function, and a selection complete area 1420.

The option area 1410 is an area for receiving settings for options necessary for performing the scan to email function, including: address of the person sending, the scanned material, address of the receiver, name of attached file, file format type (for example, PDF, JPEG, TIFF), scanning resolution (for example, 600 dpi, 300 dpi), document size (for example, A4, letter) and whether or not to print in color (for example, mono, gray, color). At first, option values set as default are displayed, and the address of the person sending the scanned material, address of the receiver and the name of attached file exist in blank (or has a pre-determined address or a name value). The user may then input the address of the sender, the address of the receiver and the name of the attached file, and select options that need to be changed, and change the option values.

For example, when the user wants to change the address of the sender and clicks the sender's address area, the electronic apparatus 100 may display a qwerty keyboard UI for receiving input of address information, and may receive input of the address information therethrough.

However, in an embodiment, the user may edit, on a work form generated, any one of the sender's address, the receiver's address and the file name in blank, and input the user's address or name when executing the work form instead of the address and name at the time of generating the work form.

The selection complete area 1420 is an area for receiving confirmation to perform a scan to email function based on the options displayed in the option area 1410. When the user selects the selection complete area 1420, the electronic apparatus 100 transmits a command to scan and transmit via email to the image forming apparatus 200 such that a scan to email operation may be performed based on the selected options, and returns to the user interface window as that illustrated in FIG. 12.

Figure 15:
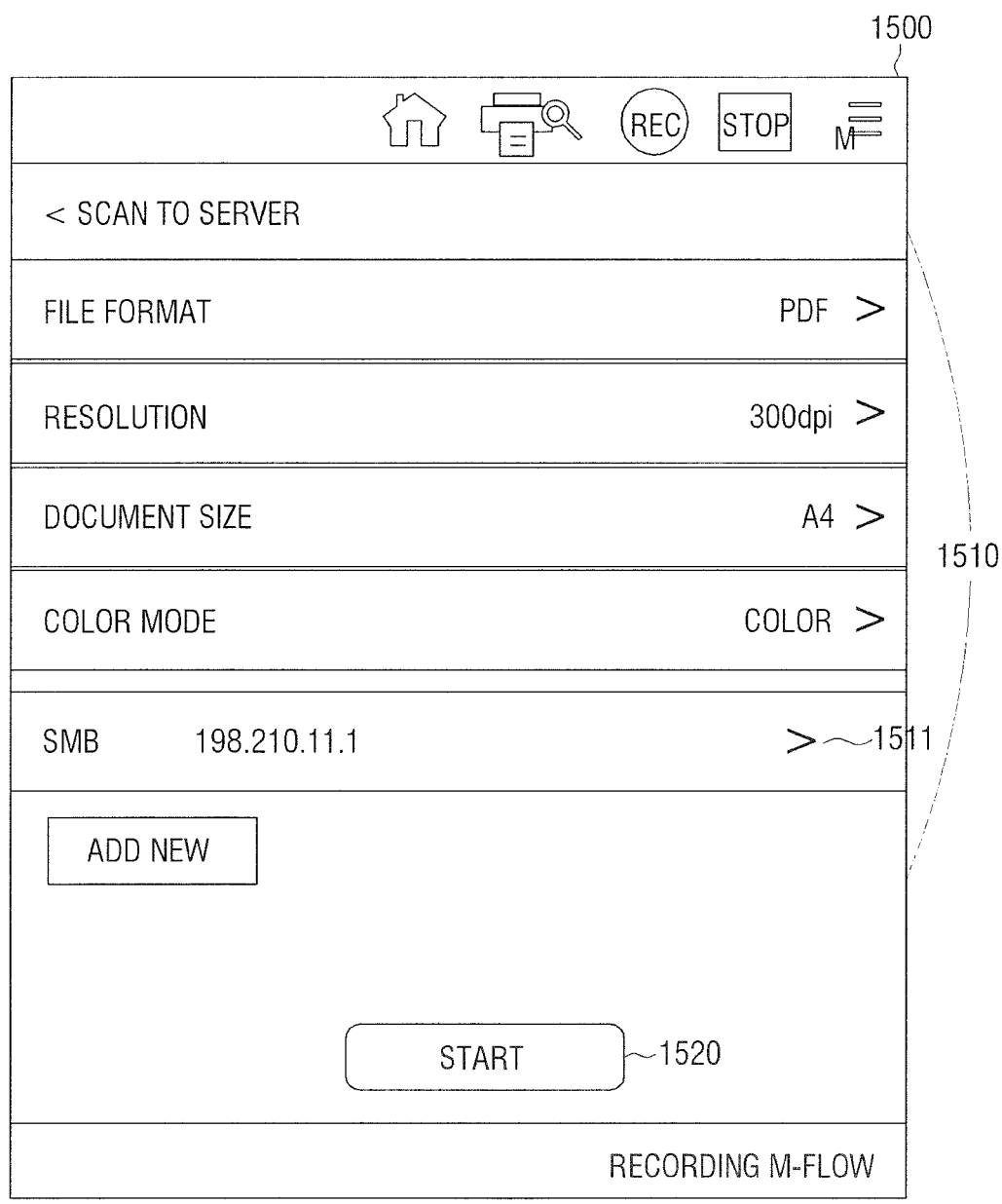

FIG. 15 is a view illustrating an example of a user interface window that may be displayed when the scan to server area 923 of FIG. 9 is selected.

Referring to FIG. 15, the user interface window 1500 includes a plurality of option areas 1510 for receiving input of options related to the scan to server function, and a selection complete area 1520.

The option area 1510 is an area for receiving settings for options necessary for performing the scan to server function, including: format type, scan resolution, document size, whether or not to scan in color and server address (SMB), etc. At first, option values set as default are displayed, and a pre-determined server address is displayed as the SMB.

If the user wants to send the scanned data to a server other than the pre-determined server, the user may select the SMB area 1511 and change the server address information. When the user selects the SMB area 1511, a user interface window as that illustrated in FIG. 16 may be displayed.

The selection complete area 1520 is an area for receiving confirmation to perform a scan to server function based on the options displayed in the option area 1510. When the user selects the selection complete area 1520, the electronic apparatus 100 transmits a command to scan and transmit to a server to the image forming apparatus 200 such that a scan to server operation may be performed based on the selected options, and returns to the user interface window as that illustrated in FIG. 12.

FIG. 15 is a view illustrating an example of a user interface window that may be displayed when the SMB area 1511 of FIG. 15 is selected.

Referring to FIG. 16, the user interface window 1600 includes a plurality of areas for receiving input of settings related to the server address.

The user may find out address information of the current server or change the server address using the displayed area.

Figure 17:
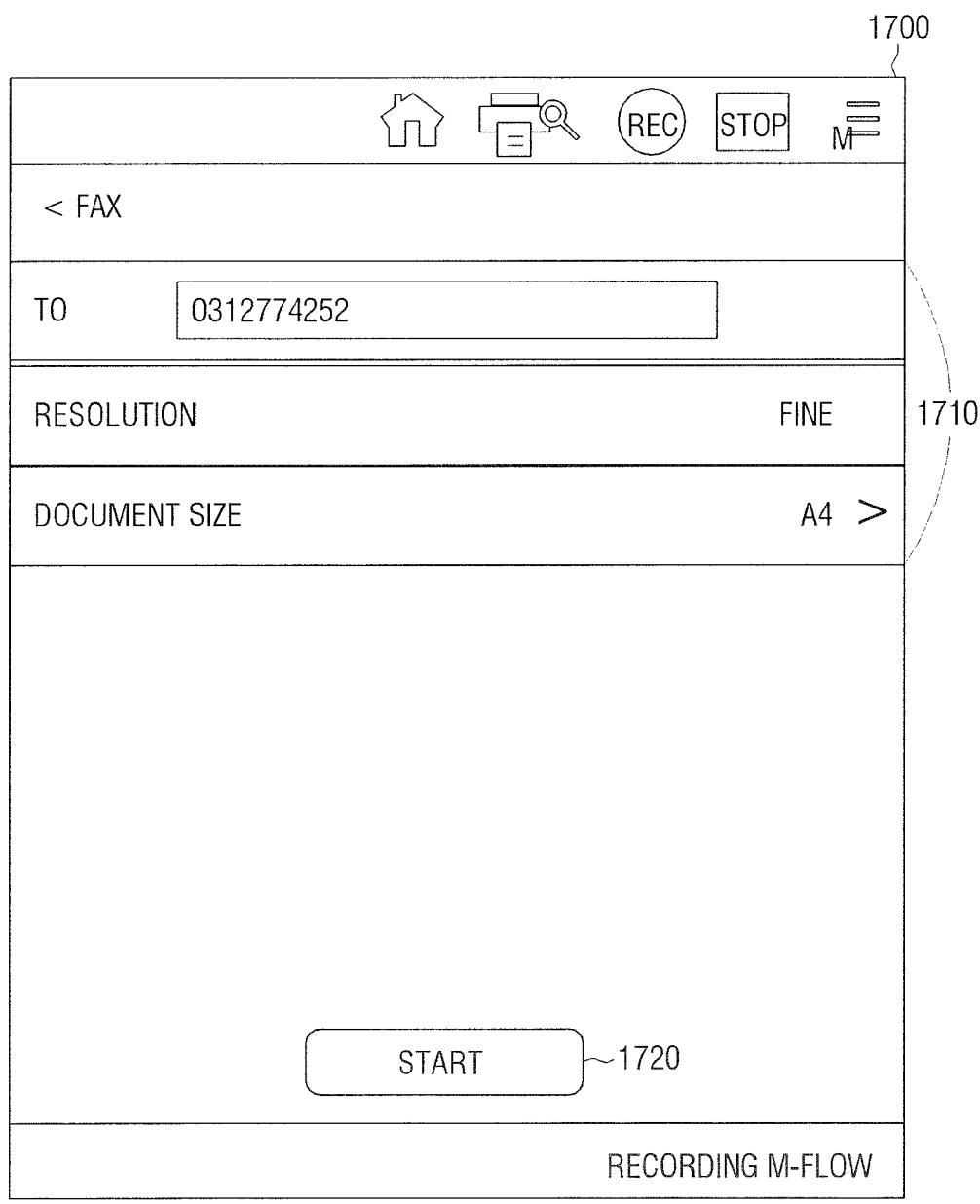

FIG. 17 is a view illustrating an example of a user interface window that may be displayed when the fax area 924 of FIG. 9 is selected.

Referring to FIG. 17, the user interface window 1700 includes a plurality of option areas 1710 for receiving input of options related to the fax function, and a selection complete area 1720.

The option area 1710 is an area for receiving settings for options necessary for performing the fax function, including: receiver's fax number, resolution and document size, etc. At first, option values set as default are displayed, and the receiver's fax number area exists in blank (or has a pre-determined telephone). The user may input a receiver's fax number, and select an option that needs to be changed, and change the option.

For example, if the user wants to change or input a receiver's fax number, and thus clicks the receiver's fax number area, the electronic apparatus 100 may display a number window UI for receiving input of a fax number, and receive input of the receiver's fax number therethrough.

However, in an embodiment, the user may edit, on a work form generated, the receiver's fax number in blank, and input a new tax number when executing the work form instead of the fax number at the time of generating the work form.

The selection complete area 1720 is an area for receiving confirmation to perform a fax function based on the options displayed in the option area 1710. When the user selects the selection complete area 1720, the electronic apparatus 100 transmits a command to fax to the image forming apparatus 200 such that a fax operation may be performed based on the selected options, and returns to the user interface window as that illustrated in FIG. 12.

FIG. 18 is a view illustrating an example of a user interface window that may be displayed when the menu for stopping recording of FIG. 12 is selected.

Comparing FIG. 12 and FIG. 18, the menu for initiating recording 913 is activated, and the menu for stopping recording 914 is inactivated. Further, the status display area 930" displays that generating a work form is completed.

Then, the user interface window of FIG. 18 returns to the initial user interface window of FIG. 9.

FIG. 19 is a view illustrating an example of a user interface window that may be displayed when the user does not input a control command for a pre-determined period of time since the user interface window as those of FIGS. 12 to 17 were displayed.

Comparing FIG. 12 and FIG. 19, the menu for initiating recording 913 is activated, and the menu for stopping recording 914 is inactivated. Further, the status display area 930" displays that generating a work form is cancelled. Then, the user interface window as that illustrated in FIG. 19 returns to the initial user interface window of FIG. 9.

FIG. 20 is a view illustrating an example of a user interface window that may be displayed when the list menu 915 of FIG. 9 is selected.

Referring to FIG. 20, the user interface window 2000 includes a work form display area 2010 displaying pre-stored work forms and a work form option area 2020.

The work form display area 2010 is an area displaying the work forms pre-stored in the electronic apparatus 100, and the work forms may be arranged according to their names, orders of generation and frequency of usage. Such a work form display area 2010 may display the work foul's having clicked star-shaped icons on upper lines of the list. When the user selects one of the displayed work forms, the selected work form may be performed.

Further, if the user wants to check details of operations of a work form, the user may select a triangle displayed next to the work form to check functions and options included in the work form. Supposing the user selected triangle 2013, a user interface window as that illustrated in FIG. 22 may be displayed.

When the user wants to perform one of the work forms displayed in the work form display area 2010 and thus selects the work form, the electronic apparatus 100 transmits a control command corresponding to the subject work form to a pre-selected image forming apparatus 200. If the work form selected by the user is a work form that needs information to be input in order to perform its functions, that is, if the work form is a work form having a blank field, the electronic apparatus 100 may display a user interface window as that illustrated in FIG. 23.

Figure 24:
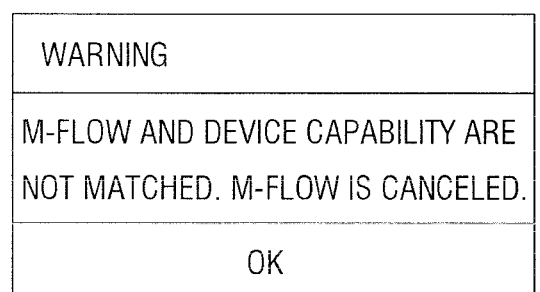

On the other hand, if the function included in the subject work form cannot be performed in the pre-selected image forming apparatus, the electronic apparatus 100 may display a user interface window as that illustrated in FIG. 24.

Further, it is possible to select a plurality of work forms displayed in the work form display area 2010, in which case the electronic apparatus 100 may combine the plurality of work forms to generate one work form.

The work form option area 2020 is an area that may be displayed when three dots arranged in one vertical line below the list menu 915 are selected, the work form option area 2020 includes a setting area 2021 and a delete area 2022.

The setting area 2021 is an area for setting options for generating and executing a work form. When the user selects the setting area 2021, a user interface window as that illustrated in FIG. 21 may be displayed.

The delete area 2022 is a command for deleting a pre-stored work form. When the user selects the delete area 2022, a tab (☐) for receiving selecting of a work form to be deleted is displayed instead of the triangle, and some or all of the plurality of work forms may be deleted using this tab (☐).

Figure 21:
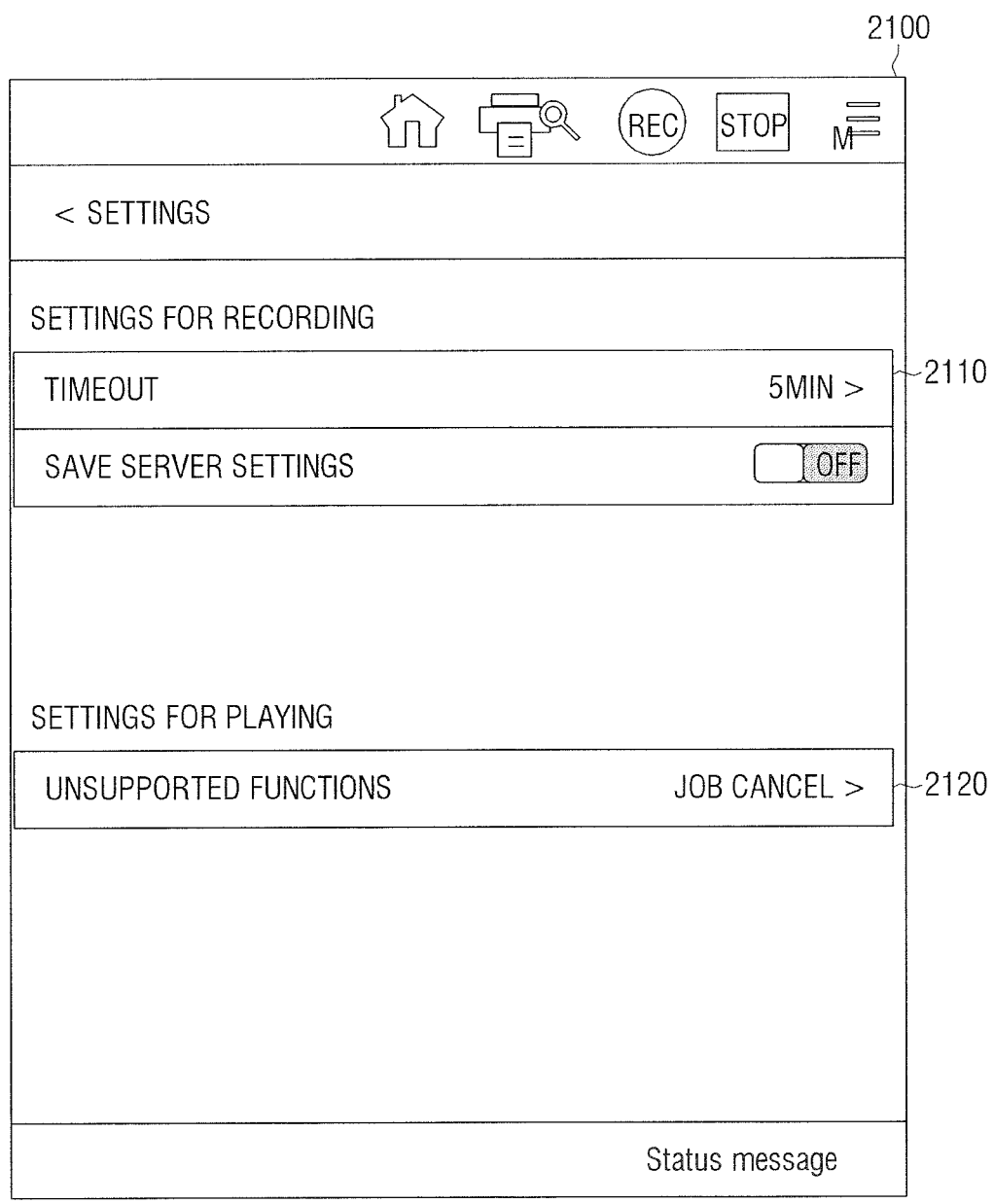

FIG. 21 is a view illustrating an example of a user interface window that may be displayed when the setting area 2021 of FIG. 20 is selected.

Referring to FIG. 21, the user interface window 2100 includes a first area 2110 for receiving input of an option related to generating a work form, and a second area 2120 for receiving input of an option related to executing the work form.

The first area 2110 is an area for receiving input of an option related to generating a work form. It is an area for receiving selecting of a period of a time out since the menu for initiating recording is selected and whether or not to save server information.

For example, the period of time out is an area for receiving selecting of how long after since a command to initiate recording is input the recording should be stopped.

Options of 5 minutes, 10 minutes, 30 minutes, not applied and the like may be included.

Further, the whether or not to save server information is an area for receiving selecting of whether or not to save server information related to performing an operation. If this is turned 'on', SMTP server setting information of the image forming apparatus may be read and recorded in the work form when performing a server to email operation.

The second area 2120 is an area for receiving input of options related to executing a work form, that is, an area for receiving selecting of how to process a case where a function or option thereof included in the work form cannot be performed in the selected image forming apparatus. The second area 2120 may include options such as: operation cancel (to cancel performing the work form), and force process (to perform the work form with the most similar option or function).

Figure 22:
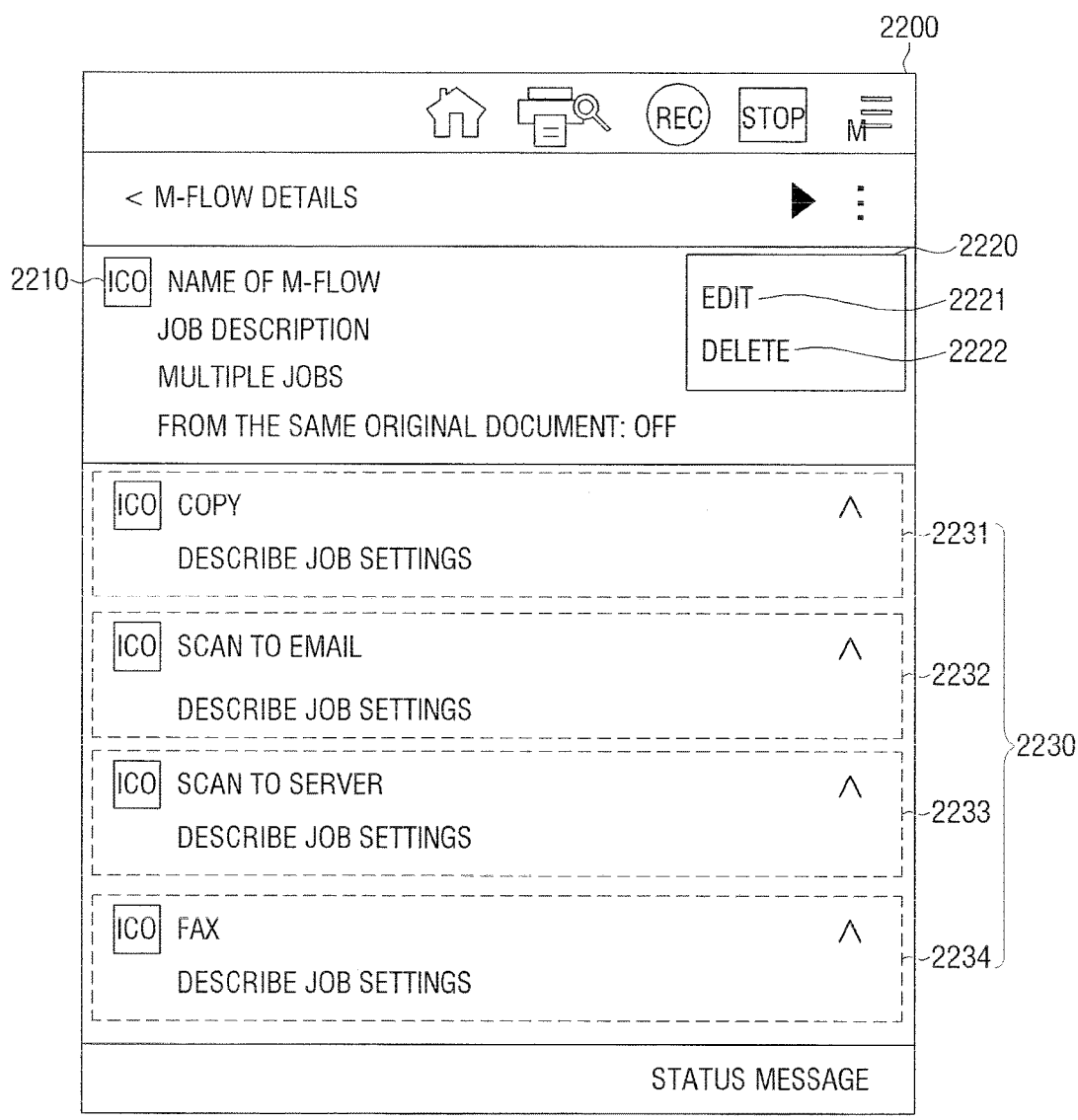

FIG. 22 is a view illustrating an example of a user interface window that may be displayed when a triangle 2013 of FIG. 20 is selected.

Referring to FIG. 22, the user interface window 2200 includes an area 2210 that displays information on a selected work form, an area 2230 that displays functions and options included in the subject work form 2230, and an option area 2220.

The area 2210 that displays information on a work form displays the name of the work form selected in the aforementioned FIG. 20 and options for executing the work form.

The area 2230 displays the functions included in the work form 2231,2232, 2233, 2234 and options of the respective functions.

The option area 2220 is an area that may be displayed when three dots arranged in one vertical line below the list menu are selected, the option area 2220 includes an editing area 2221 and a delete area 2222.

The editing area 2221 is an area for receiving input of a command to edit a currently selected work form. When the user selects the editing area 2221, a user interface window as that illustrated in FIG. 26 may b e displayed.

The delete area 2222 is an area for receiving input of a command to delete a currently selected work form. When the user selects the delete area 2222, the subject work form is deleted.

Figure 23:
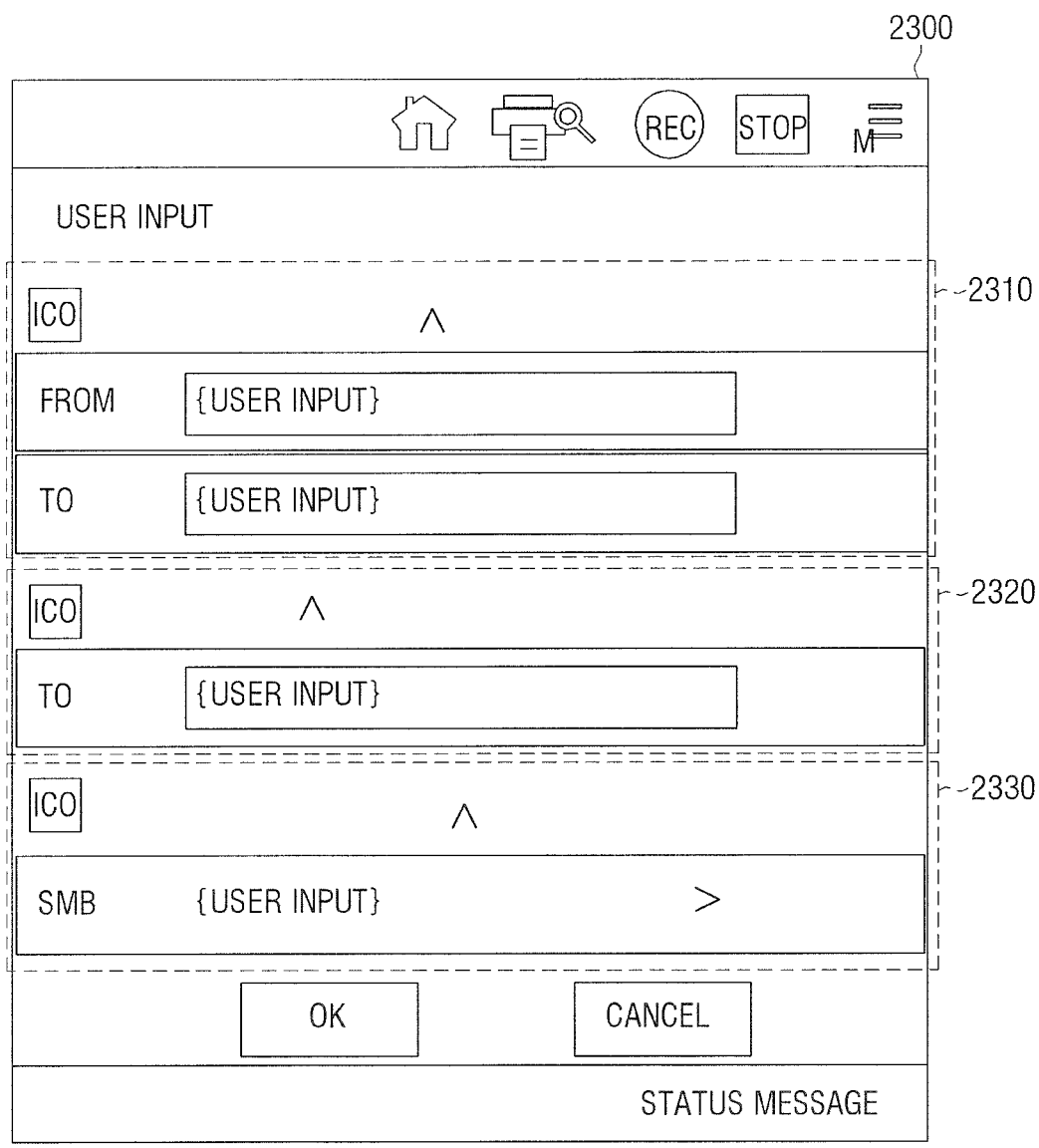
Figure 25:
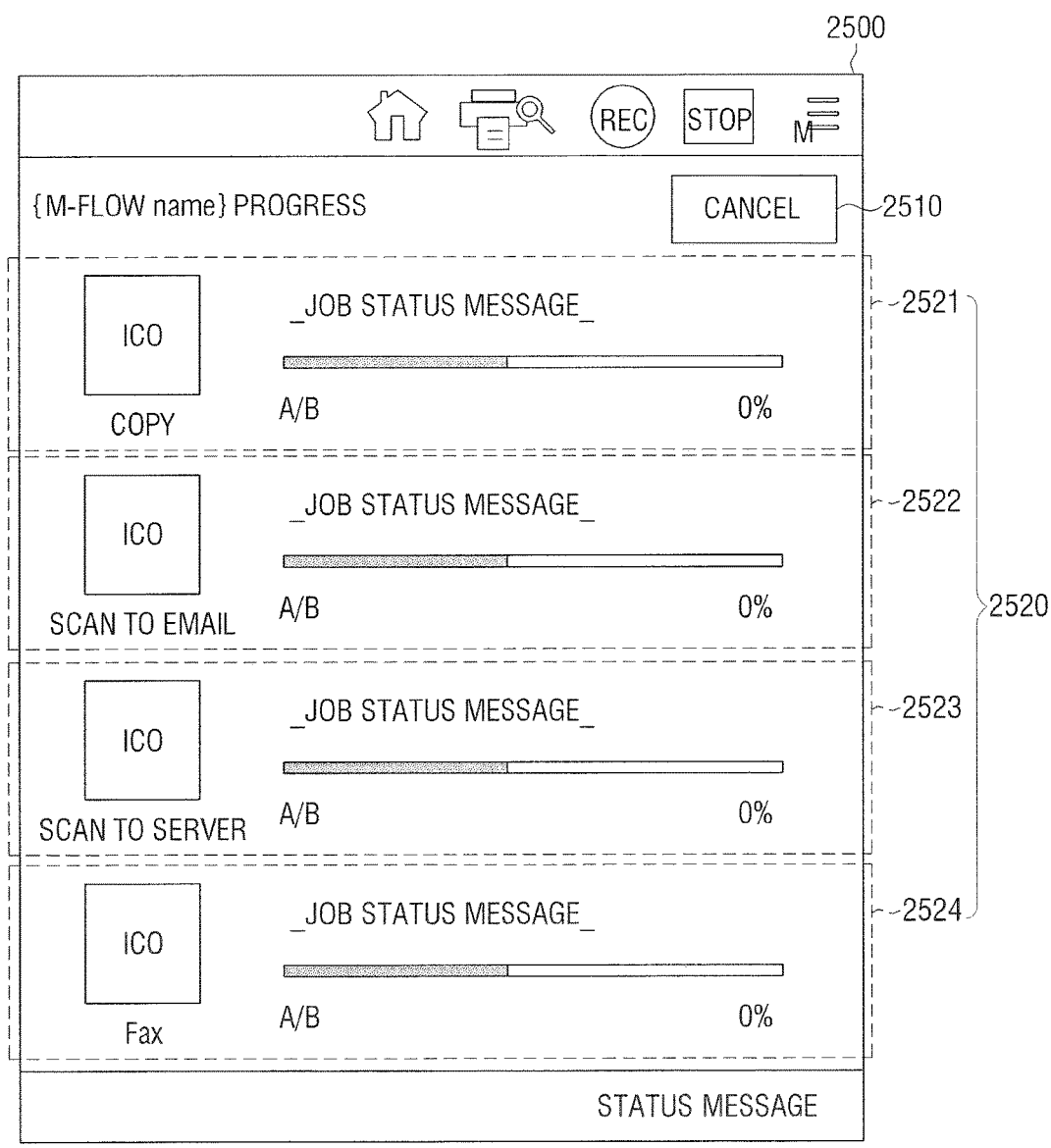

FIGS. 23 to 25 are views illustrating examples of user interface windows that may be displayed when one of the work forms displayed in the work form display area 2010 of FIG. 20 is selected. Specifically, FIG. 23 is a view illustrating an example of a user interface window that may be displayed when there exists a blank field in a work form selected by the user, FIG. 24 is a view illustrating an example of a user interface window that may be displayed when a function or an option included in the work form selected by the user cannot be performed in the selected image forming apparatus, and FIG. 25 is a view illustrating an example of a user interface window when a selected work form is executed without a particular problem.

Referring to FIG. 23, the user interface window 2300 displays the functions 2310, 2320, 2330 having blank fields of the functions included in the work form. The user may fill in the black fields, and perform the subject work form. When the user has filled in all the black fields, and the work form is performed, a user interface space as that illustrated in FIG. 25 may be displayed.

The user interface window in FIG. 24 displays information that a currently selected work form and a pre-selected image forming apparatus are not compatible to each other.

The user interface window 2500 in FIG. 25 includes an area 2520 that displays functions being performed in the currently selected image forming apparatus And status of each function, and operation cancellation area 2510.

The operation cancellation area 2510 is an area for receiving input of a command to cancel the functions currently proceeding.

An area 2520 is an area for displaying the functions currently being performed and a situation of progress of each function.

Figure 26:
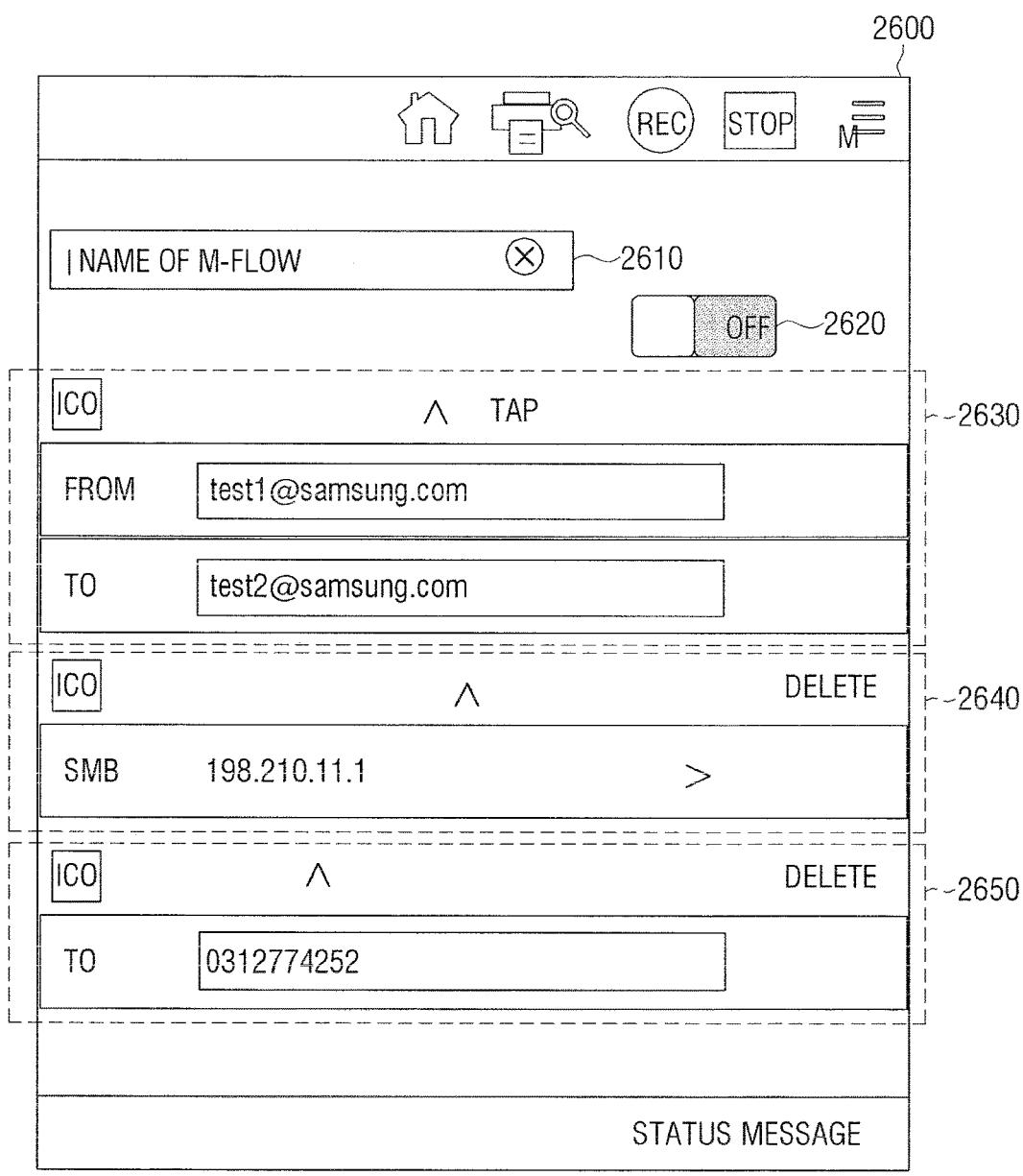

FIG. 26 is a view illustrating an example of a user interface window that may be displayed when the editing area 2221 of FIG. 22 is selected.

Referring to FIG. 26, the user interface window 2600 includes a name display area 2610, a same script selecting area 2620, and modification areas 2630, 2640, 2650.

The name display area 2610 is an area that displays the name and information of the work form currently being edited.

The same script selecting area 2620 is an area for receiving selecting of, in the case where the work form includes a plurality of functions each of which includes a scanning operation, whether or not to perform a scanning operation for each and every function. For example, when the user turns this area 2620 'on', the scan to fax and the scan to server may all be set to be performed with one same script, i.e. script A being scanned and transmitted via fax, and the result of the same script A being transmitted to the server. On the contrary, when this area 2620 is turned 'off', the scan to fax may be performed with script A while the scan to server is performed with another script B.

The modification areas 2630, 2640, 2650 are areas that display portions that can be changed by the user 2630, 2640, 2650 of the functions included in the work form. The user may update the subject work form by changing values displayed therein.

According to the aforementioned print control method of the present embodiment, a work form can be generated easily if only one knows how to use an image forming apparatus without having to learn further methods for using other apparatuses. Further, as illustrated in FIGS. 9 to 26, the method for using an image forming apparatus is not dependent on a particular apparatus, and thus it is possible to manipulate the apparatuses and generate a work form regardless of the type of the apparatus. Further, a generated work form is written in a language recognizable by both the electronic apparatus and the image forming apparatuses, and thus can be used generally. Further, user inputs are not fixed values but are generated as changeable values.

Further, although it was explained hereinabove that the user interface windows of FIGS. 9 to 26 may be displayed in the electronic apparatus 100, in an embodiment, the user interface windows of FIGS. 9 to 26 may be provided in the image forming apparatus 200.

Figure 27:
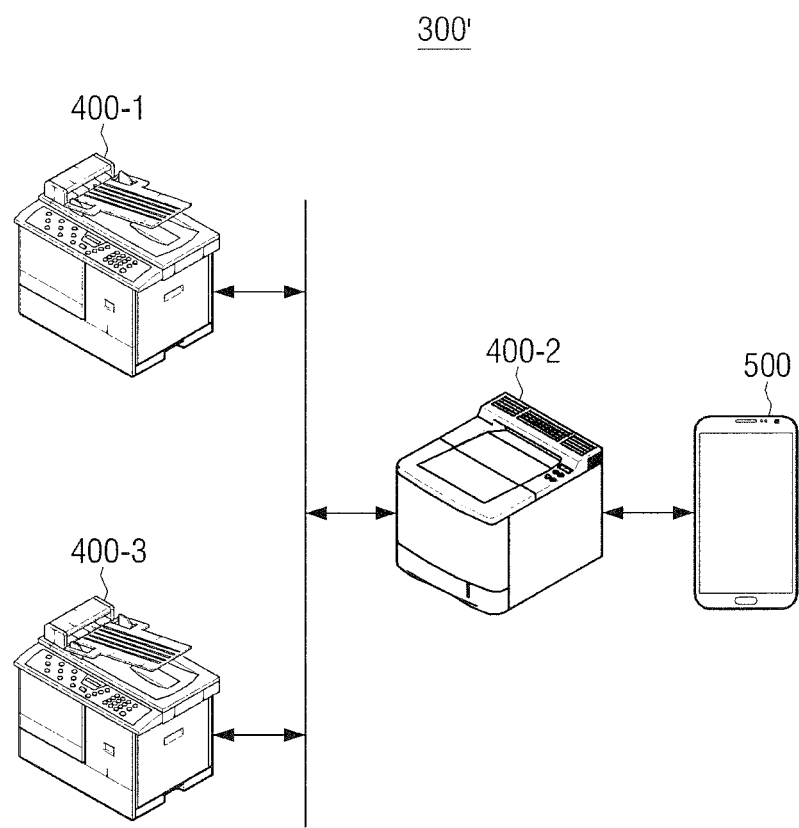
FIG. 27 is a block diagram illustrating an image forming system according to another embodiment of the present disclosure.

FIG. 27 is a block diagram illustrating an image forming system according to another embodiment of the present disclosure.

Referring to FIG. 27, the image forming apparatus 300' according to an embodiment of the present disclosure includes a plurality of image forming apparatuses 400-1, 400-2, 400-3 and a mobile apparatus 500.

The image forming apparatus 400-1, 400-2, 400-3 receives input of a command to perform an operation, and performs the operation input. Here, the image forming apparatus 400-1, 400-2, 400-3 may be a printer, a scanner, a copy machine, a facsimile or a multi-function peripheral (MFP) capable of performing at least one of a scanning task (here, a task may mean a 'function'), a printing task, a fax task and an image editing task, etc. Here, the image forming apparatus 400 may receive the command to perform an operation directly or through the mobile apparatus 500. Here, the received command may include a command to control another image forming apparatus as well, or a command to perform an operation applicable to itself only. This will be explained later on with reference to FIGS. 36 and 37.

If the command to perform an operation is a command that must use a task of another image forming apparatus 400-2, 400-3, the image forming apparatus 400-1 performs a portion of the operation (or job, hereinafter referred to as operation) that corresponds to the input command to perform an operation, and transmit the rest of the operation to the another image forming apparatus 400-2, 400-3. Here, the image forming apparatus 400-1 may transmit all the rest of the operation to the another image forming apparatus 400-1 or distribute the rest of the operation to the plurality of image forming apparatuses 400-2, 400-3. Such an operation using a plurality of image forming apparatuses is called a virtualized group operation (or virtualized function). Such a virtualized group operation may be performed in two image forming apparatuses, or in three or more image forming apparatuses. Details of the virtualized group operation will be explained later on with reference to FIGS. 28 and 29.

The mobile apparatus 500 displays a UI for controlling functions of the image forming apparatus 400-1, 400-2, 400-3, and receives input of a command to perform an operation regarding the image forming apparatuses 400-1, 400-2, 400-3 through the displayed UI. Here, the command to perform an operation input may be a command to perform an operation regarding one image forming apparatus 400-1, or regarding the plurality of image forming apparatuses 400-1, 400-2, 400-3.

Further, the mobile apparatus 500 transmits the command to perform an operation input to the image forming apparatus 400-1, 400-2, 400-3, and generates and stores a work form based on a series of user manipulations and an order thereof input. Details of the mobile apparatus 500 and operations thereof will be explained later on with reference to FIG. 32. Here, the mobile apparatus 500 may be a notebook, a mobile phone, a smart phone, a PMP, an MP3 player or the like.

Here, the work form includes information necessary for performing an operation that the image forming apparatus 400-1, 400-2, 400-3 provides. For example, the work form may include information on an order for the user to process the operation, operation conditions and a position to store data of results of the operation and the like. By using a stored work form, the user may perform the same operation in a simple manner without having to repeat the settings. The work form may be generated in an eXtensible Markup Language (XML) format.

A general work form includes a source of input that provides data and a destination to which the data may be transmitted. For example, data to be processed may be a document to be scanned, the source of input may be the image forming apparatus capable of scanning the document, and the destination may be a file server, a file transfer protocol (FTP) server, an SMTP server or the like.

In a conventional system, the source of input, the destination and the operation conditions must be input through a UI necessary for generating a work form when generating the work form, but according to the present embodiment, the mobile apparatus 500 automatically fills in the aforementioned source of input, the destination and the operation conditions by means of a series of user manipulations in the process of performing a current operation and generates a work form. Further, such a work form may include not only the operation conditions of one apparatus but also the operation conditions of a plurality of apparatuses. In this regard, the work form according to the present embodiment may be referred to as an M-plow in order to distinguish it from a conventional work form.

Further, if necessary, the user may delete a destination field from a pre-generated work form to generate a work form to which a destination may be input every time a work form is performed. The work form generated in such a process may include a blank field.

Further, the mobile apparatus 500 may generate a group of image forming apparatuses to perform a virtualized group operation. Specifically, the mobile apparatus 500 performs an operation of selecting/acquiring information on an image forming apparatus when generating a work form. Therefore, in the present embodiment, the image forming apparatus selected by the user when generating a work form is generated as an operation group. Here, selecting the image forming apparatus may be performed using an NFC tag, but there is no limitation thereto, and thus various selecting methods may be used.

Further, the mobile apparatus 500 may transmit information on the generated operation group to the image forming apparatus 400-1, 400-2, 400-3 corresponding to each operation group. In an embodiment, information on the operation group may be transmitted only to a representative image forming apparatus 400-1 in the operation group.

In such an image forming system 300' according to the present embodiment, the image forming apparatus 400-1 may use functions of other image forming apparatuses 400-2, 400-3, and thus, functions that are not supported by the subject image forming apparatus 400-1 may also be provided, and operations may be performed more quickly.

Further, the image forming system according to the present embodiment may generate a work form with only the manipulations for controlling functions of the image forming apparatus, and thus the user need not learn or endeavor to generate a work form, thereby providing improved user convenience.

Although it was explained hereinabove with reference to FIG. 27 that one mobile apparatus 500 may be connected to three image forming apparatuses, in an embodiment, one mobile apparatus 500 may be connected to two image forming apparatuses, or to four or more image forming apparatuses.

Further, in an embodiment, each apparatus may be connected directly, or indirectly through a router or another apparatus (for example, server). Further, although it is illustrated that each apparatus may be connected via wires, in an embodiment, each apparatus may be connected wirelessly.

Although it was explained hereinabove with reference to FIG. 27 that a user's control command is input in the mobile apparatus 500 to form a work form, in an embodiment, a user's control command may be input in the image forming apparatus 400 to form a work form.

Although it was explained hereinabove with reference to FIG. 27 that the image forming apparatus to participate in a virtualized group operation is determined by the mobile apparatus 500, in an embodiment, the image forming apparatus to participate in a virtualized group operation may be determined by a management server configured to manage the plurality of image forming apparatuses. Otherwise, the image forming apparatus to participate in a virtualized group operation may be determined at the image forming apparatus side. This will be explained in detail later on with reference to FIG. 30.

Figure 28:
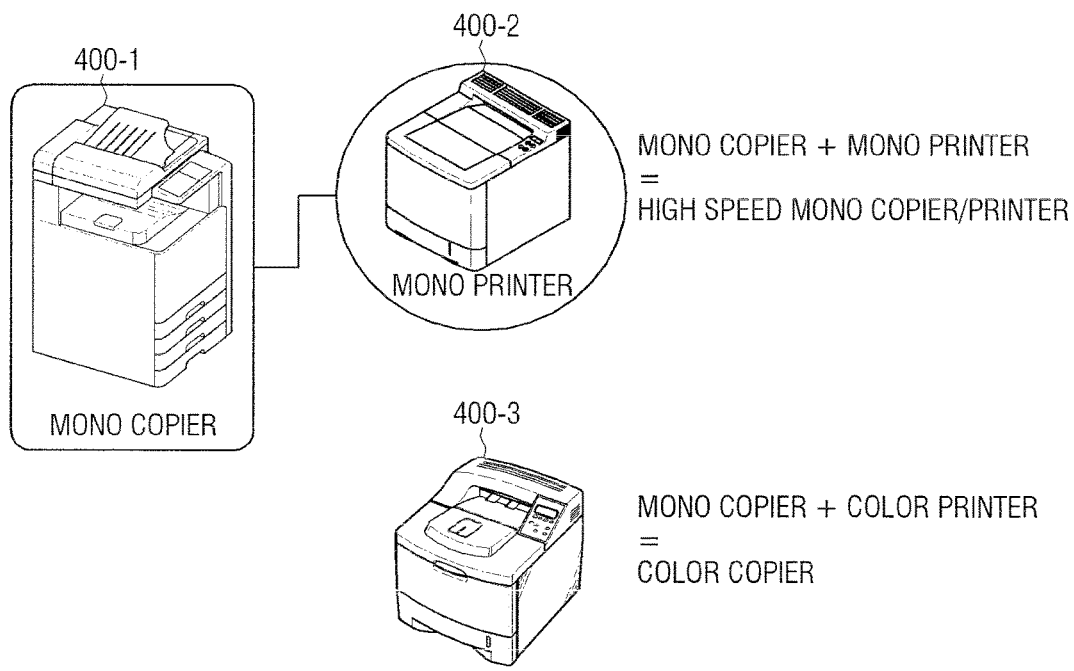
FIGS. 28 and 29 are views provided to explain a virtualized group operation according to an embodiment of the present disclosure.
Figure 29:
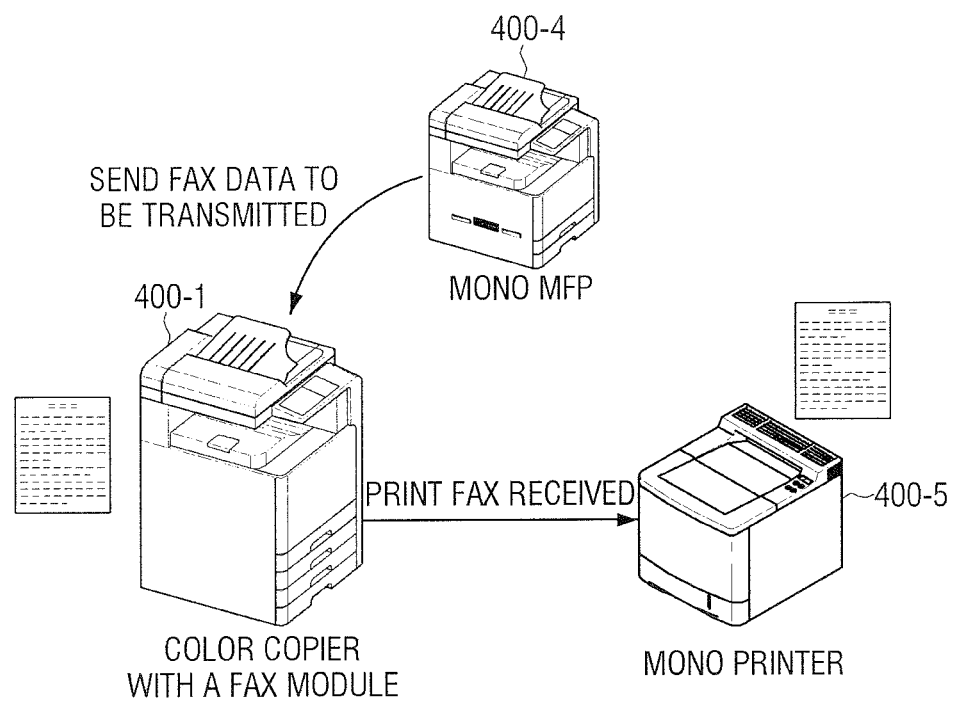

FIGS. 28 and 29 are views provided to explain a virtualized group operation according to an embodiment of the present disclosure.

A virtualized group operation according to the present disclosure is an operation where a plurality of image forming apparatuses 400-1, 400-2, 400-3 perform one operation using a plurality of tasks (here, the plurality of tasks are tasks of different functions). Here, a task may be a scanning task, an image forming task, a fax transmission task, a fax receiving task, an email transmission task, a server transmission task, a format conversion task, an editing task or the like, and these tasks may be indicated as functions. A copying task is a task of the scanning task and the image forming task combined, and scan to email and scan to server are also tasks of a plurality of tasks combined.

Such a virtualized group operation may be realized in two methods.

First is a method of using apparatus B in order to process a task that can be performed in apparatus A more quickly. Second is a method of using apparatus B in order to extend the task that cannot be performed in apparatus A. The first method will be explained with reference to FIG. 28, and the second method will be explained with reference to FIGS. 28 and 29.

Referring to FIG. 28, the image forming system includes three image forming apparatuses 400-1, 400-2, 400-3.

For convenience of explanation, assumptions will be made hereinafter that each image forming apparatus of FIG. 28 performs functions as follows. First of all, a first image forming apparatus 400-1 is a current image forming apparatus where the user is positioned and inputs a command to perform an operation. The first image forming apparatus 400-1 includes a scanner, an image former and a fax, to support scanning, copying, transmitting fax and receiving fax. Further, the second image forming apparatus 400-2 is one of the image forming apparatuses that the user does not manipulate directly. The second image forming apparatus 400-2 includes an image former and supports black and white printing. That is, the second image forming apparatus 400-2 is a black and white printer. Further, the third image forming apparatus 400-3 is another image forming apparatus that the user does not manipulate directly. The third image forming apparatus 400-3 includes a color image former, and supports black and white printing and color printing. That is, the third image forming apparatus 400-3 is a color printer.

The scanning velocity of a scanner is generally faster than the printing velocity of an image former. Therefore, in the case of performing a copying operation (a scanning operation and a printing operation combined), the scanning operation may be completed quickly while the printing operation takes a long time, making the user wait.

Therefore, by using not only the current first image forming apparatus 400-1 but also the other second image forming apparatus 400-2 to perform an operation as in the present embodiment, it is possible to reduce the waiting. Specifically, the first image forming apparatus 400-1 may scan a script to generate a scan image, and print a portion of the generated scan image. Further, the first image forming apparatus 400-1 may transmit the rest of the scan image to the other second image forming apparatus 400-2. Here, the other second image forming apparatus 400-2 may perform a printing operation of the received scan image. Accordingly, the total operation time being spent in a copying operation can be reduced compared to a conventional method.

Although only the second image forming apparatus 400-2 is involved in the virtualized group operation hereinabove, in an embodiment, the third image forming apparatus 400-2 may be involved instead of the second image forming apparatus 400-3, or both the second image forming apparatus 400-2 and the third image forming apparatus 400-3 may be involved in the virtualized group operation. The method for selecting the apparatus to participate in an operation will be explained later on in relation to a task distributer with reference to FIG. 31.

This first method may be used not only for a copying operation, but also for a fax transmitting operation and e-book creating operation and the like. A fax transmitting operation usually takes a long time. Therefore, by using the virtualized group operation method, it is possible to generate a plurality of scan images in apparatus A, perform a fax transmitting operation of a portion of the scan image in apparatus A, while sending the rest of the scan image to apparatus B so that apparatus B may operate a fax transmitting operation of the rest of the scan image.

Further, when creating an e-book which requires a mass amount of scanning operations, it is possible to have apparatus A scan a portion of a script to generate a scan image C, and have apparatus B scan the rest of the script to generate a scan image D. Further, it is possible to have apparatus B receive the scan image C generated in apparatus A, and image-process the scan image D made by itself and the scan image C received to create an e-book.

Although only three embodiments were mentioned above in relation to the first virtualized group operation method, there may be further examples of applying the first virtualized group operation method, as long as they relate to operations using functions of a plurality of image forming apparatuses.

Hereinafter, the second virtualization method will be explained.

Since the image former included in the first image forming apparatus 400-1 is a black and white image former that cannot perform color printing operations, even if the scanner of the first image forming apparatus 400-1 is a configuration capable of performing a color scanning operation, the first image forming apparatus 400-1 cannot perform a color copying operation.

However, in the present embodiment, if there is a third image forming apparatus 400-3 nearby that can perform color printing operations, even if the first image forming apparatus 400-1 is incapable of performing a color copying operation, a virtualized group operation (or virtualized function) may be performed as if supporting a color copying operation. When performing such a virtualized group operation, the first image forming apparatus 400-1 may display a user interface window as that illustrated in FIG. 48.

The first image forming apparatus 400-1 enabled to perform a color copying operation by a virtualized group operation may receive input of a color copying command by the user. In this case, the first image forming apparatus 400-1 scans the script in color and generates a color scan image. Further, the first image forming apparatus 400-1 may transmit the generated color scan image to the third image forming apparatus 400-3 so that the transmitted scan image may be color printed. Here, the first image forming apparatus 400-1 may display that a color result may be output from the third image forming apparatus 400-3. Accordingly, color copying operations that were impossible in conventional printing environments can be easily performed by users by means of the virtualized group operation.

Such a virtualized group operation method may also be applied when the image forming apparatus 400-1 is a scanner. For example, if the image forming apparatus 400-1 is a scanner that can only support scanning tasks, it is possible to scan the script to generate a scan image, and transmit the generated color scan image to another image forming apparatus 400-2, 400-3 that can perform a printing operation. Thus, although the basic tasks of the first image forming apparatus 400 do not support copying tasks, copying tasks can still be performed using the performance of other image forming apparatuses.

This second method may be applied to not only copying operations, but also to fax transmitting operations and e-book creating operations, etc.

For example, fax transmission can only be performed in an apparatus that has a fax, but let's suppose that the fourth image forming apparatus 400-4 cannot perform fax transmitting operations since it doesn't have a fax, as illustrated in FIG. 29. However, when a virtualized group operation of the present embodiment is applied and the first image forming apparatus 400-1 supports fax tasks, the fourth image forming apparatus 400-4 becomes an apparatus that supports fax tasks. Accordingly, the fourth image forming apparatus 400-4 may receive input of a fax transmission command to transmit a script from the user to the fifth image forming apparatus 400-5. Further, the fourth image forming apparatus 400-4 that received input of the command may scan the script to generate a scan image, and transmit the generated scan image to the first image forming apparatus 400-1. In this case, the first image forming apparatus 400-1 may transmit the received scan image to the fifth image forming apparatus 400-5.

If the fourth image forming apparatus 400-4 is closer to the user than the first image forming apparatus 400-1, for example, the two image forming apparatuses 400-1, 400-4 located in different floors, the user may perform the fax operation using the fourth image forming apparatus 400-4 located on the same floor without having to go to another floor, thereby improving user convenience and increasing usability of existing office devices that had low frequency of usage.

Further, the e-book creating function can only be performed in recent image forming apparatuses, but let's suppose that the fourth image forming apparatus 400-4 is an old model multi-function peripheral that has no e-book creating functions. However, when a virtualized group operation of the present embodiment is applied and the first image forming apparatus 400-1 supports the e-book creating function, the fourth image forming apparatus 400-4 becomes an apparatus that supports the e-book creating function. Accordingly, the fourth image forming apparatus 400-4 may receive input of a user's command to create an e-book from a script, and then scan the script to generate a scan image and transmit the created scan image to the first image forming apparatus 400-1. The first image forming apparatus 400-1 that received the scan image can create an e-book from the scan image received. Further, the first image forming apparatus 400-1 may transmit the created e-book to a storing place indicated by the user (for example, management server).

Although only three embodiments were mentioned above in relation to the second virtualized group operation method, there may be further examples of applying the second virtualized group operation method, as long as they relate to operations using functions of a plurality of image forming apparatuses.

As aforementioned, the virtualized group operation methods can extend the functions that conventional image forming apparatuses do not support, thereby increasing user convenience. Further, the velocity of existing functions may improve as well.

However, if the aforementioned virtualized group operation method is applied to all connectable image forming apparatuses, it would be difficult to manage and select the apparatuses. For example, when performing the aforementioned first virtualized group operation method, if it takes more time to fetch all the outputs to other image forming apparatuses than outputting all the output materials from one apparatus, it may be inconvenient for the user.

Therefore, in applying the virtualized group operation method, it is required to group and use the plurality of image forming apparatuses effectively. Hereinafter, a method for grouping a plurality of image forming apparatuses will be explained with reference to FIG. 30.

Figure 30:
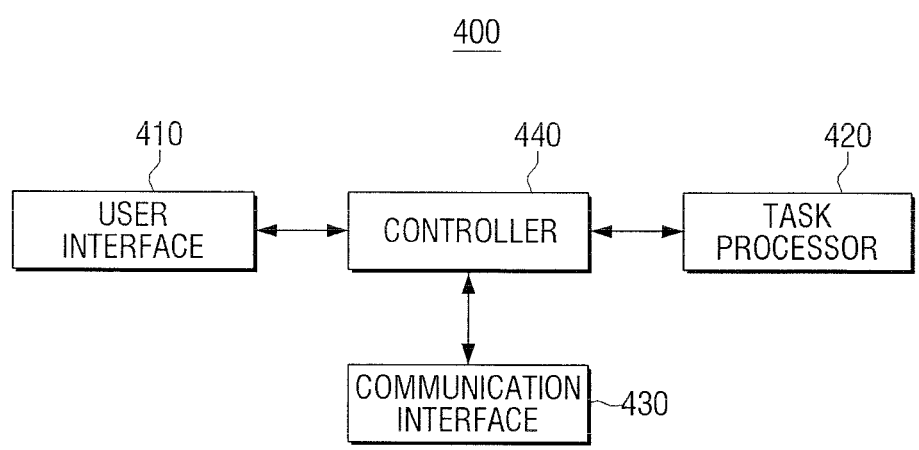
FIG. 30 is a schematic block diagram of the image forming apparatus according to another embodiment of the present disclosure.

FIG. 30 is a simplified block diagram of an image forming apparatus according to another embodiment of the present disclosure.

Referring to FIG. 30, the image forming apparatus 400 may consist of a user interface 410, a task component 420, a communication interface 430 and a controller 440. This image forming apparatus 400 may be one of the image forming apparatuses 400-1, 400-2, 400-3 of FIG. 27, but for convenience of explanation, the first image forming apparatus 400-1 will be called the current image forming apparatus for receiving inputs of operations commands and the like and the second and third image forming apparatuses 400-2, 400-3 will be called the other image forming apparatuses 400-2, 400-3.

The user interface 410 is provided with numerous function keys by which the user may set or select a variety of functions being supported by the image forming apparatus 400-1, and the user interface 120 may display a variety of information being provided in the image forming apparatus 400-1. The user interface 410 may be configured as an apparatus that realizes inputs and outputs simultaneously such as a touch screen, or as an apparatus configured by combination of a manipulation inputter (for example, keyboard, mouse), and a display (for example, monitor).

The user interface 410 may display a list of a plurality of other connectable image forming apparatuses 400-2, 400-3. Specifically, the user interface 410 may display a list of image forming apparatuses searched in the communication interface 430. Here, the user interface 410 may display information on each apparatus together. Here, the apparatus information being displayed may include functions that the subject apparatus supports, and locations and names of the apparatus, etc. The user may select a plurality of image forming apparatuses from the list displayed in the user interface 410 and generate an operation group.

The user interface 410 displays a UI for controlling functions of the image forming apparatus 400-1. The user may input a control command for controlling functions of the image forming apparatus 400-1 through the UI displayed. Here, the user interface 410 may receive input of selecting a function from: copy, fax, scan to email, scan to server, and change apparatus setting, and also an input of an option for the respective functions. Although it was explained that the functions that can be performed in the image forming apparatus 400-1 include: copy, fax, scan to email, scan to server, and change apparatus setting, in an embodiment, it is apparent that if there are other functions being supported in the image forming apparatus besides those aforementioned, the same may also apply to those other functions.

Here, the user may input only one function or a plurality of functions. That is, the user interface 410 may receive input of a command to perform an operation using a plurality of functions. Here, the operation using a plurality of functions may include functions not supported in the current image forming apparatus 400-1.

Figure 47:
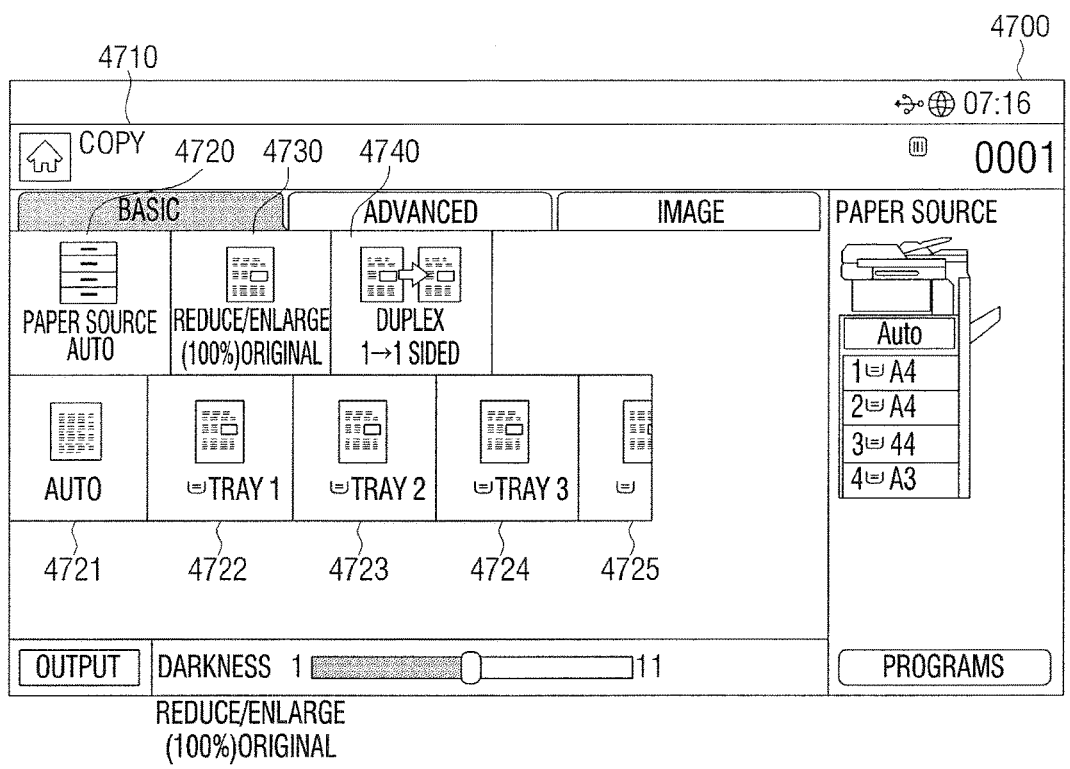
FIGS. 47 to 49 are views illustrating examples of user interface windows that may be displayed in the image forming apparatus of FIG. 27.
Figure 48:
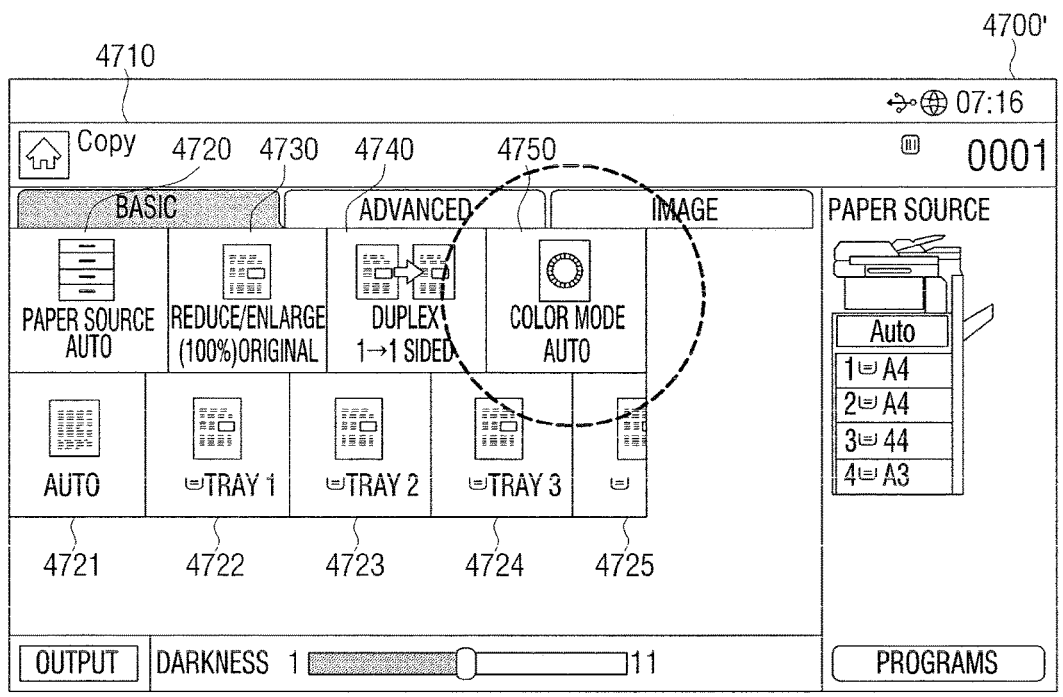

Specifically, the user interface 410 may receive input of a function and an option thereof that may be performed in combination with another image forming apparatus 400-2, 400-3 through the UI displayed. Specifically, when the image forming apparatus 400 belongs to an operation group and is thus able to perform a virtualized group operation, the user interface 410 may display the UI for receiving input of an operation that may be performed using the functions of another image forming apparatus in the virtualized group. For example, as illustrated in FIG. 47 and FIG. 48, if the first image forming apparatus 400-1 that does not support a color copying task is included in an operation group that includes another third image forming apparatus 400-3 that can perform color printing, the first image forming apparatus 400-1 may display a color copying option, which is not possible in a conventional system.

The user interface 410 may receive selecting of the image forming apparatus 400-2, 400-3 to perform the current operation together. Specifically, when there are a plurality of image forming apparatuses 400-2, 400-3 for performing a virtualized group operation, the user interface 410 may receive selecting of at least one of the plurality of apparatuses in the operation group.

The user interface 410 displays a result of performing the operation input. Specifically, if the operation input is a virtualized group operation, the user interface 410 may display a result of operation in the current image forming apparatus 400-1 together with a result of operation in the other image forming apparatus 400-2, 400-3.

Further, the user interface 410 may display information on the other image forming apparatus 400-2, 400-3 that is performing a virtualized group operation. Specifically, the user interface 410 may notify the user of a name, a location and the like of the other image forming apparatus 400-2, 400-3 performing the virtualized group operation. In an embodiment, the information may be displayed through print outs, or may be displayed in the mobile apparatus that transmitted an operation command.

When an error occurs in the other image forming apparatus 400-2 that is performing a virtualized group operation, the user interface 410 may display that an error has occurred, and display a list of other image forming apparatuses 400-3 that can alternatively perform the operation being performed in the image forming apparatus 400-2 where the error occurred. Accordingly, the user can select another image forming apparatus in the list and resume the operation.

The user interface 410 may display a UI related to generating and executing a work form, and receive input of setting values. Operations for generating and executing a work form are the same as the operations in the mobile apparatus 500, and thus this will be explained later on with reference to FIG. 32.

The task component 420 performs a pre-determined function. Specifically, the task component 420 may include an image former that outputs print data (or scan data), and in the case where the image forming apparatus 400 supports a fax task such as fax transmitting, fax receiving and the like, task component 420 may include a fax for performing fax tasks. Further, in the case where the image forming apparatus 400 is a multi-function peripheral that can process the aforementioned functions in a complex manner, the image forming apparatus may include an image former, a fax and a scanner, etc. Further, the task component 420 may further include an image processor that converts files of an image (for example, converting a scan image into a PDF file or an e-book format). Further, the task component 420 may further include an email transmitter, a server transmitter and the like that transmit generated data to a certain apparatus.

The task component 420 performs at least one task of a plurality of tasks corresponding to an operation to perform a portion of the operation. Specifically, the task component 420 may perform a portion of the operation distributed by the task distributer 460 that will be explained hereinafter.

Further, the task component 420 may perform an operation received from the other image forming apparatus 400-2, 400-3 (specifically, the rest of the operation not performed in the other image forming apparatus) through the communication interface 430 that will be explained later on. Specifically, in the case where a command to perform an operation is input from the other image forming apparatus 400-2, 400-3, the task component 420 may perform the operation being transmitted from the other image forming apparatus 400-2, 400-3.

The communication interface 430 is formed in order to connect the image forming apparatus 400-1 to an external apparatus, and may be configured in a form accessible via a Local Area Network (LAN), Internet, a Universal Serial Bus (USB) port or a wireless module. Here, the wireless module may be WiFi, WiFi Direct, NFC, Bluetooth, IR or the like.

The communication interface 430 searches for another connectable image forming apparatus 400-2, 400-3. Specifically, the communication interface 430 may search for the another image forming apparatus 400-2, 400-3 that can be connected to the image forming apparatus 400-1 in a communication method that the image forming apparatus 400-1 supports.

For example, in the case where the communication interface 430 uses WiFi, the communication interface 430 may search for an image forming apparatus that can be connected via WiFi, and when the communication interface 110 supports WiFi and WiFi Direct, the communication interface 430 may search for an image forming apparatus connectable in each connecting method.

Further, the communication interface 430 receives apparatus information on another image forming apparatus 400-2, 400-3 searched. Specifically, the communication interface 430 may receive information on another connectable image forming apparatus, or information on an image forming apparatus selected by the user.

Here, the apparatus information may include address information (IP address, MAC information and the like necessary for connecting with the image forming apparatus), function information (information on functions that the image forming apparatus supports such as whether or not color printing is possible, whether or not scanning is possible and the like) and status information (whether or not a current operation is possible, whether or not an error occurred, status of operation progress, etc.) of the image forming apparatus.

Further, the communication interface 430 transmits the apparatus information to the mobile apparatus 500 or to another image forming apparatus. Specifically, upon receiving an NFC tag from the mobile apparatus 500, the communication interface 430 may transmit its apparatus information to the mobile apparatus 500.

Further, the communication interface 430 transmits a UI for controlling functions of the image forming apparatus 400 to the mobile apparatus 500. Specifically, the mobile apparatus 500 according to the present embodiment may display the UI in two methods: a first method is to receive apparatus information and configure the UI for itself and display the configured UI, and a second method is to receive the UI directly from the image forming apparatus and display the same.

Therefore, in the case where the mobile apparatus 500 operates in the second method, the communication interface 430 may provide the UI to the mobile apparatus 500. Since the image forming apparatus belongs to an operation group, functions of another image forming apparatus may be used, and thus the communication interface 430 may provide a UI for controlling functions of the other image forming apparatus to the mobile apparatus 500.

Further, the communication interface 430 transmits a rest of an operation not performed in the task component 420 to another image forming apparatus 400-2, 400-3 in the operation group. Specifically, the communication interface 430 may transmit the operation to be performed in the other image forming apparatus 400-2, 400-3 when performing a virtualized group operation. Here, the communication interface 430 may transmit the operation to be distributed to the image forming apparatus 400-2, 400-3 determined by the task distributer 460 that will be explained later on. It may be one different image forming apparatus or a plurality of different image forming apparatuses.

Further, the communication interface 430 receives a portion of an operation related to a command to perform an operation input into another image forming apparatus from the another image forming apparatus inside an operation group. The received operation may be transmitted to the task component 420 and processed.

The communication interface 430 may transmit its status information or a state of progress related to the received operation to the other image forming apparatus that transmitted the operation.

Further, the communication interface 430 may receive information on a plurality of image forming apparatuses selected in the mobile apparatus from the mobile apparatus 500. Here, the information on the plurality of image forming apparatuses selected in the mobile apparatus 500 is information on image forming apparatuses having a history of being tagged with the mobile apparatus 500. It may be information generated in the process of generating a work form in the mobile apparatus 500.

Further, the communication interface 430 receives print data. Here, the print data may be data of a printer language such as postscript (PS), printer control language (PCL) and the like, and if the image forming apparatus 200 supports direct printing, the print data may be a file of PDF, XPS, BMP, JPG, and the like, itself.

Further, the communication interface 430 receives a work form. Specifically, the communication interface 430 may receive a work form generated in the mobile apparatus 500. Further, the communication interface 430 may perform a control command being transmitted in response to a work form being performed in the mobile apparatus 500.

Further, in response to a work form being selected, the communication interface 430 may transmit a control command corresponding to the work form to another image forming apparatus to perform the work form. Here, the control command is a command that can be recognized in the image forming apparatus to perform the work form. Although it was explained that in the present embodiment a command corresponding to the work form is transmitted to the image forming apparatus, in an embodiment, the work form itself may be transmitted to the image forming apparatus.

The controller 440 controls each configuration inside the image forming apparatus 400. Specifically, the controller 440 generates an operation group that includes the image forming apparatus 400-1 and other image forming apparatus 400-2, 400-3. Specifically, the controller 440 may search for a connectable image forming apparatus 400-2, 400-3, and combine the plurality of image forming apparatuses 401-2, 400-3 searched into an operation group in various methods.

First, the controller 440 may combine all the connectable image forming apparatuses 400-2, 400-3 and generate one operation group. This method may be applied when there is a small number of image forming apparatuses. That is, if there are dozens of image forming apparatuses that are connectable, not only is it difficult to identify the status of the plurality of image forming apparatuses, but it is also difficult to fetch the output results. Therefore, it is desirable that only several image forming apparatuses are included in one operation group.

Accordingly, a method for generating an operation group having an appropriate number of apparatuses will be explained hereinafter.

First of all, the controller 440 may control the user interface 410 such that a list of a plurality of connectable image forming apparatuses 400-2, 400-3 is displayed, and the controller 440 may generate an operation group with the image forming apparatuses selected from the list displayed. Although it was explained hereinabove that the image forming apparatuses to be included in an operation group may be selected by the user after a list of the connectable image forming apparatuses is displayed, in an embodiment, information on other image fainting apparatuses to be included in an operation group may be directly input instead. For example, when information by which an image forming apparatus can be specified, for example an IP address, apparatus name and Any # telephone number (telephone number given to the subject image forming apparatus to perform cloud printing) and the like is input, the apparatus corresponding to the information may be added to the operation group that includes the current image forming apparatus.

Further, although it was explained hereinabove that all searched image forming apparatuses are displayed, in an embodiment, only the image forming apparatuses that satisfy certain conditions after applying one of the following methods may be displayed in the list. For example, in an embodiment, only the image forming apparatuses having the same subnet address as the first image forming apparatus 400-1 may be displayed in the list.

Further, the controller 440 may receive information on a plurality of image forming apparatuses selected in the mobile apparatus 500, and generate an operation group based on the information received. Here, the information on the plurality of image forming apparatuses is information on the image forming apparatuses near field communication (NFC)-tagged with the mobile apparatus. Such an embodiment will be explained in detail later on with reference to FIG. 35. However, although it was explained hereinabove that only the mobile apparatus receives information on a plurality of image forming apparatuses, in an embodiment, another image forming apparatus, a management server or the like and not the mobile apparatus may receive the information. Here, the management server may be an Any # server that supports cloud printing based on a telephone number.

Further, the controller 440 may search for a connectable image forming apparatus through a short distance network, and generate an operation group with the searched image forming apparatuses. Here, the short distance network may be Bluetooth. However, although Bluetooth is used in the present embodiment, in an embodiment, another wireless network method with not a long communication distance may be used instead. Such an embodiment will be explained in detail later on with reference to FIGS. 41 and 42.

Further, the controller 440 may obtain an apparatus name of another connectable image forming apparatus 400-2, 400-3, and generate an operation group including other image forming apparatuses 400-2, 400-3 with the same identifier as the apparatus name of the image forming apparatus 400-1. Such an embodiment will be explained in detail later on with reference to FIGS. 43 and 44.

Further, the controller 440 may obtain address information that includes an IP address of another connectable image forming apparatus 400-2, 400-3, and compare the obtained address information with address information of the image forming apparatus 400-1 and generate an operation group. That is, the controller 440 may generate an operation group with image forming apparatuses of the same sub net. Here, the controller 440 may generate an operation group excluding other image forming apparatuses 400-2, 400-3 and the image forming apparatus 400-1 having a hop count of a pre-determined value and other image forming apparatuses 400-2, 400-3 having different SSID information. Such an embodiment will be explained in detail later on with reference to FIGS. 45 and 46.

The aforementioned method for generating an operation group may be combined serially and/or in parallel. For example, in a serial method, an embodiment of using an IP address and an embodiment of using a short distance network may be combined, and generate an operation group with only image forming apparatuses in a same subnet capable of mutual short distance network communication.

In the case of a parallel method, it is possible to generate a first operation group 400-1, 400-2 with the image forming apparatus 400-2 connected by NFC-tagging, and generate a second operation group 400-1, 400-2 with the image forming apparatus 400-2 capable of short distance network communication. And in the case where there is a plurality of operation groups, when an operation command that requires a virtualized group operation is input by the user, an operation group suitable to perform the corresponding operation may be selected.

Further, the aforementioned method for generating an operation group may not only be performed automatically but also manually. For example, NFC-tagged image forming apparatuses may be generated in one operation group, but in an embodiment, a list of tagged image forming apparatuses may be displayed, and an apparatus to be included in an operation group may be selected by the user from the list displayed.

Further, the controller 440 may generate an operation group in consideration of functions that image forming apparatuses 400-1, 400-2, 400-3 support. For example, an image forming apparatus that can perform a general function such as a printing task may be grouped restrictively using the aforementioned grouping method, while image forming apparatuses that can perform a rare task such as color printing, fax transmitting, e-book creating function and the like may be included in an operation group without restriction.

That is, an operation group may be generated in a form where apparatuses therein may perform various functions. For example, in the case where there is one apparatus that can perform fax transmitting of the searched plurality of image forming apparatuses, the controller 440 may control such that at least the image forming apparatus that can perform fax transmitting is included in the operation group.

It was explained hereinabove that the image forming apparatus 400 generates an operation group, in which case all the image forming apparatuses 400 in the system may each generate an operation group. Otherwise, only a certain image forming apparatus in the system may generate such an operation group. In this case, the certain image forming apparatus may be an apparatus that can perform more various functions than other apparatuses or a latest apparatus.

Further, when a command to an operation is input by the user, the controller 440 may determine whether or not the command to perform an operation input may use a virtualized group method, and if it is determined that the command to perform an operation input may use the virtualized group method, the controller 440 may control the task distributer 460 that will be explained hereinafter such that the apparatus to perform the operation and the task and work amount to be performed in the subject apparatus are determined. Further, the controller 440 may control the task component 420 and the communication interface 430 such that the subject operation is performed according to the distributed task.

When the controller 440 satisfies a pre-determined condition, an operation group may be generated. Here, the pre-determined condition may be power of the image forming apparatus being turned on, a connectable image forming apparatus being changeable, a regular period of time and a request by the user, etc.

Further, when the image forming apparatus 400 belongs to an operation group that can perform a virtualized group operation, the controller 440 may identify whether or not there is a task to be additionally performed by the virtualized grouping, and may control the user interface 410 such that a changed UI for receiving selecting of an additionally supportable task is displayed.

As aforementioned, the image forming apparatus 400 according to the present embodiment forms an operation group with another image forming apparatus, and thus, a function not supported by the subject image forming apparatus may be performed as well. Further, since an operation command regarding a function supportable in the image forming apparatus may also be performed using another image forming apparatus in the operation group, the operation may be performed more quickly.

Hereinabove, a simple configuration of the image forming apparatus 400 was illustrated and explained, but the image forming apparatus 400 may further include configurations besides the aforementioned configuration. Configurations of the image forming apparatus 400 will be explained in further detail hereinafter with reference to FIG. 31.

Figure 31:
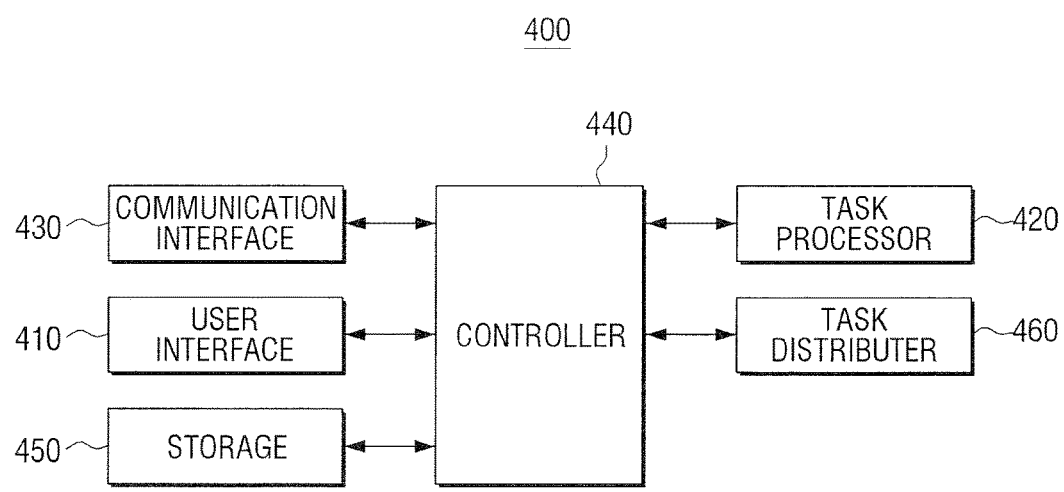
FIG. 31 is a detailed block diagram of the image forming apparatus according to another embodiment of the present disclosure.

FIG. 31 is a detailed block diagram of an image forming apparatus according to another embodiment of the present disclosure.

Referring to FIG. 31, the image forming apparatus 400 may consist of a user interface 410, a task component 470, a communication interface 430, a controller 440, a storage 450 and a task distributer 460.

Operations of the user interface 410, the task component 420, the communication interface 430 and the controller 440 are the same as those explained hereinabove with reference to FIG. 4, and the repeated explanation will be omitted.

The storage 450 stores a generated operation group. Specifically, the storage 450 may store an operation group generated in the controller 440. Here, the storage 450 also store apparatus information on each image fruiting apparatus of the operation group.

Further, the storage 450 stores a work form. Specifically, the work form that the storage 450 stores may be a work form received through the communication interface 430 or a work form generated for itself.

Further, the storage 450 may temporarily store operation data (document, print data and scan data, etc.) being transmitted from other apparatuses.

The storage 450 may be realized as a storage medium inside the image forming apparatus 400 or as an external storage medium, for example, a removable disk that includes a USB memory and a web server via a network, etc.

The task distributer 460 determines whether or not to process an input operation in a general method or in a virtualized group operation method. Specifically, in the case where an operation command input includes a function that cannot be performed in the image forming apparatus 400, the task distributer 460 may determine that the operation may be processed in a virtualized group operation method.

Further, in the case where an operation command input requires using a plurality of tasks, and a portion of the plurality of tasks is supported by another image forming apparatus, the task distributer 460 may determine that the operation command may be processed in the virtualized group operation method if doing so may speed up the operation speed.

Further, after it is determined that the operation command may be processed in a virtualized group operation method, the task distributer 460 may determine in which apparatus each task of the input operation may be performed. Here, the task distributer 460 may determine which operation may be performed in the image forming apparatus 400-1 and which operation may be performed in other image forming apparatuses 400-2, 400-3 in consideration of an operating status and supportable functions of other image forming apparatuses in the virtualized group.

For example, in the case where the user's control command is to perform a color printing operation but there is no color image former in the image forming apparatus 400-1, the task distributer 460 may determine that color scanning may be performed in the image forming apparatus 400-1 while color printing is performed in another image forming apparatus that can perform color printing in the operation group.

Here, the task distributer 460 may determine the apparatus having a color image former in the operation group as the apparatus to perform the color printing. If there are a plurality of apparatuses in the operation group, having a color image former, the task distributer 460 may determine another apparatus in consideration of whether or not it is an apparatus that can perform a printing operation right away (that is, in consideration of whether or not there is an error, and the number of pending operations), and the distance from an image forming apparatus 400-1 that can perform a scanning operation. Otherwise, the task distributer 460 may determine that the printing operation may be performed using all the plurality of color image formers.

Such an image forming apparatus 400 according to the present embodiment mentioned above forms an operation group with other connectable image forming apparatuses, and thus functions not supported in the subject image forming apparatus may also be performed. Further, since operation commands for functions supportable in the image forming apparatus performed 400 can also be performed in other image forming apparatuses in the operation group, the operation may be performed more quickly.

Although it was explained hereinabove that the image forming apparatus 400 performs a virtualized group operation illustrated in FIG. 28 or FIG. 29 only, in an embodiment, the image forming apparatus 400 may also perform operations explained with reference to FIG. 5.

Figure 32:
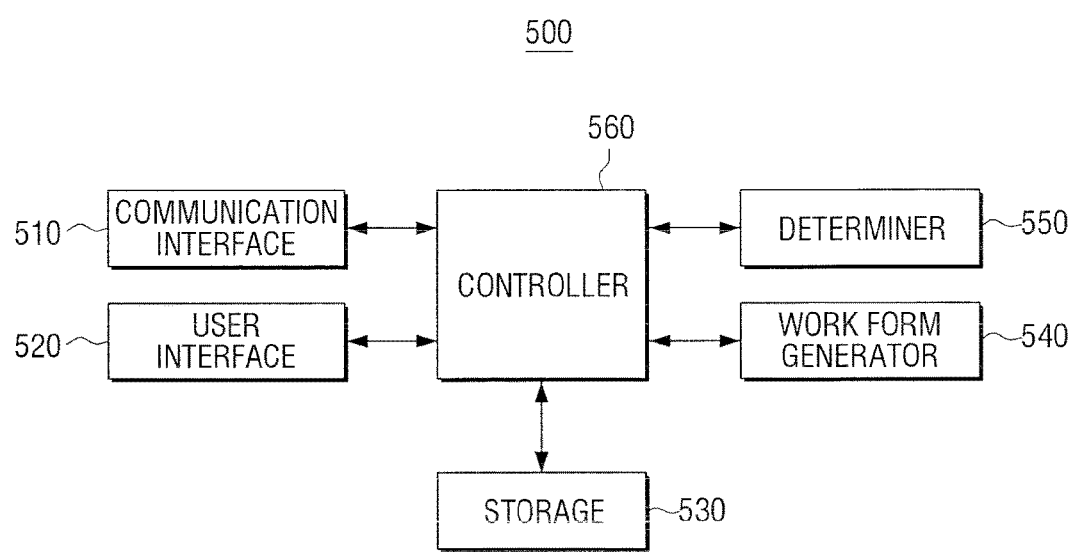
FIG. 32 is a detailed block diagram of a mobile apparatus according to an embodiment of the present disclosure.

FIG. 32 is a detailed block diagram of a mobile apparatus according to an embodiment of the present disclosure.

Referring to FIG. 32, the mobile apparatus 500 according to an embodiment of the present disclosure may consist of a communication interface 510, a user interface 520, a storage 530, a work form generator 540, a determiner 550 and a controller 560.

The communication interface 510 is formed in order to connect the electronic apparatus 500 to an external apparatus, and may be configured in a form accessible via a Local Area Network (LAN), Internet, a Universal Serial Bus (USB) port or a wireless module. Here, the wireless module may be WiFi, WiFi Direct, NFC, Bluetooth, IR or the like.

The communication interface 510 searches for a connectable image forming apparatus 400-1, 400-2, 400-3. Specifically, the communication interface 510 may search for an image forming apparatus 400-1, 400-2, 400-3 that may be connected to the mobile apparatus 500 using a communication method that the mobile apparatus 500 supports. For example, in the case where the communication interface 510 uses WiFi, the communication interface 510 may search for an image forming apparatus that can be connected via WiFi, and when the communication interface 510 supports WiFi and NFC, the communication interface 510 may search for an image forming apparatus connectable in each connecting method.

The communication interface 510 receives apparatus information on a searched image forming apparatus or a selected image forming apparatus. Specifically, the communication interface 510 may receive information on a connectable image forming apparatus, or information on an image forming apparatus selected by the user. Here, the apparatus information may include address information (IP address, MAC information and the like necessary for connecting with the image forming apparatus), function information (information on functions that the image forming apparatus supports such as whether or not color printing is possible, whether or not scanning is possible and the like) and status information (whether or not a current operation is possible, whether or not an error occurred, status of operation progress, etc.) of the image forming apparatus.

Although it was explained hereinabove that receiving the apparatus information is performed after searching or selecting an apparatus, in an embodiment, selecting an apparatus and receiving information on the selected apparatus may be performed at the same time. For example, in the case where the communication interface 510 supports NFC communication, the user may select an image forming apparatus in an NFC tag method, and in response to the user's tag operation, apparatus information on the subject image forming apparatus may be received.

Further, the communication interface 510 receives a UI for controlling functions of an image forming apparatus 400-1, 400-2, 400-3. Specifically, the mobile apparatus 500 according to the present embodiment may display a UI for controlling functions of an image forming apparatus in two forms. In one embodiment, a UI may be received from an image forming apparatus and then displayed, and in another embodiment, information necessary for generating a UI (for example, the aforementioned apparatus information) may be received from the image forming apparatus, and a UI may be generated and displayed using the information received (for example, virtual GUI function). Therefore, in the case where the mobile apparatus 500 is realized according to the first embodiment, the communication interface 510 may receive a UI for controlling functions from an image forming apparatus.

Further, the communication interface 510 transmits a control command to the image forming apparatus 400-1. Specifically, the communication interface 510 may transmit the control command input through the UI to the image forming apparatus 500.

Further, in response to a work form being selected, the communication interface 510 may transmit a control command corresponding to the work form to the image forming apparatus that may perform the work form. Here, the control command is a command that ran be recognized in the image forming apparatus that may perform the work form. Although it was explained according to the present embodiment that a command corresponding to the work form may be transmitted to the image forming apparatus; in an embodiment the work form itself may be transmitted to the image forming apparatus.

Further, the communication interface 510 transmits print data. Specifically, in the case where the user's control command is a print command, fax transmission command or the like regarding a document stored in the mobile apparatus 500, the communication interface 510 may transmit the print data. Here, the print data may be data of a printer language such as postscript (PS), printer control language (PCL) and the like, and if the image forming apparatus 200 supports direct printing, the print data may be a file of PDF, XPS, BMP, JPG, and the like, itself.

Further, the communication interface 510 transmits a work form. Specifically, in order to share a work form generated in the work form generator 540 that will be explained hereinafter with another apparatus, the communication interface 510 may transmit the generated work form to another mobile apparatus, image forming apparatus, management server and the like. Further, the communication interface 510 may receive a work form generated in another apparatus as well.

Further, the communication interface 510 transmits information on an operation group to the image forming apparatus 400. Specifically, the communication interface 510 may transmit information on an operation group of a plurality of image forming apparatuses generated in the mobile apparatus 500 to the image forming apparatus in the operation group.

The user interface 520 is provided with numerous function keys by which the user may set or select a variety of functions being supported by the mobile apparatus 500, and the user interface 520 may display various kinds of information being provided in the mobile apparatus 500. The user interface 520 may be configured as an apparatus that realizes inputs and outputs simultaneously such as a touch screen, or as an apparatus configured by combination of a mouse and a monitor.

The user interface 520 selects an image forming apparatus. If there are a plurality of image forming apparatuses to which the mobile apparatus 500 may be connected, the user interface 520 may display the plurality of image forming apparatuses that are connectable so that one of them may be selected.

The user interface 520 displays the UI for controlling the functions of the image forming apparatus 400. Specifically, the user interface 520 may display the UI transmitted through the communication interface 510, or generate for the UI for itself based on the apparatus information transmitted through the communication interface 510 and display the UI generated. The user may input a control command for controlling the functions of the image forming apparatus 400 through the UI displayed.

Here, through the UI displayed, the user interface 520 may receive input of selecting copy, fax, scan to email, scan to email, or change apparatus setting task and option for the respective task and the like that may be performed in the image forming apparatus 400. Although it was explained hereinabove that the tasks that may be performed in the image forming apparatus are: to copy, fax, scan to email, scan to email or change apparatus setting and the like, in an embodiment, any other task may also be applied, if there is any, being supported by the image forming apparatus besides the aforementioned tasks.

Here, the user may input only one task or a plurality of tasks. That is, the user interface 520 may receive input of a command to perform an operation using a plurality of tasks. For example, the user interface 520 may receive a first task to be performed in the first image forming apparatus 400-1 and a second task (a different task from the first task) to be performed in the second image forming apparatus. Here, the operation using a plurality of tasks may include tasks not supported in the currently selected image forming apparatus 400-1.

Specifically, the user interface 520 may receive input of a task and an option thereof that may be performed in combination with another image forming apparatus 400-2, 400-3 through the UI displayed. Specifically, when the image forming apparatus 400-1 belongs to an operation group 400-1, 400-2, 400-3 and is thus able to perform a virtualized group operation, the user interface 520 may display the UI for receiving input of an operation that may be performed using the tasks of another image forming apparatus in the virtualized group. For example, as illustrated in FIG. 47 and FIG. 48, if the first image forming apparatus 400-1 that does not support a color copying tack is included in an operation group that includes another third image forming apparatus 400-3 that can perform color printing, the first image forming apparatus 400-1 may display a color copying option, which is not possible in a conventional system.

In the case where, the UI displayed to receive inputs of the aforementioned tasks may include a menu for initiating recording (or a command to generate a work form) and a menu for stopping recording. If the user presses the menu for initiating recording and then inputs a task while keeping the menu pressed, the task input may be transmitted to the work form generator 540 that will be explained hereinafter. As the user selects the menu for initiating recording, the user interface 520 may receive input of a name of the work form to be generated.

Further, the UI displayed to receive inputs of the aforementioned tasks may display information on whether or not a recording for generating a work form is in progress, and may include a menu for displaying a pre-stored work form.

Further, the aforementioned UI may include a record pause menu and a record resume menu, in which case, if the record pause menu is selected, the user's selection of task and the like will not be transmitted to the work four generator 540 that will be explained hereinafter until the record resume menu is selected.

Further, the user interface 520 receives input of selecting an option related to generating a work form. Specifically, the user interface 520 may receive input of a setting for cancelling the work of generating a work form when a predetermined period of time has passed since the menu for initiating recording was input, and receive input of a setting for the aforementioned predetermined period of time.

Therefore, when such a setting is made, if the predetermined period of time has passed without a UI manipulation (or even if there is a UI manipulation) since the user selected the menu for initiating recording, a message requesting the user to select a menu for stopping recording may be displayed.

In an embodiment, when additional time has passed since such a message was displayed, the operation of generating a work form may be cancelled, or when a pre-determined period of time has passed, the operation of generating a work form may be cancelled without displaying the aforementioned message.

Further, in the case where each of a plurality of operations includes a scanning task, the user interface 520 may receive input of information on whether or not a script to be used in the scanning task of each of the plurality of tasks is an identical script.

Further, the user interface 520 displays the work form stored, and receives input of selecting one of the displayed work forms. Specifically, the user interface 520 may display a list of work forms stored in the storage 530 that will be explained hereinafter, and receive input of selecting one of the work forms displayed in the list.

Here, the user interface 520 may display information on each work form's compatibility with a current pre-selected image forming apparatus. For example, in the case where the currently selected image forming apparatus can only output image in black and white, of the pre-stored work forms, the user interface 520 may display the work form that has to use color outputs, using an icon such as "!" to indicate that the work form is not compatible with the current image forming apparatus.

In response to selecting by the user, the user interface 520 may display details of the work form selected, and receive input of a command to edit the subject work form. Specifically, the user interface 520 may display tasks included in the work form and operations thereof based on the command to display details of a work form.

Here, user interface 520 may display information on compatibility of the tasks included in the selected work form with the pre-selected image forming apparatus (that is, whether or not the tasks included in the selected work form and options thereof may be performed in the pre-selected image forming apparatus). For example, if the pre-selected image forming apparatus does not have a scanning task but the selected work form includes a scanning task, the user interface 520 may indicate that the scanning task cannot be performed using an icon such as "!". Here, the user may perform editing and deleting of the displayed tasks and options thereof.

The user interface 520 receives a command to proceed with the work form selected. Specifically, the user interface 520 may receive input of a command for the pre-selected image forming apparatus to perform an operation regarding the selected work form. Although it was explained in the present embodiment that an image forming apparatus is selected first and then a work form is selected, in an embodiment, the work form may be selected first and then the image forming apparatus.

If there is a blank field in the selected work form, the user interface 520 may display a message requesting input of a value required in the blank field. The value required in the blank field may be an area of support that the user may input in the editing process after generating the work form, for example, an address of the server in the operation of email to server, a telephone area at receiver's side in fax transmission, and a name of the scanned file to be generated in the scan to server operation.

In the case where a selected work form includes a task or option that the image forming apparatus 400 does not support, the user interface 520 may display to the user that the task or option of the subject work form cannot be performed. Here, the user interface 520 may display that the option may be substituted by an option searched by the determiner 550 that will be explained hereinafter, or request the user to modify the option that cannot proceed.

In the case where the task that the image forming apparatus 400 does not support is the main task of the selected work form, the user interface 520 may display that the subject work form will be cancelled from proceeding.

Further the user interface 520 may display a status of progress of a selected work form. For example, in the case where the work form includes a plurality of tasks, the user interface 520 may display the stage of progress of each task in percentages (%). If the work form includes an operation to be performed in a plurality of image forming apparatuses, the user interface 520 may display an operating status of each image forming apparatus.

Further, the user interface 520 may display information on a location of an image forming apparatus currently proceeding. This displaying may be performed in the case where a printing task is included in a subject operation, requiring the user to fetch printouts.

The user interface 520 receives selecting of an image forming apparatus to be included in an operation group. Specifically, the user interface 520 may display a connectable image forming apparatus, or an NFC-tagged image forming apparatus, from which a plurality of image forming apparatuses to be combined in one operation group may be selected. Here, the user interface 520 may display a task of each image forming apparatus to help the process of generating the operation group.

The storage 530 stores a work form generated. Further, the storage 530 may store a document or print data, and store apparatus information received from the image forming apparatus 400.

Further, the storage 530 stores an operation group generated. Specifically, the storage 530 may store an operation group generated in the controller 560. Here, the storage 530 may store apparatus information on each image forming apparatus of the operation group as well.

The storage 530 may be configured as a storage medium inside the mobile apparatus 500, or as an external storage medium, for example, a removable disk such as a USB memory, or a web server via a network, etc.

The work form generator 540 automatically generates a work form based on a series of user manipulations and an order thereof being input on the UI. Specifically, the work form generator 540 may generate a work form of manipulating commands and orders thereof input by the user through the UI from between the point when the menu for initiating recording was selected until the menu for stopping recording was selected in a language such as Jason or XML that can be recognized by the terminal apparatus and image forming apparatus. Such a work form may include receiver/transmitter information which may be input when executing/editing/generating the work form, and the work form may be changed dynamically. Here, the manipulations of the user may not only relate to manipulations for an image forming apparatus but also for a plurality of image forming apparatuses. For example, a first task (for example, scanning task) to be performed in the first image forming apparatus may be input, and a second task (for example, printing task) that is different from the first task and that is to be performed in the second image forming apparatus may be input.

Further, the work form generator 540 may generate a work form in consideration of options related to generating a work form. Specifically, when there is no additional manipulation by the user for a pre-determined period of time since a work form generating operation was started by selecting a menu for initiating a work form, the work form generator 540 may cancel the current operation of generating a work form.

Further, based on option information on whether or not scripts to be used in the scanning tasks of the plurality of operations are identical to one another, the work form generator 540 may combine the scanning tasks of the plurality of operations and generate a work form.

For example, in the case where the operations performed by the user after selecting the menu for initiating a work form were scan to email and scan to server, these two operations may have been performed in the following two methods: first is to scan script A and transmit the scanned result of script A via email and scan script B and transmit the scanned result of script B to a server; and second, to scan script A and transmit the scanned result of script A via email and transmit the same scanned result of script A to the server.

Therefore, although it was explained hereinabove that the scripts to be used in the plurality of scanning tasks were an identical script, it is possible to generate a work form such that no modification is made on the first scan to email function, but such that for the second scan to server function the scanned image of the previous process can be transmitted to the server without an additional scanning operation.

Further, when a pre-stored work form is edited, the work form generator 540 may update the work form in response to the user's modification.

The determiner 550 determines whether or not a work form is executable in the selected image forming apparatus. Specifically, the determiner 550 may determine whether or not a function or option thereof included in a selected work form is valid in the current image forming apparatus. For example, in the case where the pre-selected image forming apparatus does not have a scanner but the selected work form includes a scanning task, the determiner 550 may determine that an invalid task is included.

Further, in the case where the selected work form includes a task or option that cannot be performed in the selected image forming apparatus, the determiner 550 may search for a function and option that can substitute for the subject function and option.

For example, in the case where the selected work form includes printing having a color print option but the selected image forming apparatus is an apparatus that cannot perform color printing, the determiner 550 may search for a black and white option as an option that can substitute for the color print option. Further, in the case where the selected work form includes a scan to server task but it is impossible to access the server, the determiner 550 may search for a scan to email task as a function that can substitute for the scan to email task.

Here, the determiner 550 may search for a substitutable task and option in the selected image forming apparatus, but in an embodiment, the determiner 550 may search for a substitutable task and option in another image forming apparatus in an operation group. For example, in the case where a the selected work form includes printing task having a color printing option but the selected image forming apparatus cannot a perform color printing operation, another image forming apparatus that can perform a color printing operation in the operation group may be searched as the substitutable image forming apparatus.

Further, the determiner 550 may control the user interface 520 only to display the fact that the task or option included in the work form cannot be performed instead of directly displaying a task or option that can substitute for the task or option in the work form, and receive selecting of a substitutable task or option by the user. Meanwhile, the task or option searched in the aforementioned process may be provided to the user as a substitutable task or option.

The controller 560 controls each configuration provided in the mobile apparatus 500. Specifically, upon receiving from the user a command to run an application for controlling an image forming apparatus, the controller 560 may control the user interface 520 to display a UI for controlling driving of the image forming apparatus.

Further, when the menu for initiating recording is selected from the UI displayed, the controller 560 may control the work form generator 540 to generate a work form based on the manipulating commands and an order thereof being input by the user from after the menu for initiating recording is selected until the menu for stopping recording is selected.

Further, upon receiving input of a command to execute a pre-stored work from the controller 560 may control the determiner 550 such that it may determined whether or not the selected work form can be executed in the pre-selected image forming apparatus, and if determined executable, the controller 560 may control the communication interface 510 such that a control command corresponding to such work form may be transmitted to the image forming apparatus 400. Here, the control command to be transmitted is a control command that may be recognized by the subject image forming apparatus 400. That is, a command of a work form generated by manipulating an apparatus called A may not be a command that can be recognized in an apparatus called B. Therefore, in the present embodiment, when executing a work form, a command will be converted into a command that can be recognized in the subject apparatus, and then transmitted.

Meanwhile, although it was explained that in the present embodiment the mobile apparatus 500 generates a work form with commands that can be interpreted in a subject image forming apparatus and transmits the same, such an operation may be performed in the image forming apparatus 400 instead.

That is, the controller 560 may be configured to transmit a work form to the image forming apparatus 400 when a command to execute the work form is input, and parse the work form transmitted to the image forming apparatus 400 to perform the task included in the work form.

Further, the mobile apparatus 500 may control the communication interface 510 such that information on a plurality of connectable image forming apparatuses may be collected, and may generate an operation group that includes the plurality of image forming apparatuses based on the information received. This generating operation may be performed automatically or manually. Details of the method for generating an operation group are the same as in the method for generating an operation group in an image forming apparatus, and thus repeated explanation will be omitted.

Such a mobile apparatus 500 according to the present embodiment is able to generate a work form using only the manipulating operations for controlling functions of an image forming apparatus, and may thus generate the work form easily. Further, since the mobile apparatus 500 generates the work form based on the user's manipulating commands, the generated work form can easily be used in multiple devices.

Such a mobile apparatus 500 according to the present embodiment may generate a work form using the manipulating operations for controlling functions of an image forming apparatus, thereby improving user convenience. Further, since an operation group may be generated using a tagging operation between the mobile apparatus 500 and the image forming apparatus, the user may easily generate an operation group intuitionally even when he/she does not know the name of the image forming apparatus and the like.

Figure 33:
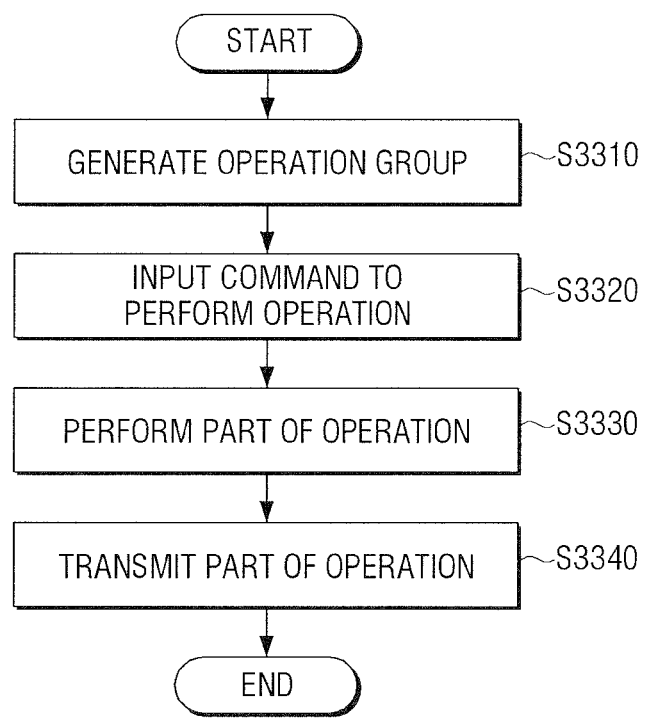
FIG. 33 is a flowchart provided to explain a print control method according to another embodiment of the present disclosure.

FIG. 33 is a flowchart provided to explain a print control method according to an embodiment of the present disclosure.

Referring to FIG. 33, an operation group that includes an image forming apparatus and other image forming apparatuses connectable to the image forming apparatus is generated (S3310). Specifically, the operation group may be generated in various forms. This will be explained hereinafter with reference to FIGS. 33 to 46.

Further, a command to perform an operation using a plurality of tasks is input (S3320). Specifically, a command to perform an operation using a virtualized group operation method may be input by the user. Such an operation command may be input into the image forming apparatus 400 itself or through the mobile apparatus 500. When receiving input of the operation command through the mobile apparatus 500, the operation command may be a command to execute a work form using the virtualized group operation method.

Further, a portion of the operation is performed by performing at least one of a plurality of tasks corresponding to the operation (S3330). Specifically, the image forming apparatus 400-1 may be one of a printer, a scanner, a copy machine, a facsimile and a multi-function peripheral that may perform at least one task of a scanning task, a printing task, a fax task and an editing task, and the portion of the operation may be performed using a component (or a function that can be performed) included in the apparatus that received the operation command.

Further, the rest of the operation not performed in the image forming apparatus is transmitted to another image forming apparatus in the operation group (S3340). Specifically, a task that cannot be performed in the subject image forming apparatus 400 may be transmitted to another image forming apparatus in the operation group, that can perform the subject task, or may be performed in the subject image forming apparatus 400, but if it is faster to perform the task in the other image forming apparatus, a portion of the operation (that is, the rest of the operation not to be performed in the subject image forming apparatus) may be transmitted to the other image forming apparatus in the operation group.

Here, the operation may be transmitted not to just one image forming apparatus but to a plurality of other image forming apparatuses. Further, such a transmitting operation may be performed not after a previous task of the image forming apparatus is completed but at the same time as the previous task of the image forming apparatus.

Such a print control method according to the present embodiment forms an operation group with other connectable image forming apparatuses, and thus a task not supported in the subject image forming apparatus 400 may also be performed. Further, a task that is supported in the image forming apparatus 400 may also be performed in another image forming apparatus in an operation group, and thus the operation may be performed more quickly. The print control method as that illustrated in FIG. 33 may be executed in an image forming apparatus having configurations of FIG. 30 or FIG. 31, and in an image forming apparatus having other configurations.

Further, the aforementioned print control method may be realized as a program that includes an algorithm executable in a computer, and the program may be stored in and provided through a non-transitory computer readable medium.

Figure 34:
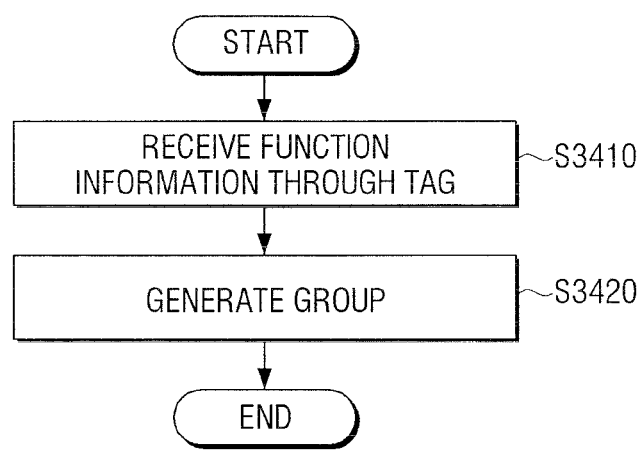
FIG. 34 is a flowchart provided to explain a grouping method according to a first embodiment.
Figure 35:
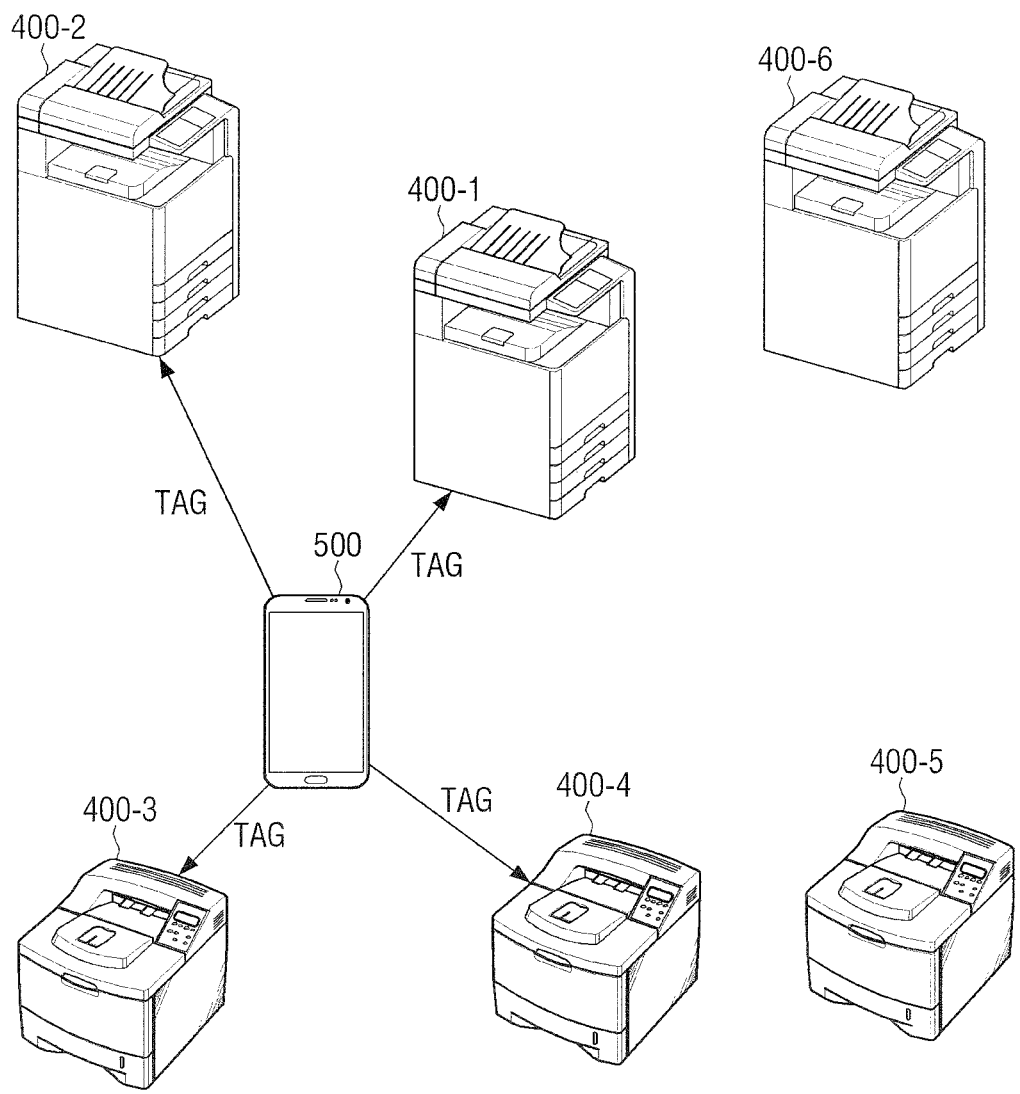
FIG. 35 is a view provided to explain the grouping method according to the first embodiment.

FIG. 34 is a flow chart provided to explain a grouping method according to a first embodiment, and FIG. 35 is a view provided to explain the grouping method according to the first embodiment.

Referring to FIGS. 34 and 35, a tagging for a plurality of image forming apparatuses is performed in the mobile apparatus 500. Such a tagging operation may be performed in the process of generating a work form in the mobile apparatus 500, that is, in the process of generating an M-plow.

Further, the image forming apparatus 400 receives information on an image forming apparatus 400 tagged in the mobile apparatus 500 from the mobile apparatus 500 (S3410). Here, the information being transmitted may include address information and function information of the image forming apparatus.

Then, the image forming apparatus 400 may generate an operation group based on the information received (S3420). That is, a plurality of image forming apparatuses each having a history of being NFC-tagged in the mobile apparatus 500 may be combined to generate one operation group.

For example, as illustrated in FIG. 35, in the case where the mobile apparatus 500 had performed NFC tagging with four image forming apparatuses 400-1, 400-2, 400-3, 400-4 of six connectable image forming apparatuses, the mobile apparatus 500 may transmit to a certain first image forming apparatus 400-1 information on the image forming apparatus having history of being NFC-tagged. Here, the first image forming apparatus 400-1 may combine the four image forming apparatuses 400-1, 400-2, 400-3, 400-4 including itself and generate an operation group.

Although it was explained hereinabove that only one apparatus receives information from the mobile apparatus 500, but in an embodiment, the mobile apparatus 500 may transmit the NFC tagging information to every image forming apparatus that has history of being tagged. That is, the grouping method as that illustrated in FIGS. 34 and 35 may be performed individually in each image forming apparatus of an operation group, or performed in one image forming apparatus in an operation group first and then notified to the rest of the apparatuses.

Figure 36:
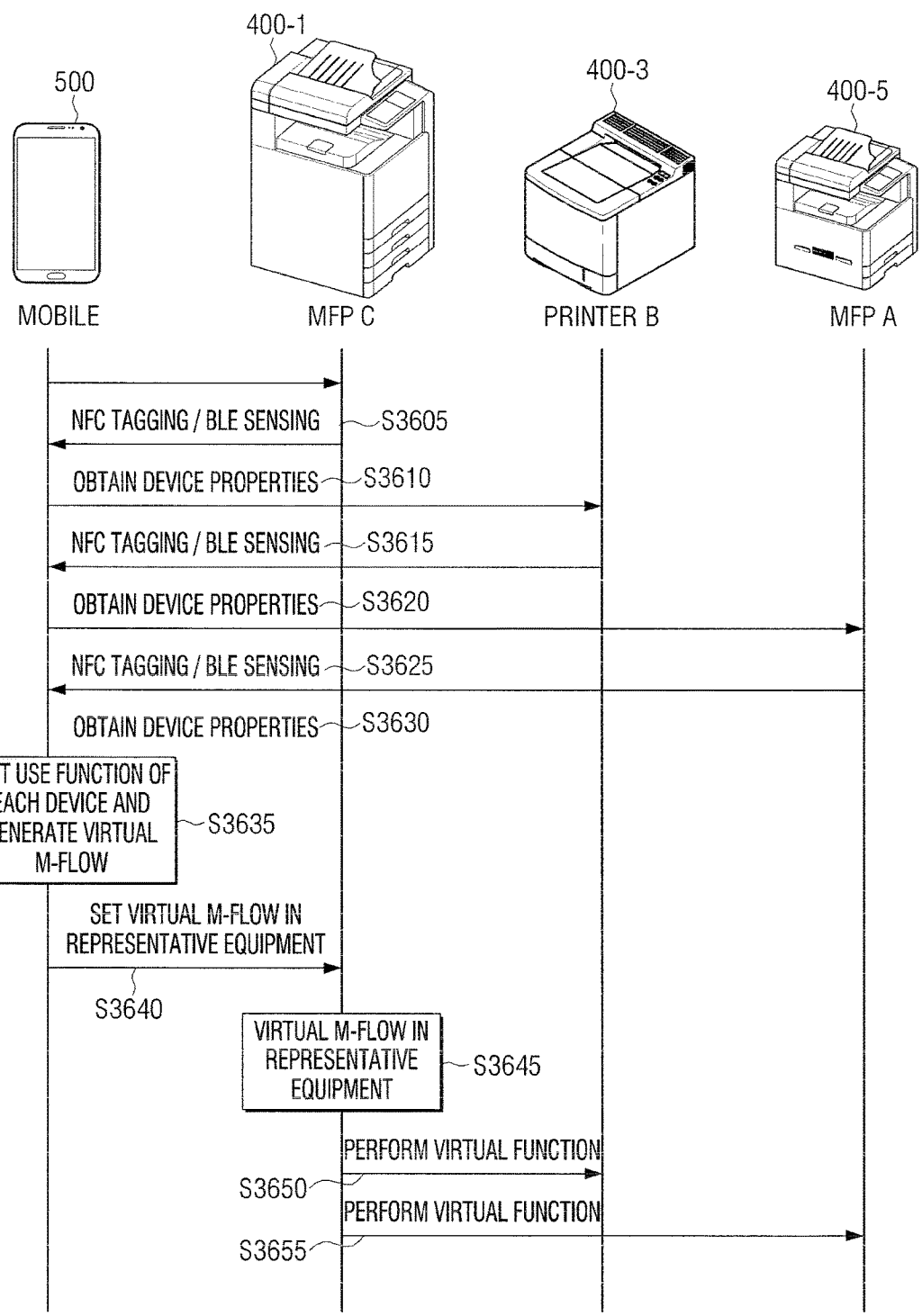
FIGS. 36 and 37 are sequence views provided to explain a series of the print control method including the grouping method according to the first embodiment.

FIG. 36 is a sequence view provided to explain a series of print control method that includes a grouping method according to a first embodiment.

Referring to FIG. 36, the mobile apparatus 500 may sequentially perform an NFC tagging operation with a plurality of image forming apparatuses 400-1, 400-3, 400-5

(S3605, S3615, S3625), and receive apparatus information of each image forming apparatus 400-1, 400-3, 400-5 (S3610, S3620, S3630). Here, the apparatus information may include address information and function information of the image forming apparatus as illustrated in FIG. 38.

The mobile apparatus 500 may generate a work form (specifically, M-plow) that uses tacks of the plurality of image forming apparatuses 400-1, 400-3, 400-5 using the apparatus information received (S3635). Details of the method for generating an M-plow will be explained hereinafter with reference to FIG. 39.

The mobile apparatus 500 that generated a work form transmits the pre-received apparatus information to the image forming apparatus 400-1 (S3640). Here, the apparatus information may be information on an image forming apparatus having history of NFC tagging in the mobile apparatus 500, but there is no limitation thereto, and thus it may be information on an image forming apparatus that belongs to an operation group if the operation group itself can be generated in the mobile apparatus 500. Here, the apparatus information being transmitted may be information on all the image forming apparatuses having history of NFC tagging, but it may instead be information on the image forming apparatus being used in the process of generating a work form. That is, information on the image forming apparatus having history of NFC tagging may be a portion of the apparatus information.

The image forming apparatus 400-1 that received the NFC tagging information combines the three image forming apparatuses 400-1, 400-3, 400-5 and generates one operation group (S3645). Here, the image forming apparatus in the operation group may perform operations of tasks that it cannot performed by itself. For example, the first image forming apparatus 400-1 that cannot perform a color copying operation by itself may display a UI for receiving selecting of a color copying operation once it is virtual grouped.

Then, when a control command to use a virtualization function is input by the user, the image forming apparatus 400-1 performs a task that it can perform by itself, while transmitting the rest of the operation to other image forming apparatuses 400-3, 400-5 in the operation group and perform the required operation (S3650, S3655).

For example, in the case where the user's operation command is a command to perform a color copying operation, the first image forming apparatus 400-1 cannot perform color printing but the image forming apparatus 400-3, 400-5 can perform color printing, the first image forming apparatus 400-1 scans the script, pages 1-10. Then, the first image forming apparatus 400-1 transmits a portion of the scan image, pages 1-5, to the third image forming apparatus 400-3 while transmitting a command to print the same as well (S3650). Further, the first image forming apparatus 400-1 may transmit the rest of the scan image, pages 6-10, to the fifth image forming apparatus 400-4, while transmitting a command to print the same as well (S3655).

Although it was explained hereinabove that the image forming apparatus 400-1 itself distributes the operation requested by the user and provides the distributed operation to other image forming apparatuses, in an embodiment, such a distributing operation may be performed in the mobile apparatus 500 instead. This will be explained in detail hereinafter with reference to FIG. 37.

Figure 37:
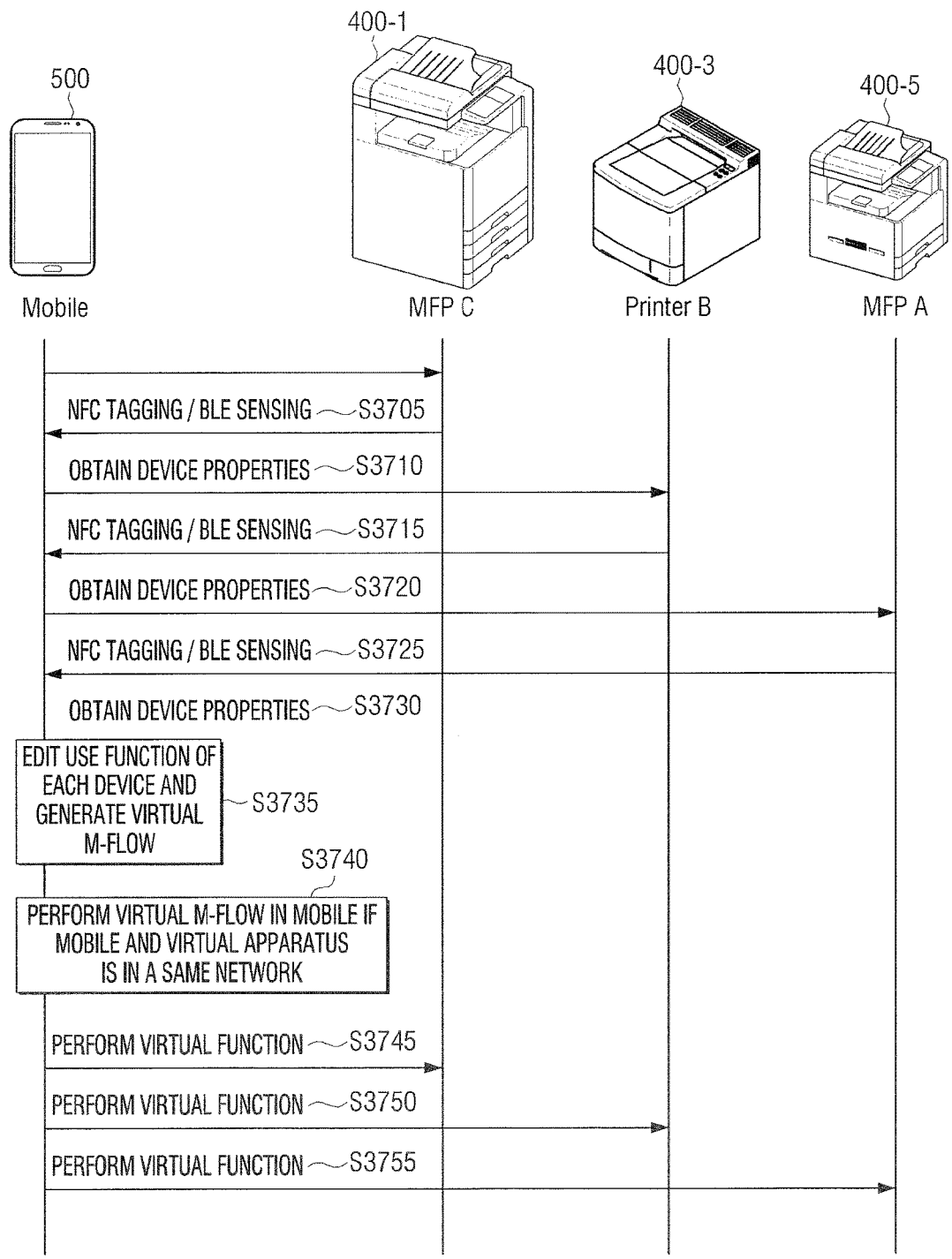

FIG. 37 is a sequence view provided to explain a series of operations having another form, including a grouping method according to the first embodiment.

Referring to FIG. 37, the mobile apparatus 500 may sequentially perform an operation of NFC tagging with a plurality of image forming apparatuses 400-1, 400-3, 400-5 (S3705, S3715, S3725), and receive apparatus information of each image forming apparatus 400-1, 400-3, 400-5 (S3710, S3720, S3730). Here, the apparatus information may include address information and function information of the image forming apparatus as illustrated in FIG. 38.

The mobile apparatus 500 may generate a work form (specifically, M-plow) that uses tasks of a plurality of image forming apparatuses 400-1, 400-3, 400-5 using the apparatus information received (S3735). Details of the method for generating an M-plow will be explained hereinafter with reference to FIG. 39.

Here, the mobile apparatus 500 may generate an operation group using information collected (S3735). Specifically, image forming apparatuses having history of NFC tagging may be combined to generate the operation group, but there is no generation thereto. That is, an operation group may be generated in other various methods as those illustrated with reference to FIG. 4.

When an operation group is generated, the mobile apparatus 500 may change a UI for a certain first image forming apparatus and display the same (S3740). Specifically, a UI formed by adding a color copying option to the UI for the first image forming apparatus that cannot perform color copying operations may be displayed.

Upon receiving an operation command that requires a virtualized group operation from the user through the aforementioned UI, the mobile apparatus 500 may distribute tasks for performing the input operation and transmit each image forming apparatus 400-1, 400-3, 400-5 an operation command corresponding to each distributed task (S3745, S3750, S3755).

For example in the case where the user's operation command is a command to perform a color copying operation, the first image forming apparatus 400-1 cannot perform color printing and the image forming apparatus 400-3, 400-5 can perform color printing, the mobile apparatus 500 may transmit a command to the first image forming apparatus 400-1 to scan the script, pages 1-10, and to transmit a portion of the scan image, pages 1-5, to the third image forming apparatus 400-3, and to transmit the rest of the scan image, pages 6-10, to the fifth image forming apparatus 400-05 (S3745). Further, the mobile apparatus 500 may transmit a command to the third image forming apparatus 400-3 to print the scan image being transmitted from the image forming apparatus 400-1 (S3750), and transmit a command to the fifth image forming apparatus 400-5 to print the scan image being transmitted from the first image forming apparatus 400-1 (S3755).

Although it was explained hereinabove that scan data may be transmitted to each image forming apparatus, if the data cannot be transmitted directly to the image forming apparatus, a repository of a server may be used.

For example, the mobile apparatus 500 may transmit a command to the first image forming apparatus 400-1 to scan the script, pages 1-10, and to store a portion of the scan image, pages 1-5, to location A in the server, and to store the rest of the scan image, pages 6-10, in location B in the server. Further, when it is confirmed from the first image forming apparatus 400-1 that performing an operation has been completed, the mobile apparatus 500 may transmit a command to the third image forming apparatus 400-3 to print the data stored in location A in the server, and transmit a command to the fifth image forming apparatus 400-5 to print the data stored in location B in the server.

Such a grouping method according to the first embodiment combines a plurality of image forming apparatuses having history of NFC tagging in one operation group, and thus the user may combine the plurality of image forming apparatuses intuitionally.

FIG. 38 is a view illustrating an example of information that may be stored by the mobile apparatus of FIG. 36.

Referring to FIG. 38, the mobile apparatus 500 receives address information from each image forming apparatus. Further, the mobile apparatus 500 may receive function information that may be performed in each image forming apparatus.

Therefore, the mobile apparatus 500 stores the address and function information of the plurality of image forming apparatuses in a look-up table format. Further, the mobile apparatus 500 may use such information in generating an operation group, and may transmit the information to be used in generating an operation group in the image forming apparatus.

Figure 39:
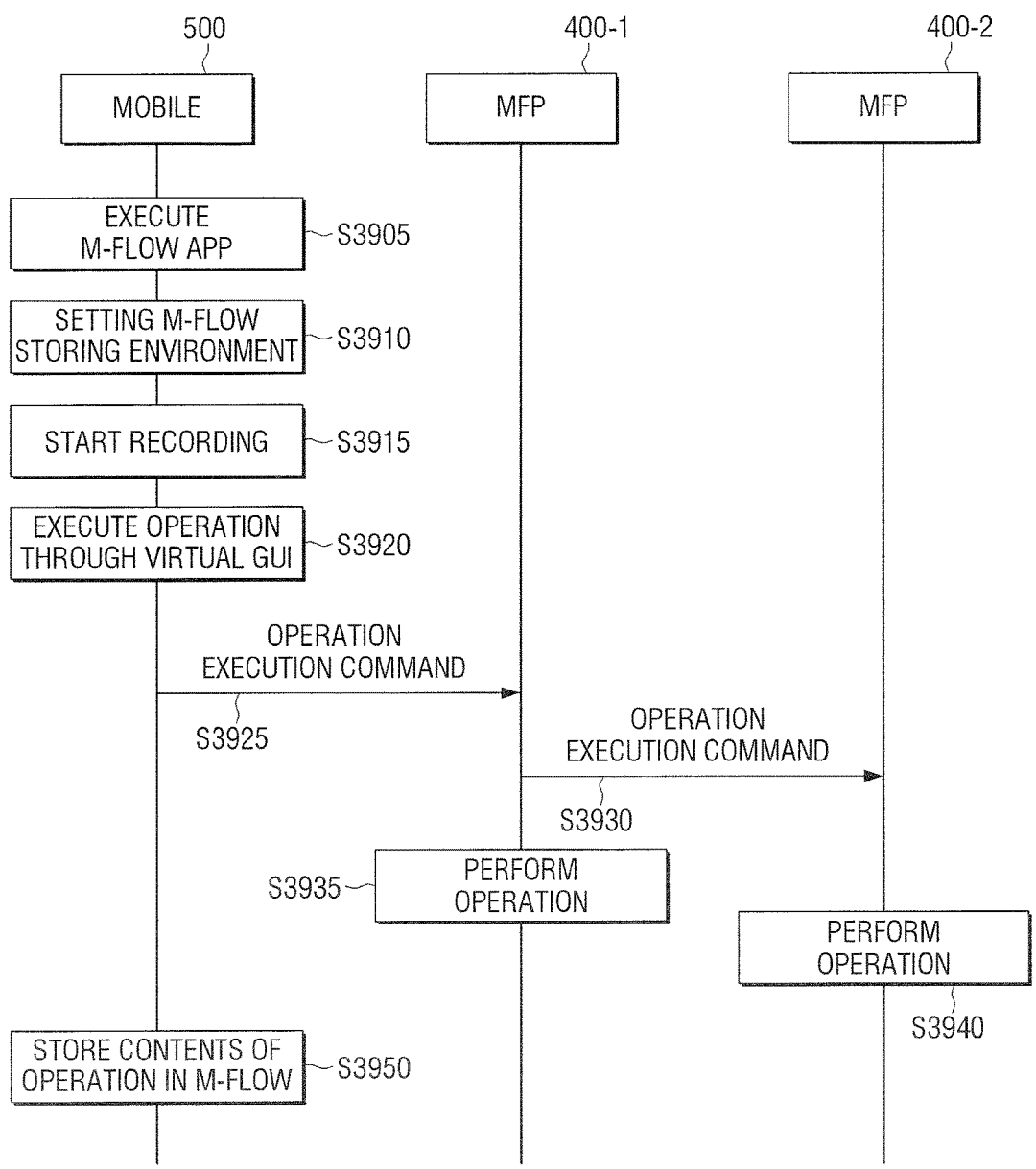
FIG. 39 is a view provided to explain the operation of generating an M-plow in FIGS. 36 and 37.

FIG. 39 is a view provided to explain an operation for generating an M-plow of FIG. 36 and FIG. 37.

Referring to FIG. 39, first of all, the mobile apparatus 500 runs an application for controlling driving of the image forming apparatus 400-1, 400-2 (S3905). As the application is run, the mobile apparatus 500 displays a UI for receiving selecting of a task to be performed in the image forming apparatus as that illustrated in FIG. 40.

Thereafter, the mobile apparatus 500 receives settings for an option related to generating a work form (S3910). Specifically, the mobile apparatus 500 may display a UI for receiving settings for an option related to generating a work form, and receive settings for the option related to generating a work form through the UI. In an embodiment, such a setting operation may operate only when selected by the user.

Further, when a command to initiate recording is input on the UI displayed (S3915), user manipulation commands made after the command to initiate recording was input are recorded.

Further, a control command for controlling driving of the image forming apparatus 400-1 is input through the UI (S3920). Further, the control command input is transmitted to the image forming apparatus 400-1 (S3925). Although it was explained hereinabove that a control command regarding only one apparatus may be input and transmitted, in an embodiment, a control command for a plurality of apparatuses may be input. Here, the command for a plurality of apparatuses may be a command for the second image forming apparatus to perform task B after the first image forming apparatus performs task A, or a command to perform a virtualized group function in the first image forming apparatus (task A of the first image forming apparatus+task B of the second image forming apparatus).

The image forming apparatus 400-1 that received input of a control command performs a task corresponding to the control command (S3935). Further, if the control command received from the user is a command to perform a virtualized group function as aforementioned, the image forming apparatus 400-1 may transmit the rest of the task to another image forming apparatus 400-2 (S3930). Further, the other image forming apparatus 400-2 may perform the rest of the task transmitted (S3940).

When the menu for stopping recording is selected after a series of control commands are input on the UI displayed, a work form is generated and stored based on the series of control commands input since the time point when the menu for initiating recording was selected until the menu for stopping recording was selected (S3950).

Such a method for generating a work form according to the present embodiment may generate the work form using manipulating operations for controlling functions of an image forming apparatus, thereby improving user convenience. Further, an operation group may be generated easily using the information being used when generating the work form. The method for generating a work form as that in FIG. 39 may be performed in a mobile apparatus having the configuration of FIG. 32, or in a mobile apparatus having other configurations. Further, operations excluding the aforementioned step 3925 (step of transmitting an operation from the mobile apparatus to the image forming apparatus) may be performed in the image forming apparatus having the configuration of FIG. 30 or FIG. 31, or in an image forming apparatus having other configurations.

Further, the aforementioned method for generating a work form may be realized as a program that includes an algorithm executable in a computer, and the program may be stored in and provided through a non-transitory computer readable medium.

Figure 40:
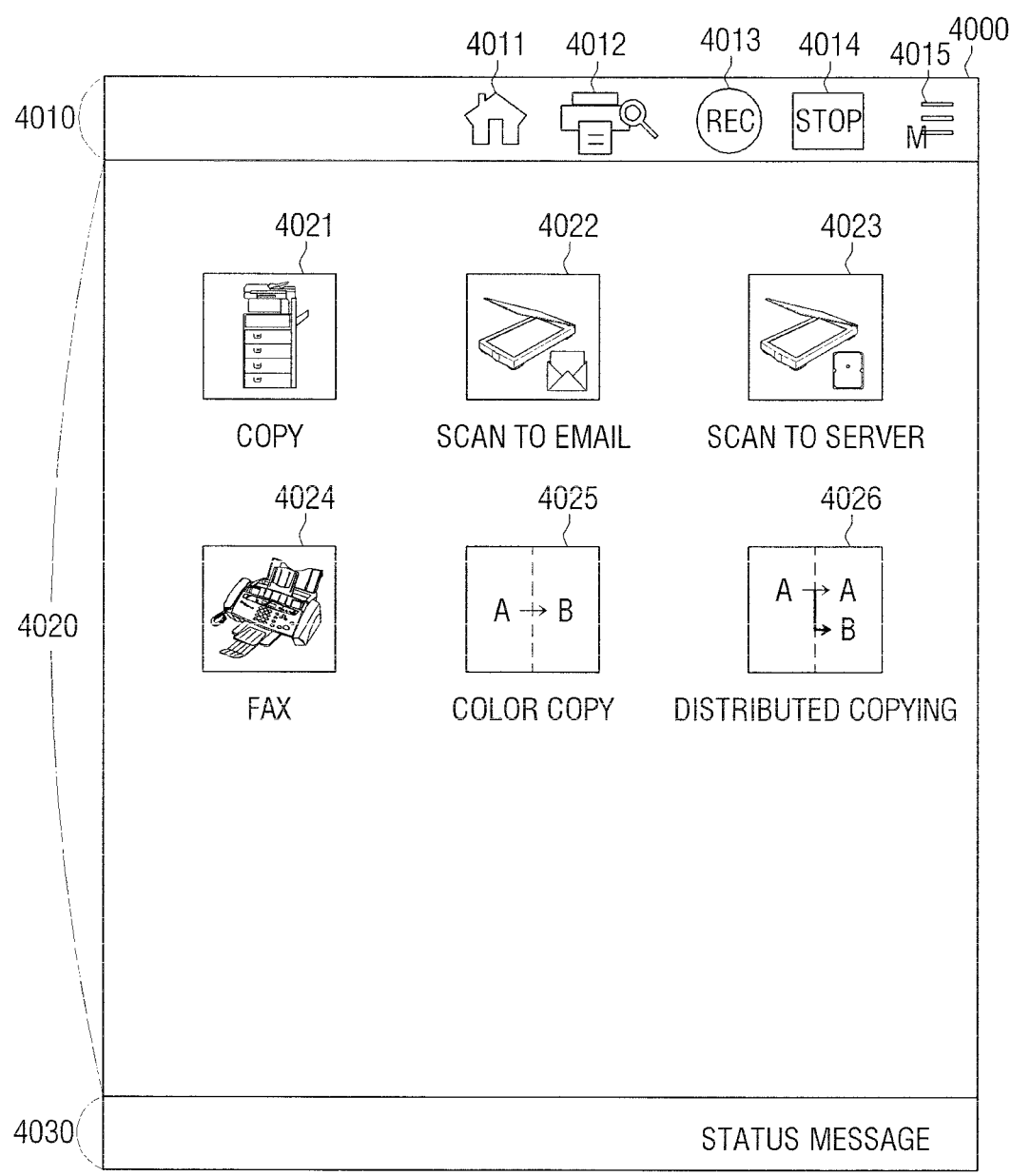
FIG. 40 is a view illustrating an example of a user interface window that may be displayed in the mobile apparatus of FIG. 36 or FIG. 37.

FIG. 40 is a view illustrating an example of a user interface window that may be displayed in the mobile apparatus of FIG. 36.

Referring to FIG. 40, the user interface 4000 includes a menu area 4010, a function area 4020 and a status display area 4030.

The menu area 4010 is an area that displays a menu for generating a work form and a menu for executing a work form and the like. The menu area 4010 includes a home menu 4011, a menu for selecting an image forming apparatus 4012, a menu for initiating recording 4013, a menu for stopping recording 4014 and a list menu 4015.

The home menu 4011 is an area for receiving input of a command to display a UI as that illustrated in FIG. 40. When the user selects the home menu 4011, even when the contents as those illustrated in FIG. 40 in display on the function area 4020, the screen changes to that illustrated in FIG. 40.

The menu for selecting an image forming apparatus 4012 is an area for receiving input of a command to search for an image forming apparatus for controlling a function or for performing a work form.

The menu for initiating recording 4013 is an area for receiving input of a command to receive input of a command to initiate recording for generating a work form. When the user selects the menu for initiating recording 4013, an additional UI for receiving input of a name of a work form to be newly generated may be displayed.

The menu for stopping recording 4014 is an area for receiving input of a command to stop generating a work form. When the user selects the menu for stopping recording 4014 after it selected the menu for initiating recording 4013, a work form operation stops. Such a menu for stopping recording 4014 is inactivated until the menu for initiating recording 4013 is selected.

The list menu 4015 is an area for receiving input of a command to display a list of work forms pre-stored in the mobile apparatus 500. When the list menu 4015 is selected, a pre-generated work form list may be displayed.

The function area 4020 is an area for displaying a task that may be performed in an image forming apparatus. The function area 4020 includes a copy area 4021, a scan to email area 4022, a scan to server area 4023, a fax area 4024, a color copy area 4025 and a distributed copy area 4026. Although it is illustrated that in the present embodiment only six tasks are supported, the number and type of an icon to be displayed in the function area 4020 may vary depending on the function of the image forming apparatus connected.

The copy area 4071 is an area for receiving selecting of a copying tack as a task to be performed in an image forming apparatus. When the user selects the copying area 4021, an additional UI for receiving an option related to the copying task may be displayed.

The scan to email area 4022 is an area for receiving selecting of a scan to email task as a task to be performed in an image forming apparatus. When the user selects the scan to email area 4022, an additional UI for receiving input of an option related to the scan to email task may be displayed.

The scan to server area 4023 is an area for receiving selecting of a scan to server task as a task to be performed in an image forming apparatus. When the user selects the scan to server area 4023, an additional UI for receiving selecting an option related to the scan to server task may be displayed.

The fax area 4024 is a task for receiving selecting of a task to be performed in an image forming apparatus. When the user selects the fax area 4024, an additional UI for receiving selecting an option related to a fax task may be displayed.

The color copy area 4025 is an area for receiving selecting of a copy copying task as a virtualized group function. This is an area for using a task of another image forming apparatus provided with a color image former in an operation group by a virtualized group function when a subject image forming apparatus 400-1 does not include a color image former. However, if there is no apparatus having a color image forming in an operation group, the color copy area may be inactivated.

The distributed copy area 4026 is an area for receiving selecting of a copying task as a virtualized group operation to be performed in an image forming apparatus. However, since this is a copy command using another image forming apparatus to perform an operation faster, when a subject operations is selected, a UI for receiving selecting of another image forming apparatus in an operation group may be displayed. Although it was explained hereinabove that when the distributed copy area 4026 is selected, an image forming apparatus is selected by the user, in an embodiment, an image forming apparatus may be determined automatically according to pre-determined condition. Further, in the case where it is faster or necessary to process an operation in a current image forming apparatus without distributing the operation (for example, when copying 1 piece of paper), the distributed copy area may be inactivated.

The status display area 930 displays an operating status of the mobile apparatus 500. Specifically, if the status of the mobile apparatus 500 is a status where the menu for initiating recording for generating a work form has been selected, the status display area 930 may display that the mobile apparatus 500 is recording, and when the recording ends, display that the recording ended.

Figure 41:
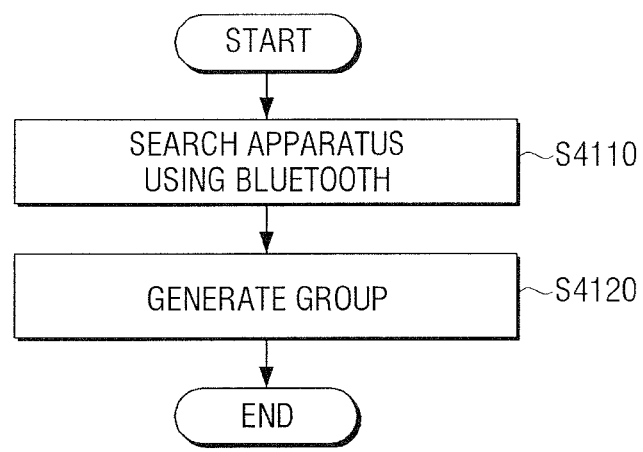
FIG. 41 is a flowchart provided to explain a grouping method according to a second embodiment.
Figure 42:
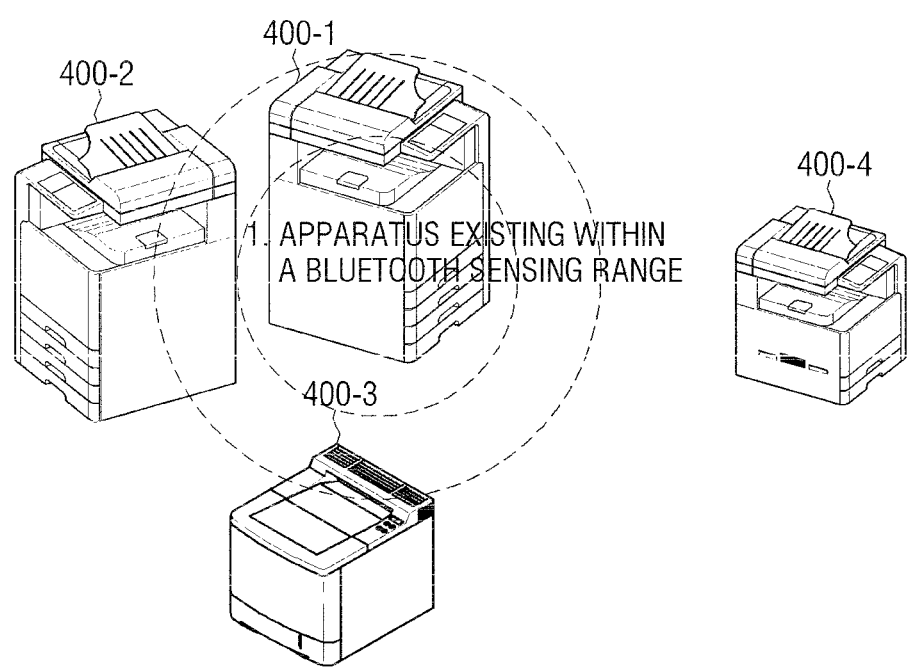
FIG. 42 is a view provided to explain the grouping method according to the second embodiment.

FIG. 41 is a flowchart provided to explain a grouping method according to a second embodiment, and FIG. 42 is a view provided to explain a grouping method according to a second embodiment.

Referring to FIG. 41 and FIG. 42, the first image forming apparatus 400-1 searches for another image forming apparatus using a short distance network such as Bluetooth (S4110). Although it was explained hereinabove that only Bluetooth is used, in an embodiment, other wireless communication methods may be used instead.

Further, an operation group that includes the image forming apparatus searched may be generated (S4120).

For example, if there are three image forming apparatuses 400-1, 400-2, 400-3 arranged within a range where Bluetooth communication is possible between the image forming apparatuses 400-1, 400-2, 400-3 as illustrated in FIG. 42, the first image forming apparatus 400-1 may search the image forming apparatus 400-2, 400-3 in the Bluetooth communication method. Therefore, the first image forming apparatus 400-1 generate an operation group with the three image forming apparatuses 400-1, 400-2, 400-3.

Such a grouping method according to the second embodiment combines apparatuses that are communicable via a short distance network such as Bluetooth having a short communication distance, and thus may combine image forming apparatuses existing within a short distance to generate an operation group. That is, this method may combine image forming apparatuses that can be easily approached by the user.

Although it was explained hereinabove that a distance between apparatuses may be determined using Bluetooth, in an embodiment, the distance between apparatuses may be determined by comparing an access point receivable in each image forming apparatus.

Figure 43:
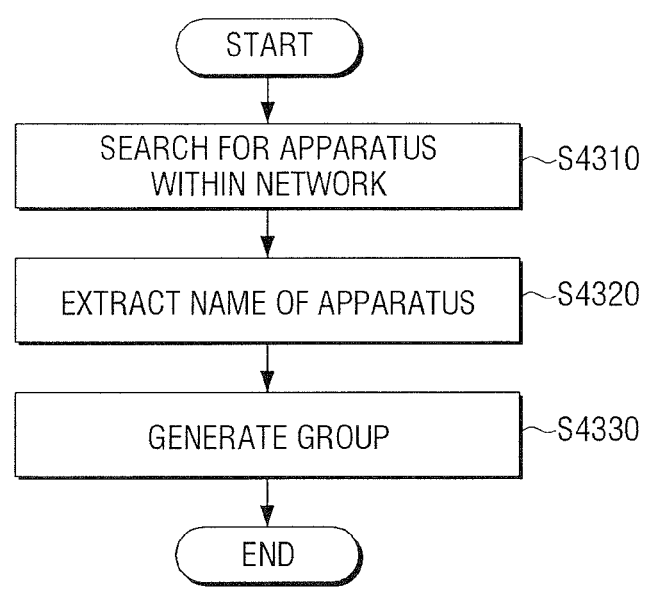
FIG. 43 is a flowchart provided to explain a grouping method according to a third embodiment.
Figure 44:
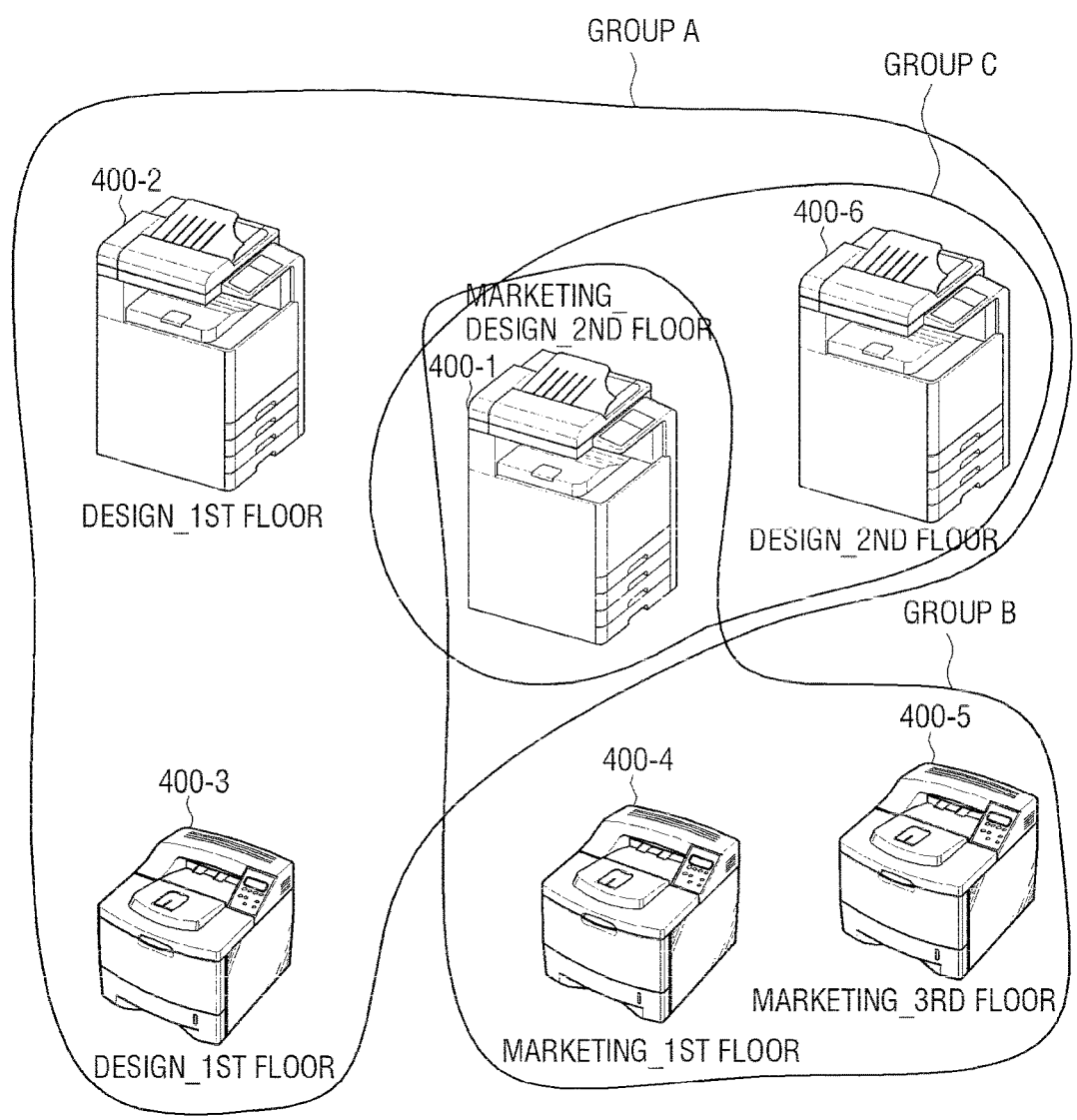
FIG. 44 is a view provided to explain the grouping method according to the third embodiment.

FIG. 43 is a flowchart provided to explain a grouping method according to a third embodiment, and FIG. 44 is a view provided to explain the grouping method according to the third embodiment.

Referring to FIGS. 43 and 44, a connectable image forming apparatus is searched for (S4310). Specifically, an image forming apparatus may search for an image forming apparatus connectable using a communication method (wired or wireless method) that the subject image forming apparatus supports.

Further, a name of apparatus is extracted from the image forming apparatus searched (S4320). However, although it was explained hereinafter that only the name of apparatus is used, in an embodiment, explanation on the image forming apparatus may be used besides the name of apparatus.

Further, an operation group is generated based on the name of apparatus extracted (S4330). Specifically, it is possible to generate the operation group to include another image forming apparatus having a keyword identical to a keyword included in the name of apparatus of the image forming apparatus 400-1. Here, the keyword may be designated by the user, or extracted automatically. Further, when there are numerous keywords in the name of apparatus of an image forming apparatus, it is possible to generate an operation group for each keyword.

For example, as illustrated in FIG. 44, in the case where the name of apparatus of the image forming apparatus 400-1 is marketing_design_2nd floor, and the extracted keyword is marketing, it is possible to combine the image forming apparatuses 400-1, 400-4, 400-5 and generate a marketing operation group.

Further, if the extracted keyword is design, it is possible to combine image forming apparatuses 400-2, 400-3, 400-6 and generate a design operation group.

Further, if the extracted keyword is 2nd floor, it is possible to combine the image forming apparatuses 400-1, 400-6 and generate a 2nd floor operation group.

Further, there are only a few extracted keywords, the image forming apparatus 400-1 may automatically generate a first operation group 400-1, 400-4, 400-5, a second operation group 400-1, 400-2, 400-3, 400-6, and a third operation group 400-1, 400-6 using each of the marketing, design and 2nd floor included in the name of apparatus of the first image forming apparatus 400-1.

As aforementioned, such a grouping method according to the third embodiment combines image forming apparatuses based on the name of apparatus, and thus it is possible to generate an operation group without having to use an additional configuration and it is possible to generate an operation group automatically without a manipulation by the user.

Figure 45:
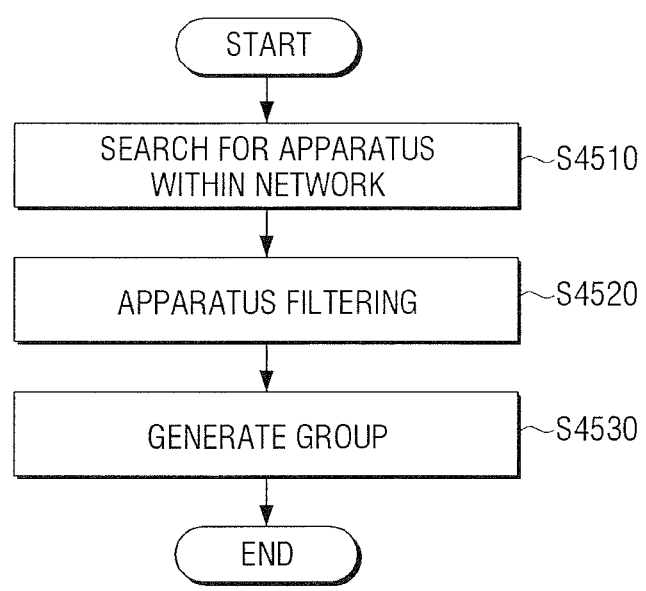
FIG. 45 is a flowchart provided to explain a grouping method according to a fourth embodiment.

FIG. 45 is a flowchart provided to explain a grouping method according to a fourth embodiment, and FIG. 46 is a view provided to explain the grouping method according to the fourth embodiment.

Referring to FIG. 45 and FIG. 46, an image forming apparatus that is connectable within a network is searched for (S4510). Specifically, the image forming apparatus searches for an image forming apparatus that is connectable within the network, and extracts address information of each image forming apparatus. Here, the address information may include an IP address, a hop count and an SSID, etc.

Further, an apparatus filtering is performed (S4520). Specifically, another image forming apparatus having an address area identical to the IP address of the image forming apparatus may be searched for. That is, image forming apparatuses except for those having an IP address of an identical subnet may be filtered.

However, even when a plurality of image forming apparatuses are in a same subnet, they may be arranged physically spaced apart from each other. For example, in the case of a company that uses a plurality of floors, each image forming apparatus in the company may have an address of a same subnet but arranged in different floors. Therefore, there is a need to filter the image forming apparatuses that physically spaced apart from each other although they are in the same subnet.

Accordingly, in the present embodiment, it is determined whether or not each image forming apparatus is physically spaced apart from a subject image forming apparatus by detecting a hop count of each image forming apparatus and an SSID of an accessible wireless access point of each image forming apparatus.

Specifically, a hop count is a passage through which data packet moves from one router to another router in a packet exchange network. When a router is passed through, the hop count decreases. Therefore, since even if an apparatus is logically in a same subnet, it may be physically spaced apart from a subject apparatus, and thus in the present embodiment, if an image forming apparatus of which a difference between its hop and the hop count of the subject apparatus is or above a pre-determined value, that image forming apparatus may be filtered.

Further, in the case of a wireless network, if an image forming apparatus having a different SSID of wireless access point may be an apparatus that is physically spaced apart albeit in a same subnet. Therefore, an image forming apparatus having a different SSID of wireless access point may be filtered.

For example, as illustrated in FIG. 46, image forming apparatuses 400-2, 400-4, 400-6 having IP addresses where only the last digit is different from that of the subject image forming apparatus 400-1, that is, image forming apparatuses in a same subnet may be combined into an operation group. Here, if the SSID of the second image forming apparatus is different from that of the first image forming apparatus, the second image forming apparatus may be excluded from the operation group.

Further, an operation group for an image forming apparatus searched according to a filtering result is formed (S4530).

Since a grouping method according to the fourth embodiment can perform a grouping operation with only the basic information, it can be easily realized.

Further, although it was explained hereinabove that image forming apparatuses existing in a same subnet may have different hop counts, and that an image forming apparatus with a different SSID is excluded from an operation group, in an embodiment, an operation group may be differentiated according to order of priority, and image forming apparatuses that are in a same subnet and have a same hop count may be combined to generate an operation group with a first order of priority, while image forming apparatuses that are in a same subnet but have different hop counts may be combined to generate an operation group with a second order of priority.

Figure 49:
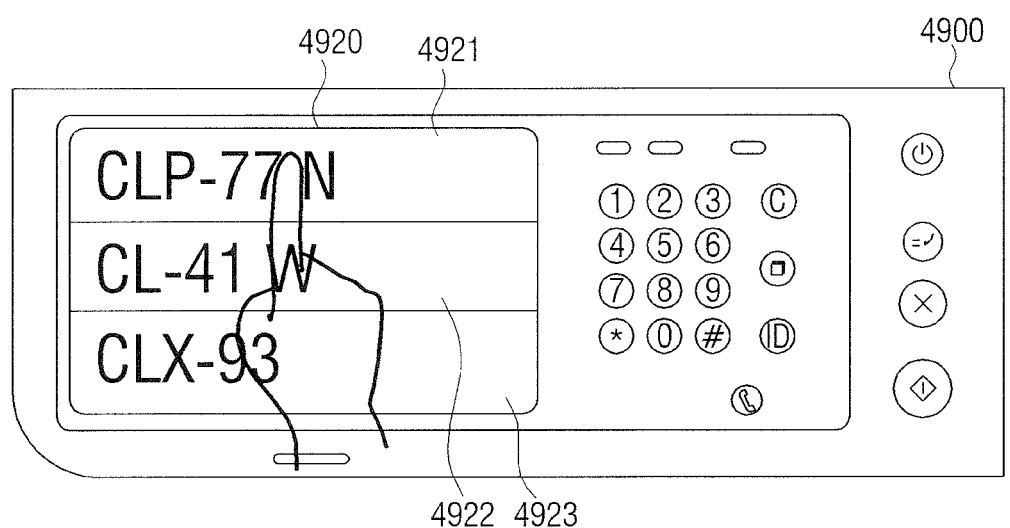

FIGS. 47 to 49 are views illustrating examples of a user interface window that may be displayed in the image forming apparatus of FIG. 27.

Specifically, FIG. 47 is an example of a user interface window in the case where virtualized group is not applied.

Referring to FIG. 47, the user interface window 4700 displays a task and an option that the image forming apparatus 400-1 supports. Specifically, the subject image forming apparatus 400-1 includes a scanner and an image former, and may thus perform a printing operation and a copying operation, and thus the user interface window 4700 includes an area 4710 that displays a currently selected task, areas 4720, 4730, 4740 for receiving selecting of an option for a subject task. When the area 4720, 4730, 4740 for receiving selecting of an option for a subject task is selected, areas for receiving selecting of an option value of a subject area are displayed.

When virtualized group is applied to such an image forming apparatus 400-1, it is possible to use a task of another image apparatus 400-2 that is in the operation group and has a color print task. Accordingly, the subject image forming apparatus 400-1 becomes able to support the color print task. Hereinafter, a user interface window that may be displayed in the image forming apparatus after the virtualized group is applied will be explained with reference to FIG. 48.

FIG. 48 illustrates an example of a user interface window in the case where virtualized group is applied.

Referring to FIG. 48, the subject user interface window 4700' is displayed with an area for receiving a color copy option setting 4750 added thereto. Therefore, the user may select color copying through the added option.

In the case where the user input a color copying task, and there are a plurality of image forming apparatuses that can perform color printing, an image forming apparatus may display a user interface window as that illustrated in FIG. 49.

FIG. 49 is an example of a user interface window that may be displayed when the area 4750 is selected.

Referring to FIG. 49, the user interface 4900 includes a list area 4920 that displays other image forming apparatuses 4921, 4922, 4923 that are capable of color printing in the operation. The user may select one of the image forming apparatuses displayed. However, although it is illustrated and explained in the illustrated example that an apparatus may be selected, another image forming apparatus satisfying a pre-selected condition may be selected automatically.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An electronic apparatus connectable with a first image forming apparatus, the apparatus comprising:
    a touch screen to:
        display a user interface (UI) for controlling functions of the first image forming apparatus,
        receive a command to initiate recording of a work form,
        receive a series of user manipulations to control the first image forming apparatus, and
        generate a control command to control the first image forming apparatus based on the series of user manipulations;
    a communication interface to transmit the control command input on the UI to the first image forming apparatus;
    a work form generator to generate the work form based on the series of user manipulations and an order thereof input on the UI; and
    a storage to store the generated work form,
    wherein the touch screen receives an input of a command to execute the stored work form on a second image forming apparatus, and
    wherein, when the touch screen receives the input of the command to execute the stored work form on the second image forming apparatus, the touch screen displays the work form having a blank field corresponding to at least one of an input source, a destination, or an operating condition of the second image forming apparatus.

2. The electronic apparatus according to claim 1, wherein the touch screen receives an input of a plurality of functions to be performed in the first image forming apparatus and a plurality of options respectively corresponding to the plurality of functions, and
    wherein the work form generator generates the work form based on the plurality of functions and the plurality of options.

3. The electronic apparatus according to claim 2, wherein, if each of the plurality of functions includes a scanning operation, the touch screen receives an input of whether or not a script to be used in the scanning operation of each of the plurality of functions is a same script, and
    wherein the work form generator combines the scanning operation of each of the plurality of functions into one scanning operation and generates the work form.

4. The electronic apparatus according to claim 1, wherein the UI includes a menu for initiating recording and a menu for stopping recording, and
    wherein the work form generator generates the work form based on the user manipulations and an order input between a time point when the menu for initiating recording was selected and a time point when the menu for stopping recording is selected.

5. The electronic apparatus according to claim 4, wherein the touch screen displays a message requesting to select the menu for stopping recording when a pre-determined period of time has passed since the menu for initiating recording was selected.

6. The electronic apparatus according to claim 1, wherein the touch screen displays functions and options of the functions included in the stored work form.

7. The electronic apparatus according to claim 6,
    wherein the touch screen receives an input of a delete command or a change command regarding at least one of the functions and options thereof included in the stored work form, and
    wherein the work form generator updates the stored work form in response to the input delete command or the change command.

8. The electronic apparatus according to claim 6,
    wherein the communication interface transmits a control command corresponding to the work form to the second image forming apparatus.

9. The electronic apparatus according to claim 1, further comprising a determiner to determine whether or not the work form is executable in the second image forming apparatus.

10. The electronic apparatus according to claim 9, wherein the determiner obtains apparatus information on the second image forming apparatus, and determines whether or not the work form is executable in the second image forming apparatus.

11. The electronic apparatus according to claim 9, wherein, when at least one function or at least one option of the functions in the work form cannot be performed in the second image forming apparatus, the determiner searches for a function or an option that can substitute for the at least one function or the at least one option.

12. The electronic apparatus according to claim 1, wherein, when at least one function or at least one option of the functions in the work form cannot be performed in the second image forming apparatus, the touch screen receives a selection of a function or an option that can substitute for the at least one function or the at least one option, or receives a selection of cancelling execution of the function that cannot be performed.

13. The electronic apparatus according to claim 7, wherein the touch screen displays a status of progress of the work form.

14. A print control method of an electronic apparatus connectable with a first image forming apparatus, the method comprising:
    displaying a user interface (UI) for controlling functions of the first image forming apparatus;
    receiving a command to initiate recording of a work form;
    receiving a series of user manipulations to control the first image forming apparatus;
    generating a control command to control the first image forming apparatus based on the series of user manipulations;
    transmitting the control command input on the UI to the first image forming apparatus;
    generating the work form based on the series of user manipulations and an order thereof input on the UI;
    storing the generated work form;
    receiving a command to execute the stored work form on a second image forming apparatus; and
    when the command to execute the stored work form on the second image forming apparatus is received, displaying the work form having a blank field corresponding to at least one of an input source, a destination, or an operating condition of the second image forming apparatus.

* * * * *